US012753113B2

(12) United States Patent
Geiger et al.

(10) Patent No.: US 12,753,113 B2
(45) Date of Patent: Oct. 6, 2026

(54) ANTIGLARE SURFACES WITH ABRASION-RESISTANT PROPERTIES

(71) Applicant: CORNING INCORPORATED, Corning, NY (US)

(72) Inventors: Melanie Lian Geiger, Horseheads, NY (US); Yuhui Jin, Painted Post, NY (US); Cameron Robert Nelson, Oak Park, CA (US); James Joseph Price, Corning, NY (US); Ross Johnson Stewart, Corning, NY (US); Florence Christine Monique Verrier, Corning, NY (US); David Lee Weidman, Corning, NY (US); Binwei Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 99 days.

(21) Appl. No.: 18/792,730

(22) Filed: Aug. 2, 2024

(65) Prior Publication Data

US 2025/0042806 A1 Feb. 6, 2025

Related U.S. Application Data

(60) Provisional application No. 63/530,581, filed on Aug. 3, 2023.

(51) Int. Cl.
*C03C 15/00* (2006.01)

(52) U.S. Cl.
CPC .......... *C03C 15/00* (2013.01); *C03C 2204/08* (2013.01)

(58) Field of Classification Search
CPC ............................ C03C 15/00; C03C 2204/08
(Continued)

(56) References Cited

U.S. PATENT DOCUMENTS 9,411,180 B2 8/2016 Gollier et al.
10,611,675 B2 4/2020 Beall et al.
(Continued)

FOREIGN PATENT DOCUMENTS

CN 211999494 U 11/2020
CN 113816612 A 12/2021
(Continued)

OTHER PUBLICATIONS

International Search Report and Written Opinion of the International Searching Authority; PCT/US2024/040014 ; dated Oct. 24, 2024; 12 pages; US Patent Office.
(Continued)

*Primary Examiner* — Tahseen Khan
(74) *Attorney, Agent, or Firm* — Travis B. Gasa

(57) ABSTRACT

A textured article is described herein comprising a substrate comprising a textured region defined on a primary surface of the substrate, in which the textured region comprises (a) a Vmp/Sq of at least 0.084, (b) a Vmp/Sq of at least 0.084 and an Smrk2 of at least 90%, and/or (c) a Vmp of at least 10 nm and an Sdq of 0-0.1. The textured article generally has good abrasion resistance and optical properties including anti-glare, haze, sparkle, and distinctness of image. A method for making a textured article is also described herein comprising removing a first portion of a primary surface of a substrate through holes penetrating through a stop layer to the primary surface to form seed depressions and unremoved portions, removing the stop layer, and then removing a second portion of the primary surface comprising the seed depressions and the unremoved portions.

20 Claims, 18 Drawing Sheets

(58) Field of Classification Search
USPC .......................................................... 428/409
See application file for complete search history.

(56) References Cited

U.S. PATENT DOCUMENTS

| | | | | | |
|---|---|---|---|---|---|
| 2017/0259524 | A1* | 9/2017 | Neton | A61F 13/537 |
| 2020/0148591 | A1 | 5/2020 | Andrews et al. | |
| 2020/0223744 | A1 | 7/2020 | Beall et al. | |
| 2020/0231491 | A1 | 7/2020 | Beall et al. | |
| 2020/0325086 | A1 | 10/2020 | Dakka et al. | |
| 2022/0011467 | A1* | 1/2022 | Feng | C03C 15/00 |
| 2022/0011468 | A1 | 1/2022 | Hart et al. | |
| 2022/0265897 | A1* | 8/2022 | Davison | A61L 27/14 |
| 2023/0234140 | A1* | 7/2023 | Ieda | B22F 12/90<br>264/497 |
| 2025/0263580 | A1* | 8/2025 | Yamaji | B32B 15/04 |

FOREIGN PATENT DOCUMENTS

| | | | | | |
|---|---|---|---|---|---|
| WO | 2022/011067 | A1 | | 1/2022 | |
| WO | 2023/081063 | A1 | | 5/2023 | |
| WO | 2023/096780 | A1 | | 6/2023 | |
| WO | WO-2023127679 | A1 | * | 7/2023 | H05K 3/285 |

OTHER PUBLICATIONS

Corning Inc., "Information Related to Coatings on Commercially Available Tablet Devices—Supplying data related to the Apple iPad Air 2 (released Oct. 2014), Apple iPad Pro 2nd Generation (released Jun. 2017), and Apple iPad Air 4th Generation (released Oct. 2020)" 28 pages. This document has not been published in a book, magazine, journal, etc.

* cited by examiner

ANTIGLARE SURFACES WITH ABRASION-RESISTANT PROPERTIES

CROSS-REFERENCE TO RELATED APPLICATIONS

This application claims the benefit of priority to U.S. Provisional Patent Application No. 63/530,581 filed on Aug. 3, 2023, the content of which is incorporated herein by reference in its entirety for all purposes.

FIELD

The disclosure relates generally to textured articles, and more particularly to textured articles having desirable structural and optical properties, including abrasion resistance, antiglare, distinctness of image, sparkle, and/or haze.

BACKGROUND

Articles with antiglare properties are desirable in consumer electronics and automotive markets. To create the antiglare effect, an article surface, such as a cover glass, is typically roughened so that reflected light from a bright scene is scattered away from the specular direction. A widely-used glass roughening process is sandblast-and-HF-etch (SBE), which produces low distinctness of image surfaces with reasonable sparkle (PPD). However, such antiglare surfaces are susceptible to damage from scratching, particularly when employed in high touch applications such as in laptops, tablets, and smartphones, due to the presence of scratch-causing fingerprint debris as well as a lack of a suitable surface structure for mitigating scratching.

Thus, there is a need in the art for articles having desirable properties, as well as methods of making and use. This disclosure is directed towards these, as well as other, ends.

SUMMARY

The disclosure relates, in various aspects, to a textured article comprising a substrate comprising a textured region defined on a primary surface of the substrate, wherein the textured region comprises a Vmp/Sq of at least 0.084 as measured according to ISO 25178-2:2012.

The disclosure relates, in various aspects, to a textured article comprising a substrate comprising a textured region defined on a primary surface of the substrate, wherein the textured region comprises a Vmp/Sq of at least 0.084 as measured according to ISO 25178-2:2012 and an Smrk2 of at least 90% as measured according to ISO 25178-2:2021.

The disclosure relates, in various aspects, to a textured article comprising a substrate comprising a textured region defined on a primary surface of the substrate, wherein the textured region comprises a Vmp of at least 10 nm as measured according to ISO 25178-2:2012 and an Sdq of 0-0.1 as measured according to ISO 25178-2:201.

The disclosure relates, in various aspects, to a method for making a textured article, the method comprising: providing a substrate having a stop layer disposed on a primary surface of the substrate, the stop layer having randomly distributed holes penetrating through to the primary surface; a first removal step comprising removing a first portion of the primary surface through the holes of the stop layer to form seed depressions in the primary surface and unremoved portions of the primary surface under the stop layer; a second removal step comprising removing the stop layer, thereby exposing the unremoved portions of the primary surface under the stop layer; and a third removal step comprising removing a second portion of the primary surface substrate, the second portion comprising the seed depressions and the unremoved portions of the primary surface so as to provide a textured region on the primary surface.

The disclosure relates, in various aspects, to a textured article comprising a substrate comprising a textured region defined on a primary surface of the substrate, in which the textured region comprises (a) a Vmp/Sq of at least 0.084, (b) a Vmp/Sq of at least 0.084 and an Smrk2 of at least 90%, and/or (c) a Vmp of at least 10 nm and an Sdq of 0-0.1. In some aspects, the textured article generally has good abrasion resistance and optical properties including antiglare, haze, sparkle, and distinctness of image. The disclosure also relates, in various aspects, to a method for making a textured article comprising removing a first portion of a primary surface of a substrate through holes penetrating through a stop layer to the primary surface to form seed depressions and unremoved portions, removing the stop layer, and then removing a second portion of the primary surface comprising the seed depressions and the unremoved portions.

Additional features and advantages of the disclosure will be set forth in the detailed description which follows, and in part will be readily apparent to those skilled in the art from that description or recognized by practicing the aspects as described herein, including the detailed description which follows, the claims, as well as the appended drawings.

It is to be understood that both the foregoing general description and the following detailed description are merely exemplary and are intended to provide an overview or framework for understanding the nature and character of the disclosure and claims. The accompanying drawings are included to provide a further understanding of the disclosure and are incorporated into and constitute a part of this specification. The drawings illustrate various aspects of the disclosure and together with the description serve to explain the principles and operations of the various aspects.

BRIEF DESCRIPTION OF THE DRAWINGS

The following detailed description can be further understood when read in conjunction with the following drawings. Whenever possible, the same reference numerals will be used throughout the drawings to refer to the same or like parts. It is to be understood that the figures are not drawn to scale and the size of each depicted component or the relative size of one component to another is not intended to be limiting.

DETAILED DESCRIPTION

Figure 1A:
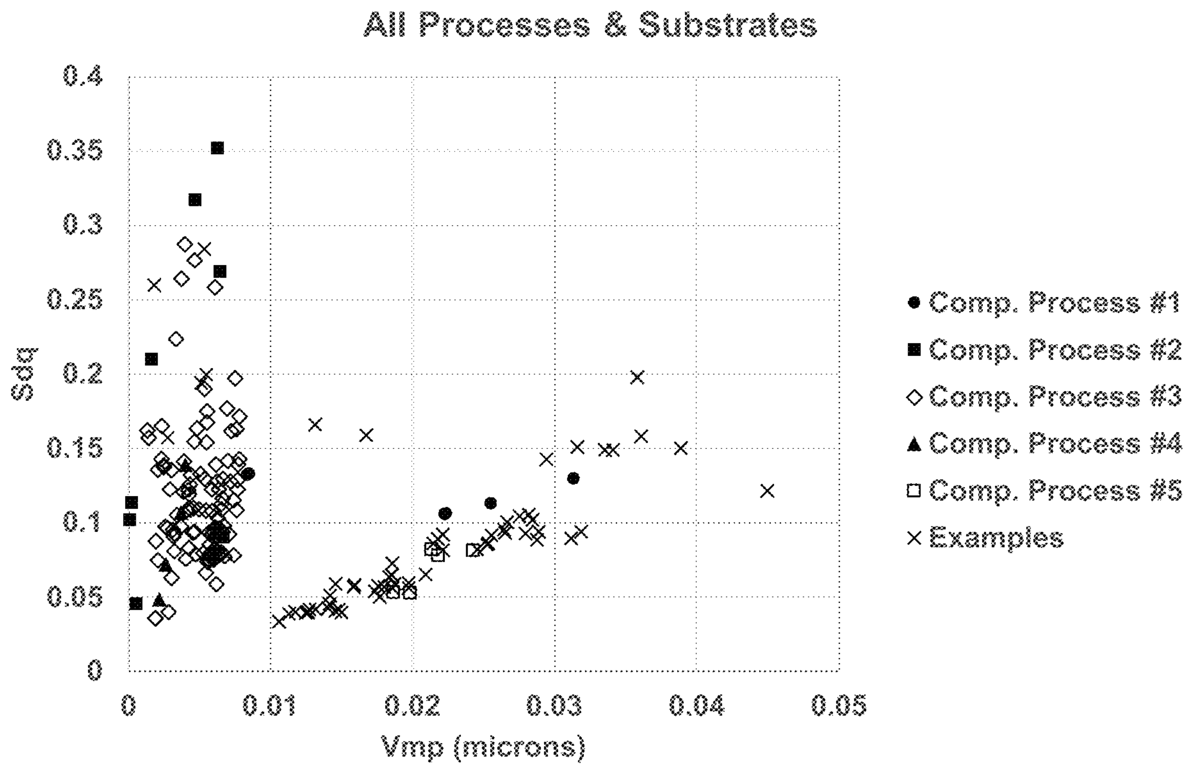
FIG. 1A is a scatter plot of Sdq vs. Vmp measured on a textured region of a substrate for textured articles consistent with the disclosures herein ("Examples"), as well as for comparative substrates ("Comp. Process").
Figure 1B:
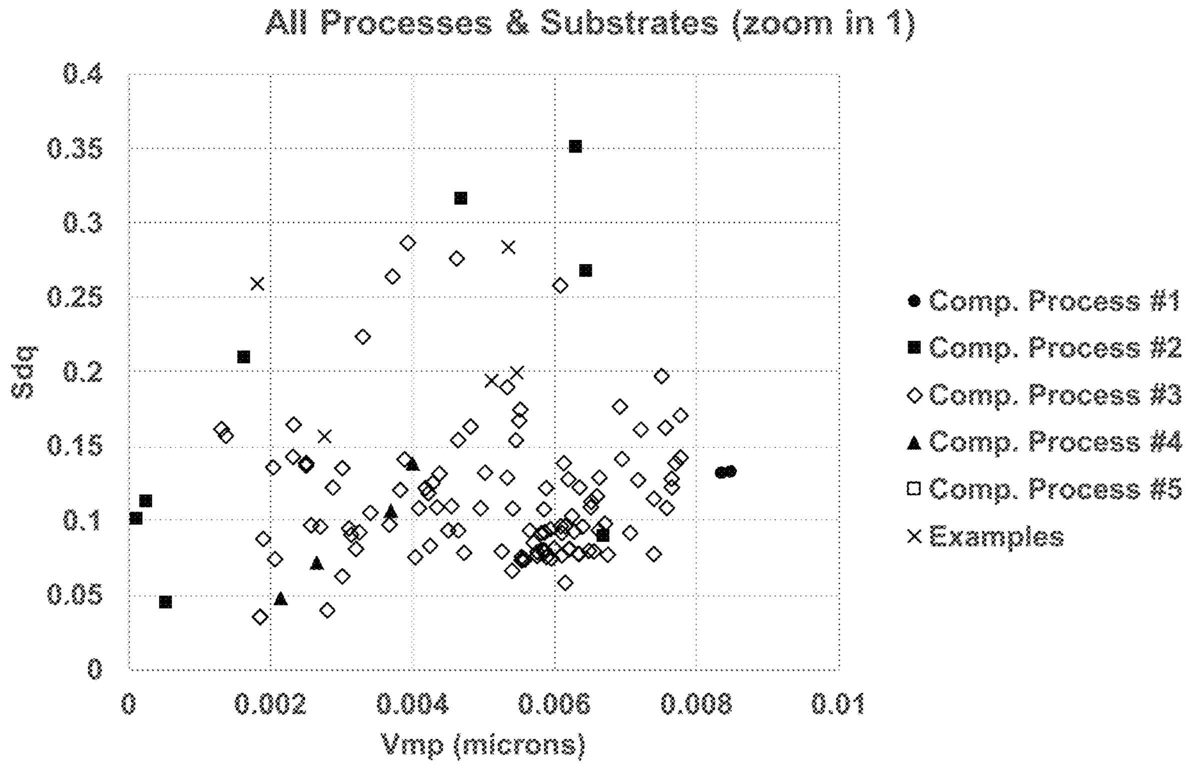
FIG. 1B is a scatter plot of Sdq vs. Vmp showing a first zoomed in region of FIG. 1A.
Figure 1C:
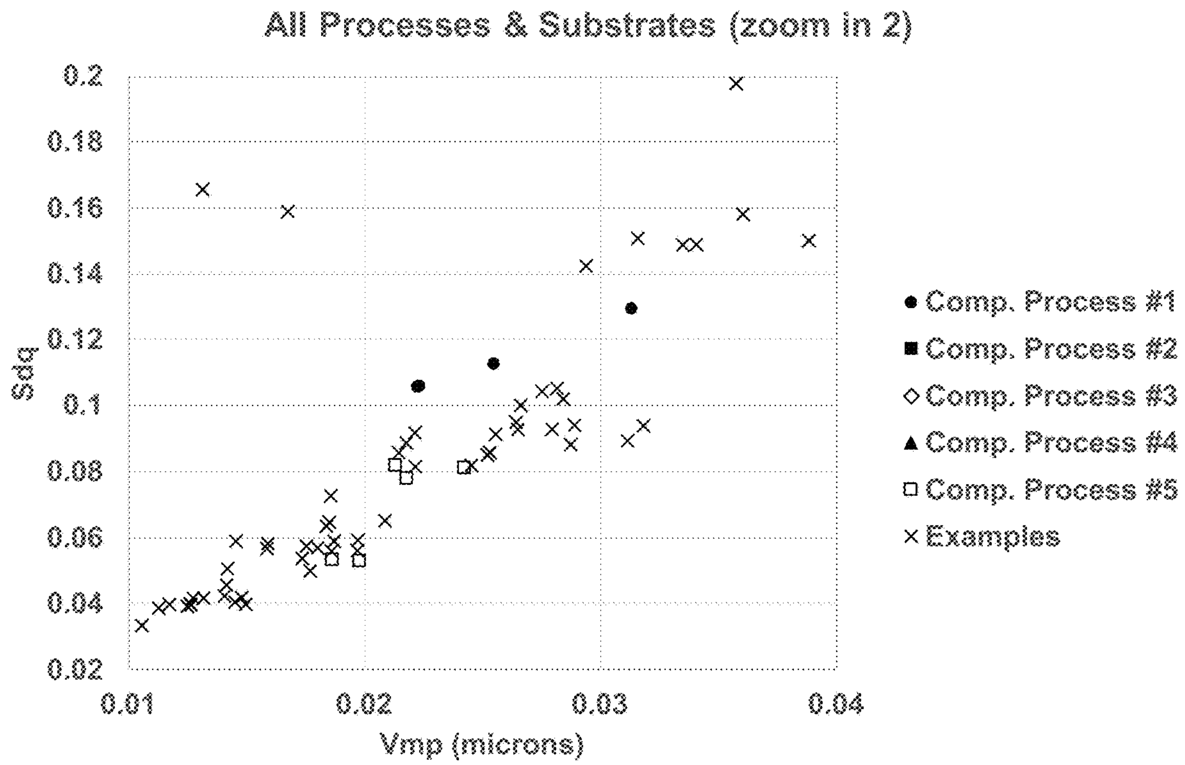
FIG. 1C is a scatter plot of Sdq vs. Vmp showing a second zoomed in region of FIG. 1A.
Figure 1D:
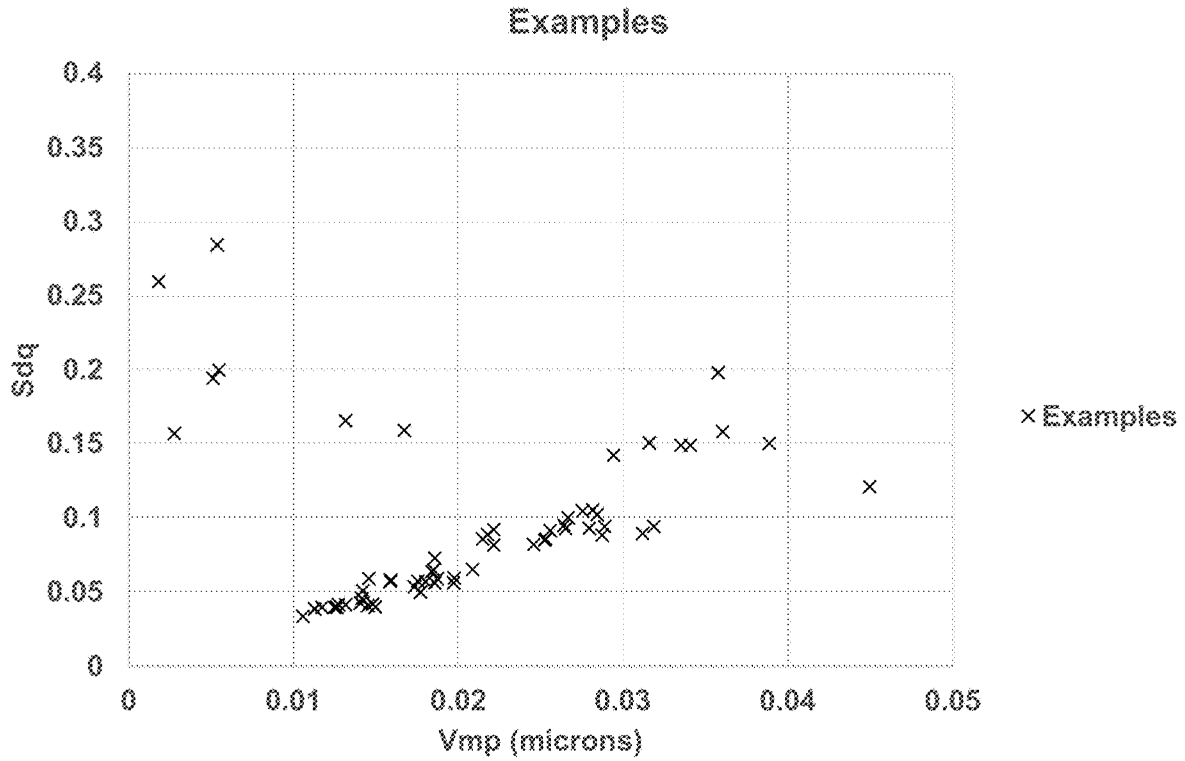
FIG. 1D is a scatter plot of Sdq vs. Vmp showing only the Examples of FIG. 1A with the Comp. Process data points removed.
Figure 1E:
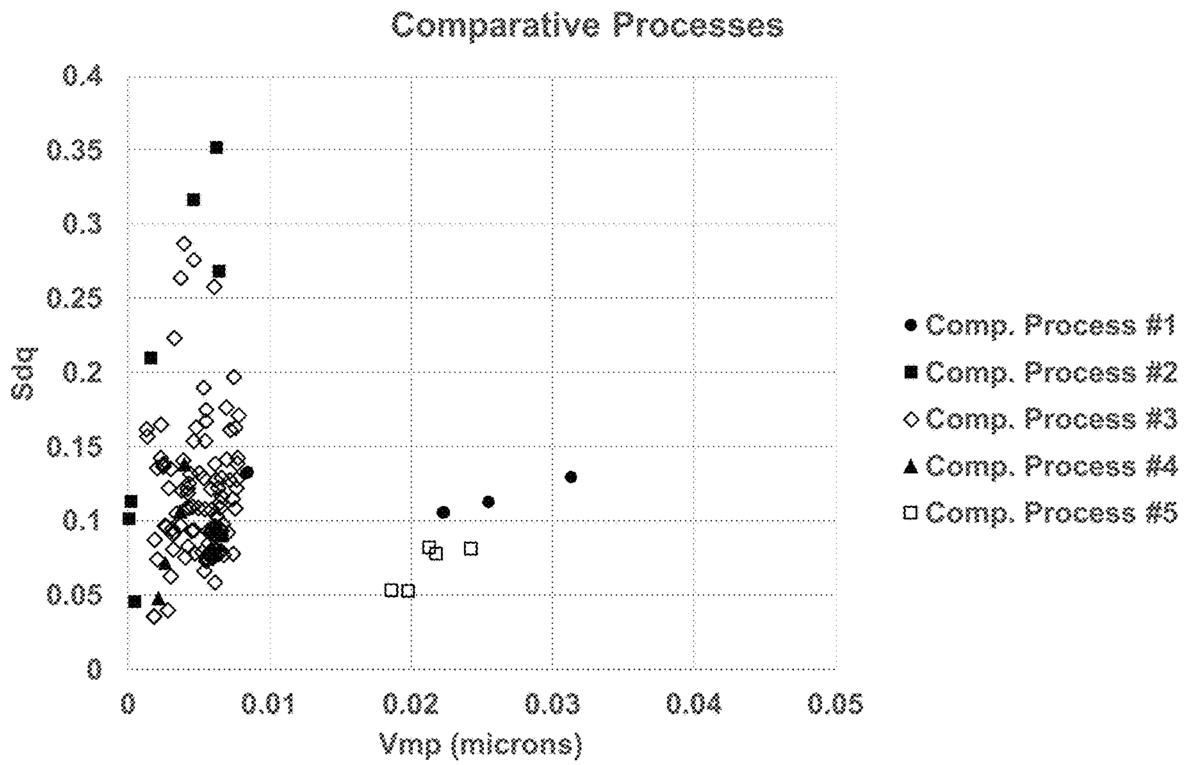
FIG. 1E is a scatter plot of Sdq vs. Vmp showing only the Comp. Process samples of FIG. 1A with the Example data points removed.
Figure 1F:
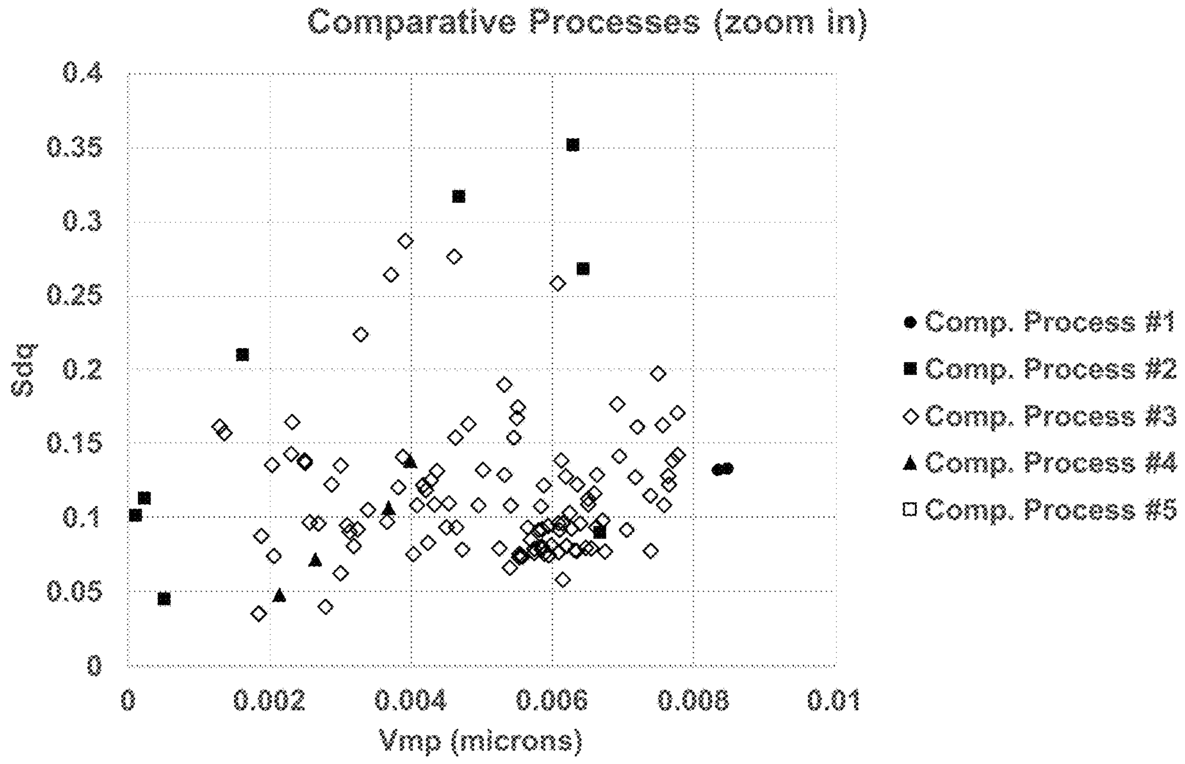
FIG. 1F is a scatter plot of Sdq vs. Vmp showing a zoomed in region of FIG. 1E.
Figure 2:
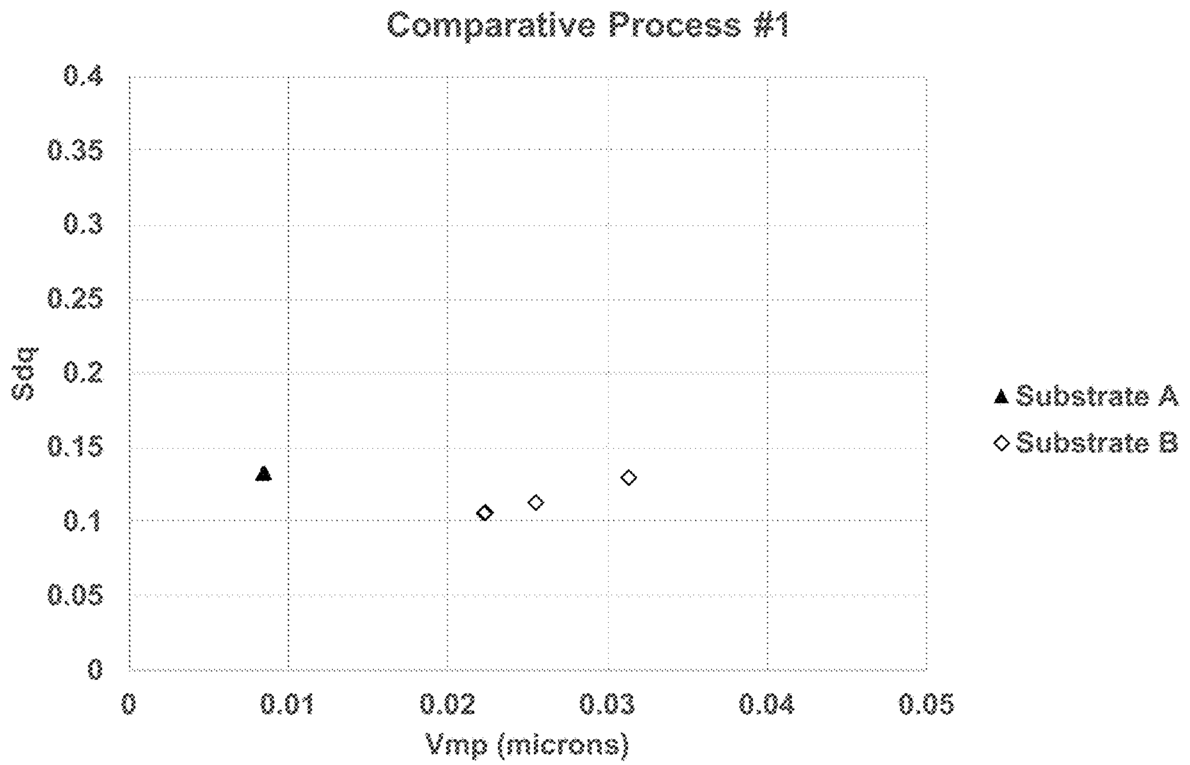
FIG. 2 is a scatter plot of Sdq vs. Vmp showing only the Comp. Process #1 samples of FIG. 1A broken down by substrate type.
Figure 3:
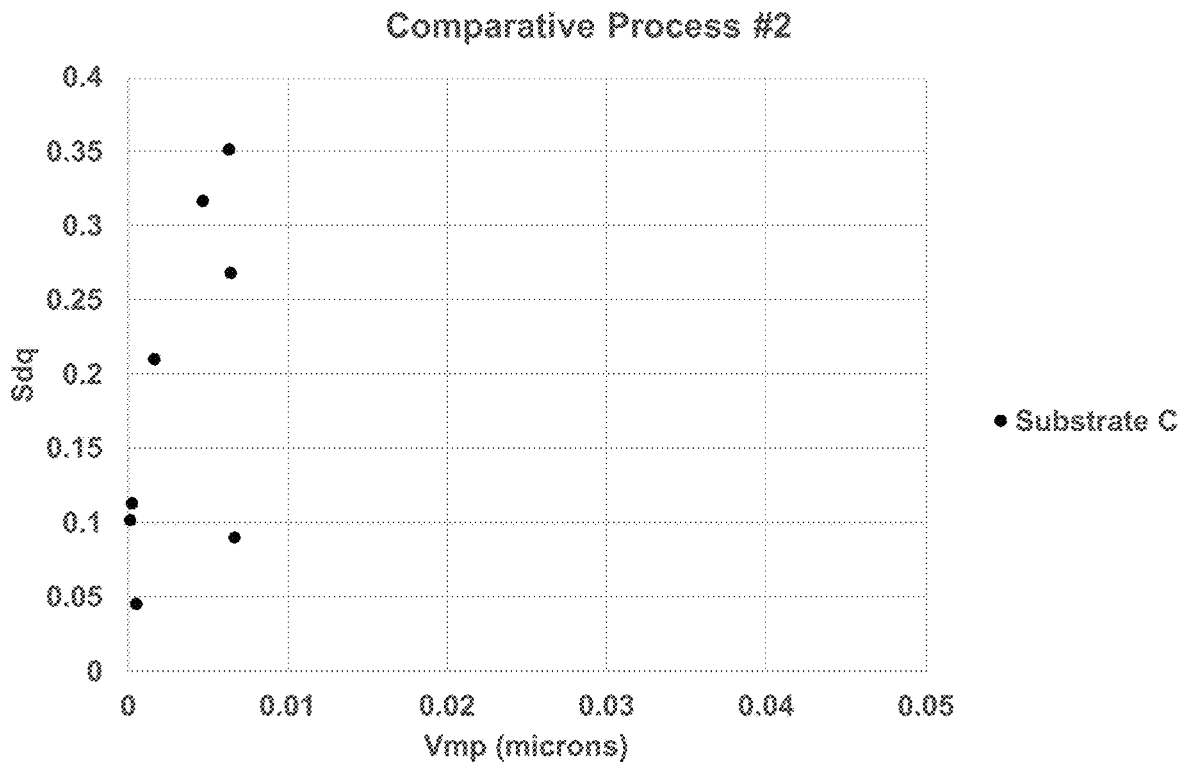
FIG. 3 is a scatter plot of Sdq vs. Vmp showing only the Comp. Process #2 samples of FIG. 1A broken down by substrate type.
Figure 4A:
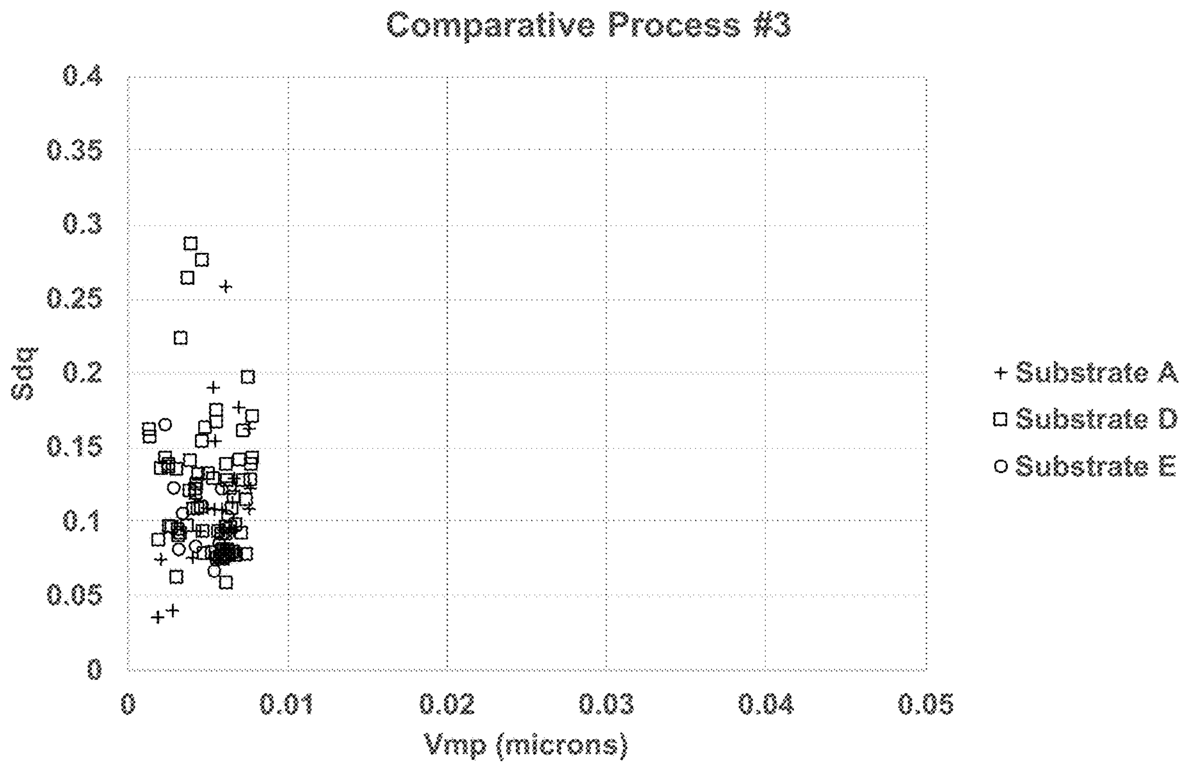
FIG. 4A is a scatter plot of Sdq vs. Vmp showing only the Comp. Process #3 samples of FIG. 1A broken down by substrate type.
Figure 4B:
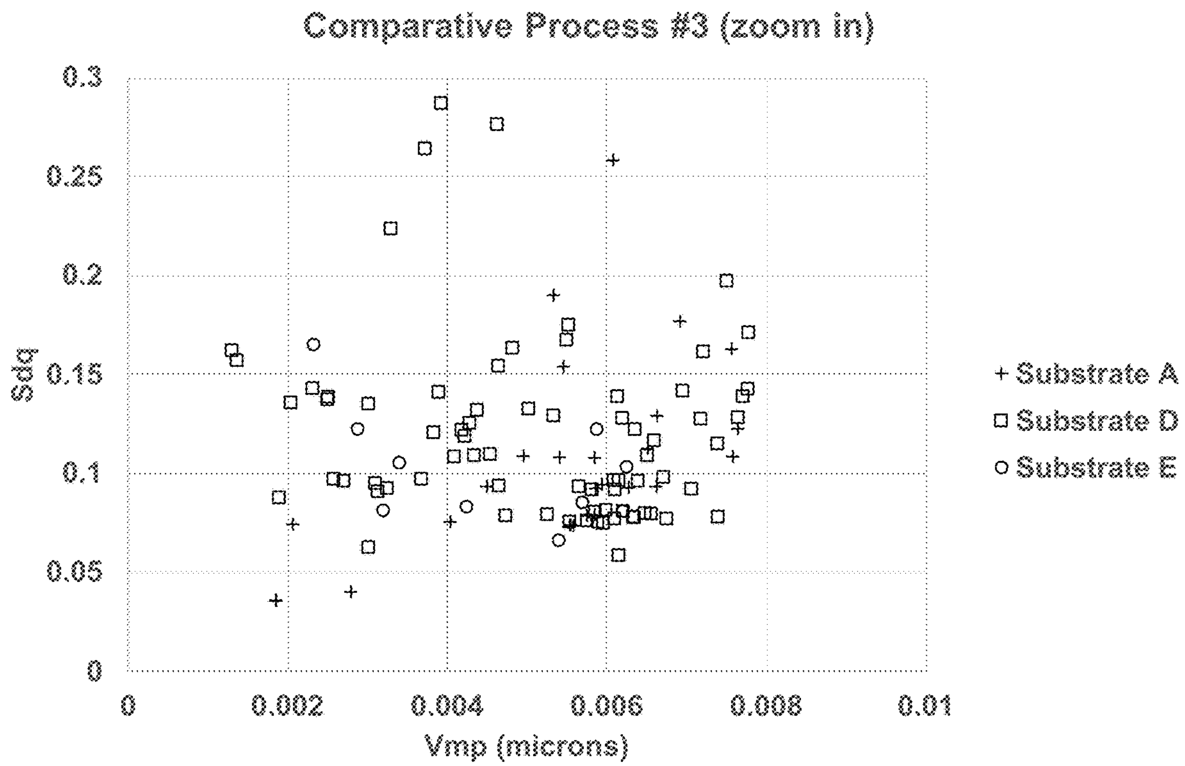
FIG. 4B is a scatter plot of Sdq vs. Vmp showing a zoomed in region of FIG. 4A.
Figure 5:
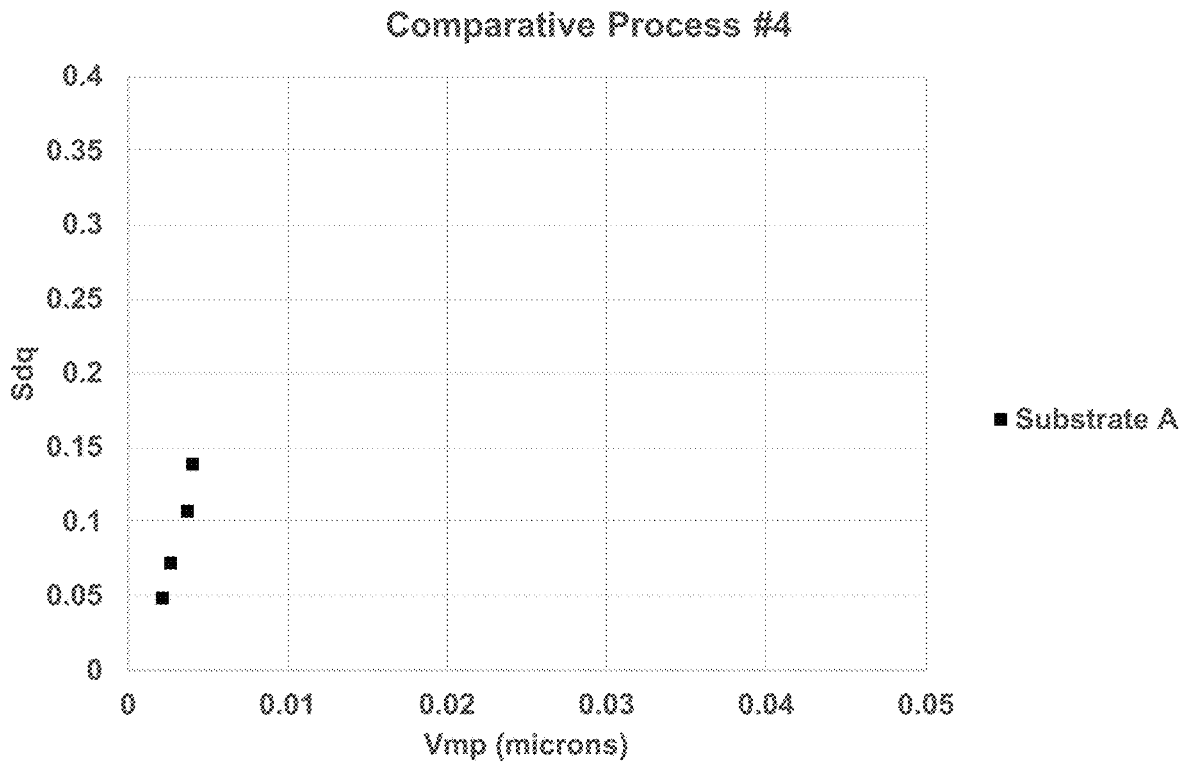
FIG. 5 is a scatter plot of Sdq vs. Vmp showing only the Comp. Process #4 samples of FIG. 1A broken down by substrate type.
Figure 6:
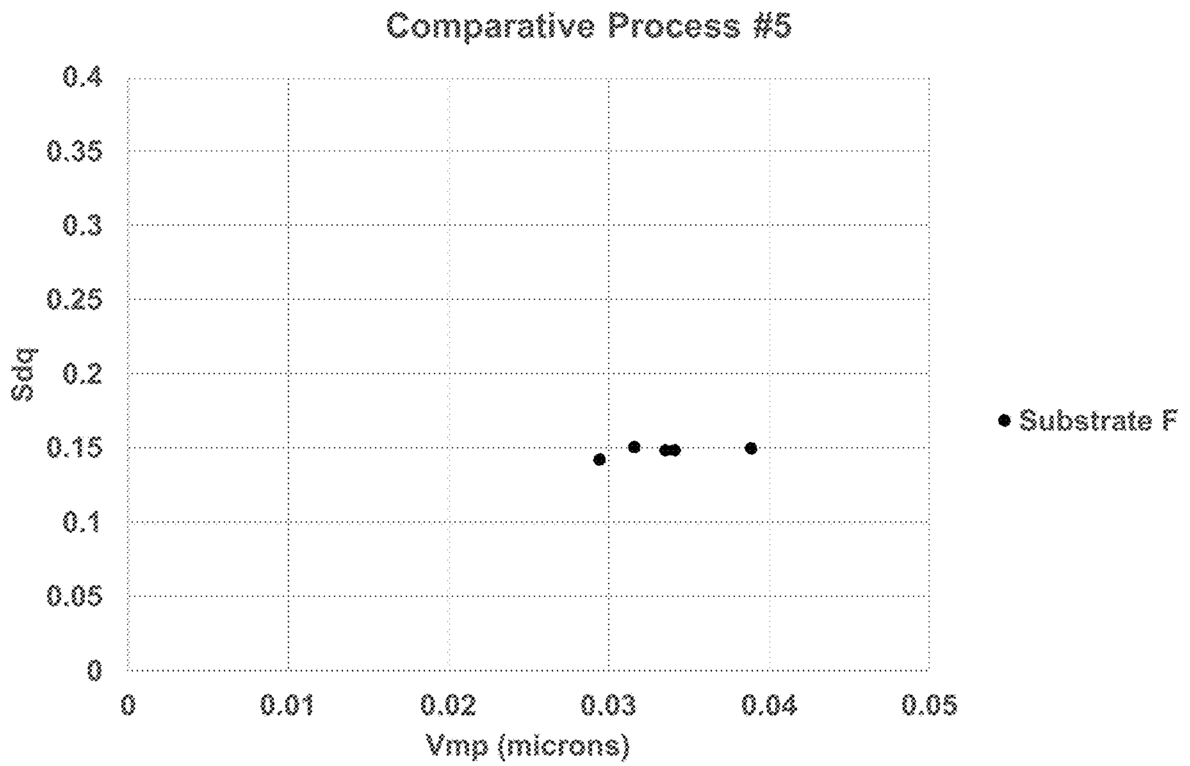
FIG. 6 is a scatter plot of Sdq vs. Vmp showing only the Comp. Process #5 samples of FIG. 1A broken down by substrate type.
Figure 7A:
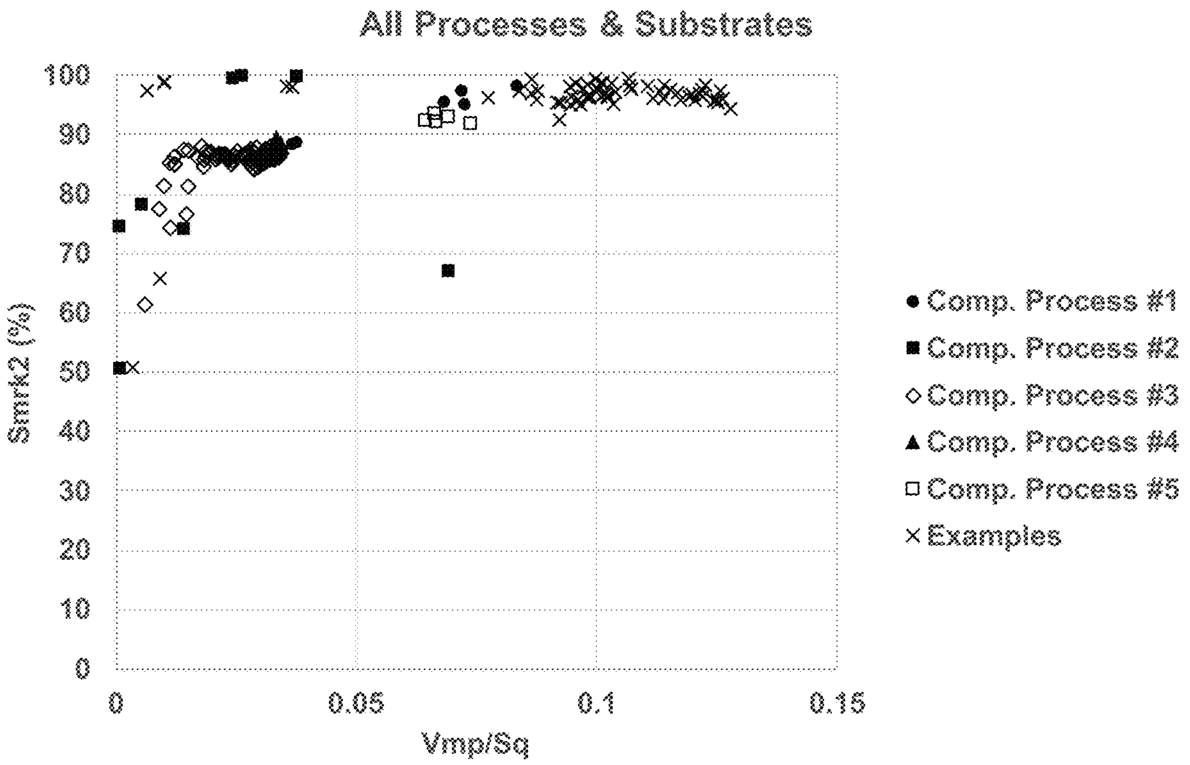
FIG. 7A is a scatter plot of Smrk2 vs. Vmp/Sq measured on a textured region of a substrate for textured articles consistent with the disclosures herein ("Examples"), as well as for comparative substrates ("Comp. Process").
Figure 7B:
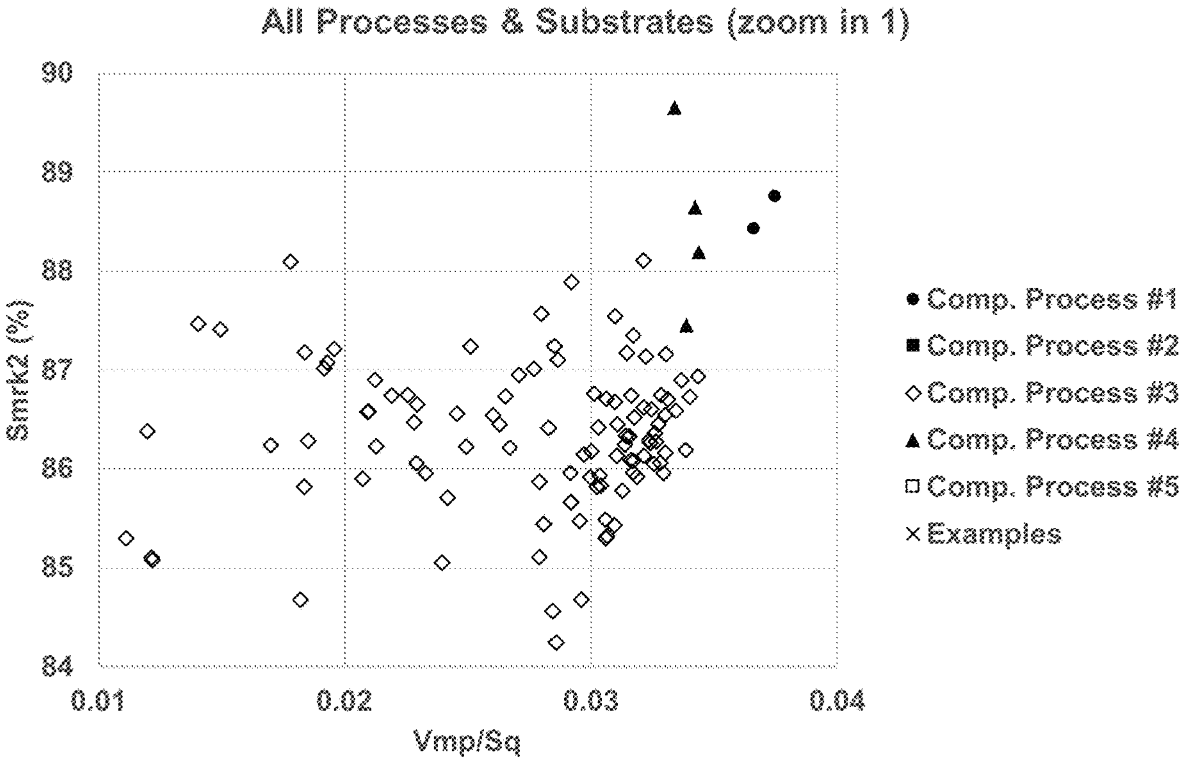
FIG. 7B is a scatter plot of Smrk2 vs. Vmp/Sq showing a first zoomed in region of FIG. 7A.
Figure 7C:
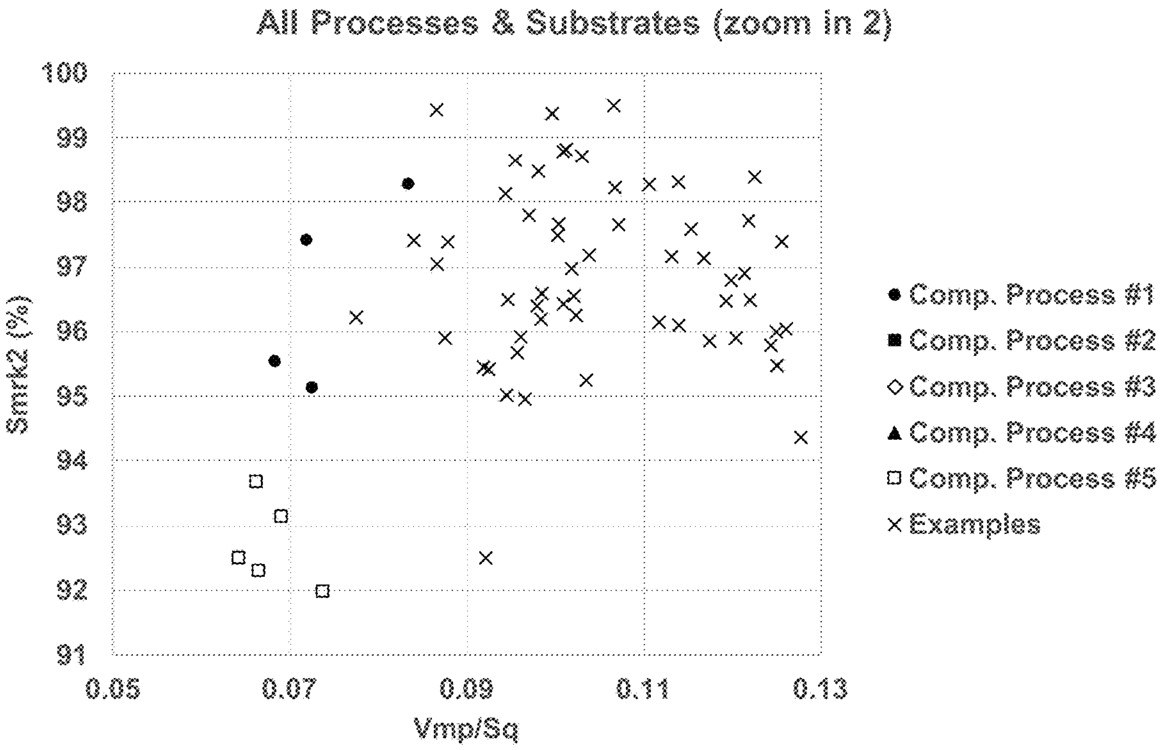
FIG. 7C is a scatter plot of Smrk2 vs. Vmp/Sq showing a second zoomed in region of FIG. 7A.
Figure 7D:
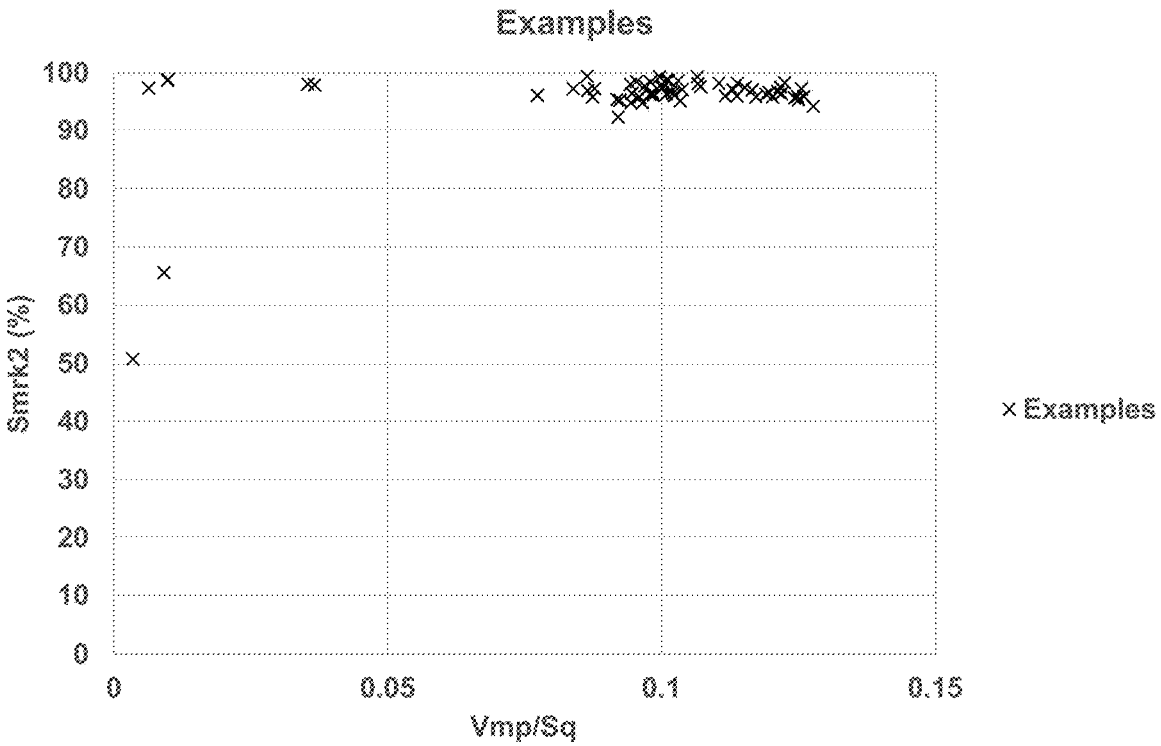
FIG. 7D is a scatter plot of Smrk2 vs. Vmp/Sq showing only the Examples of FIG. 7A with the Comp. Process data points removed.
Figure 7E:
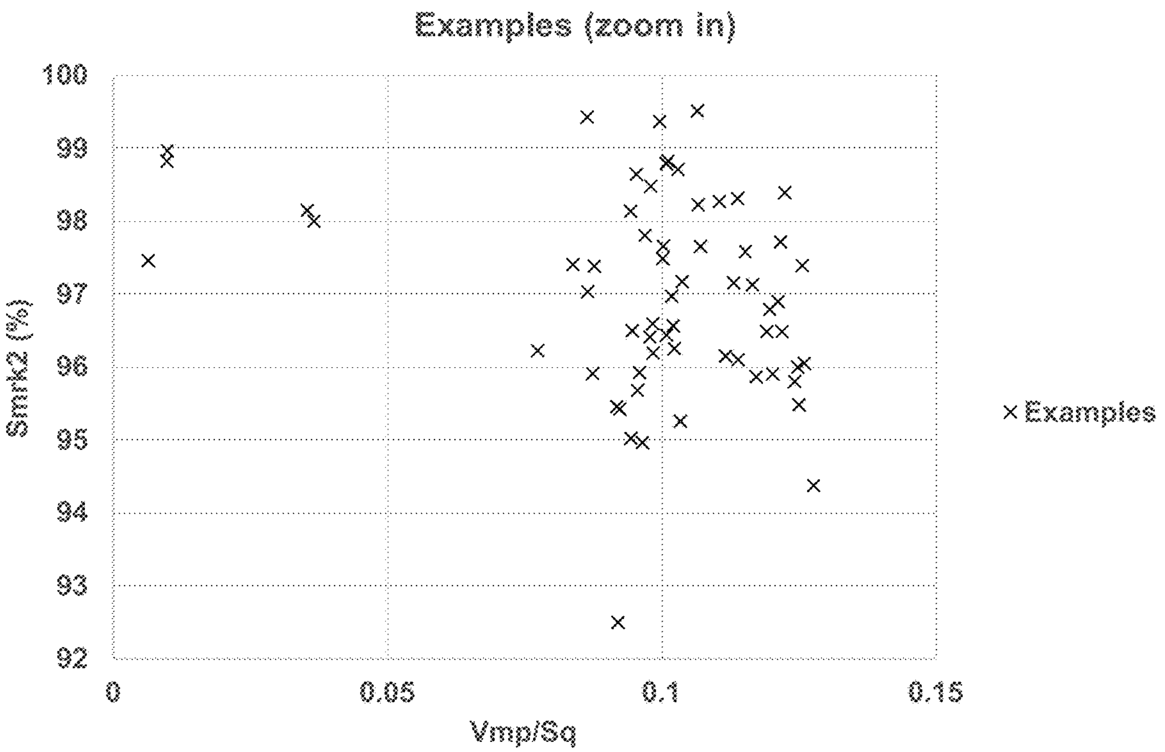
FIG. 7E is a scatter plot of Smrk2 vs. Vmp/Sq showing a zoomed in region of FIG. 7D.
Figure 7F:
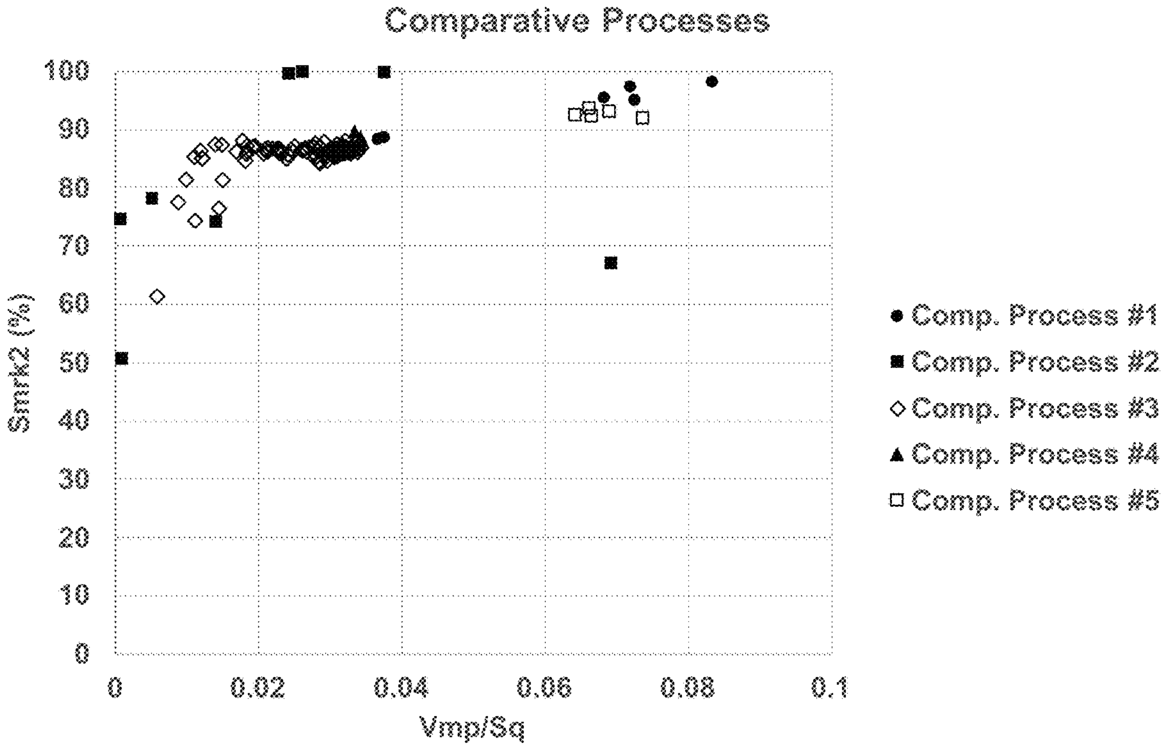
FIG. 7F is a scatter plot of Smrk2 vs. Vmp/Sq showing only the Comp. Process samples of FIG. 7A with the Example data points removed.
Figure 7G:
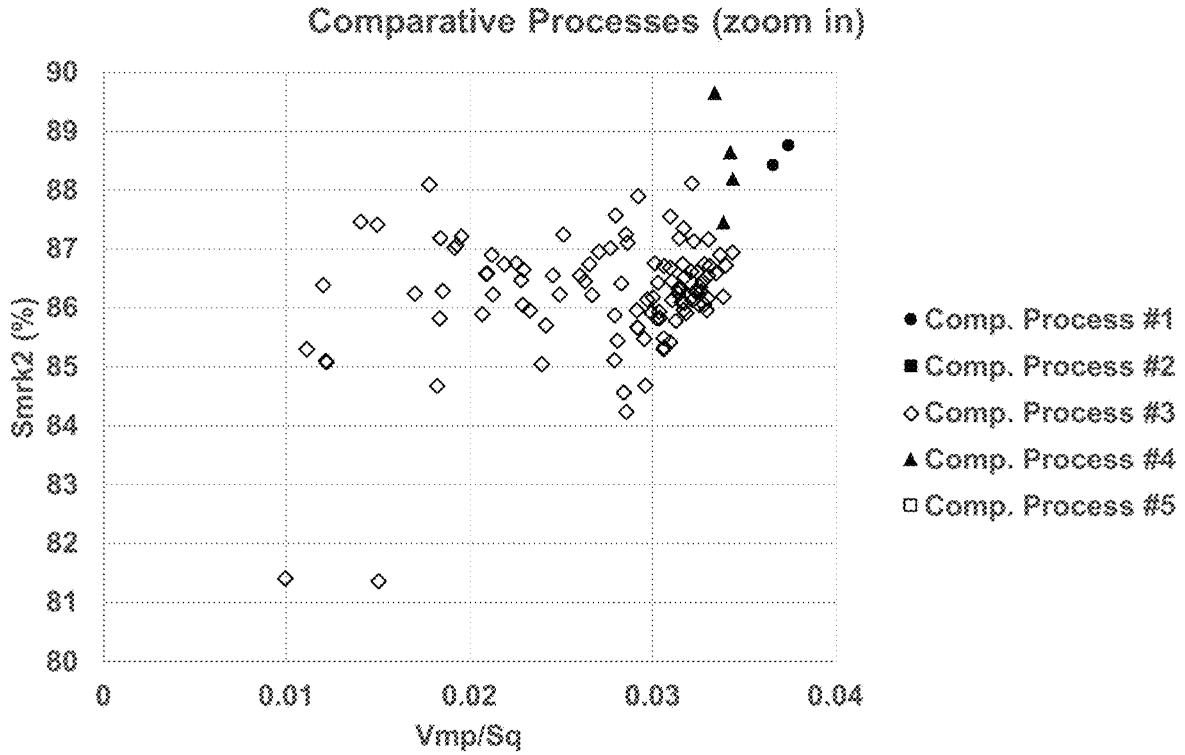
FIG. 7G is a scatter plot of Smrk2 vs. Vmp/Sq showing a zoomed in region of FIG. 7F.
Figure 8:
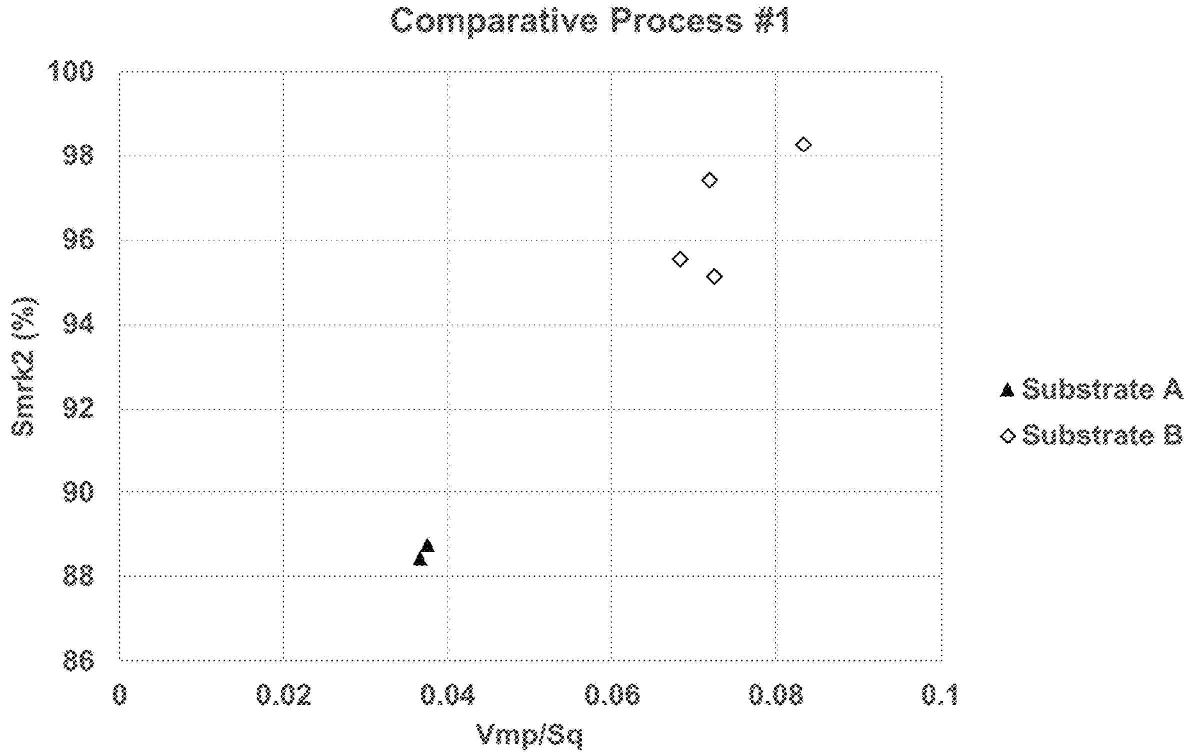
FIG. 8 is a scatter plot of Smrk2 vs. Vmp/Sq showing only the Comp. Process #1 samples of FIG. 7A broken down by substrate type.
Figure 9:
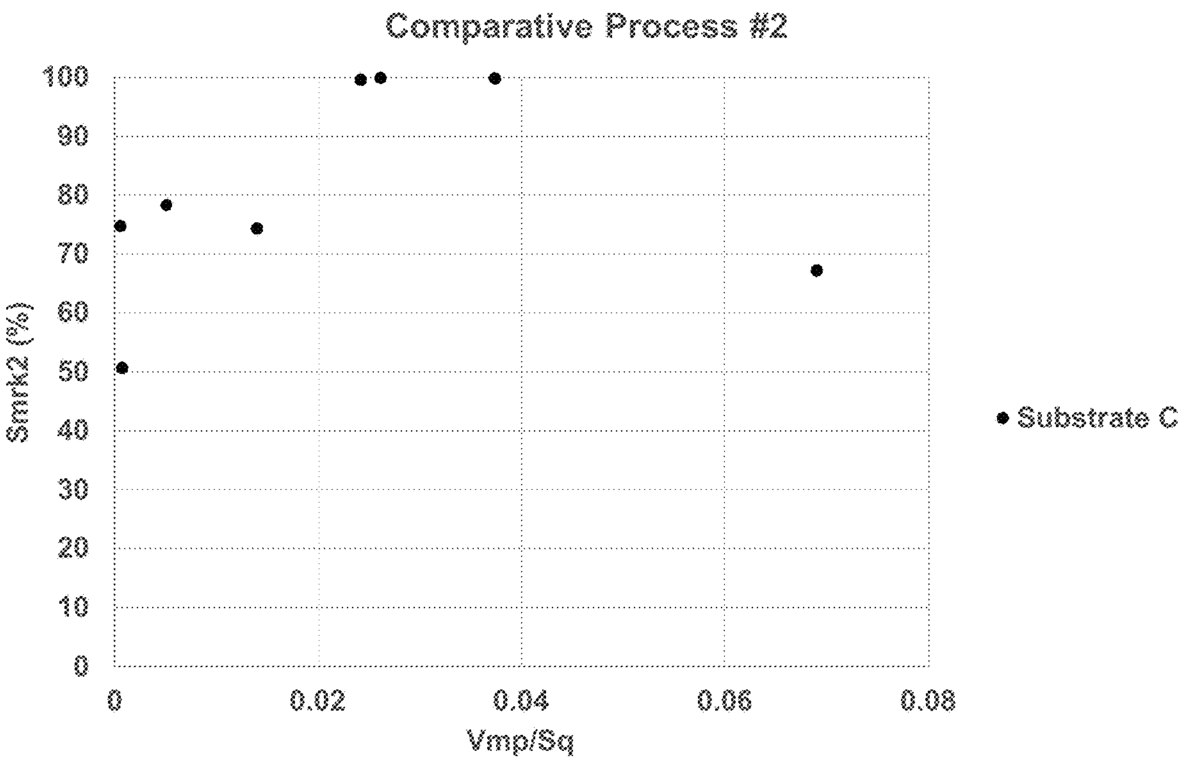
FIG. 9 is a scatter plot of Smrk2 vs. Vmp/Sq showing only the Comp. Process #2 samples of FIG. 7A broken down by substrate type.
Figure 10A:
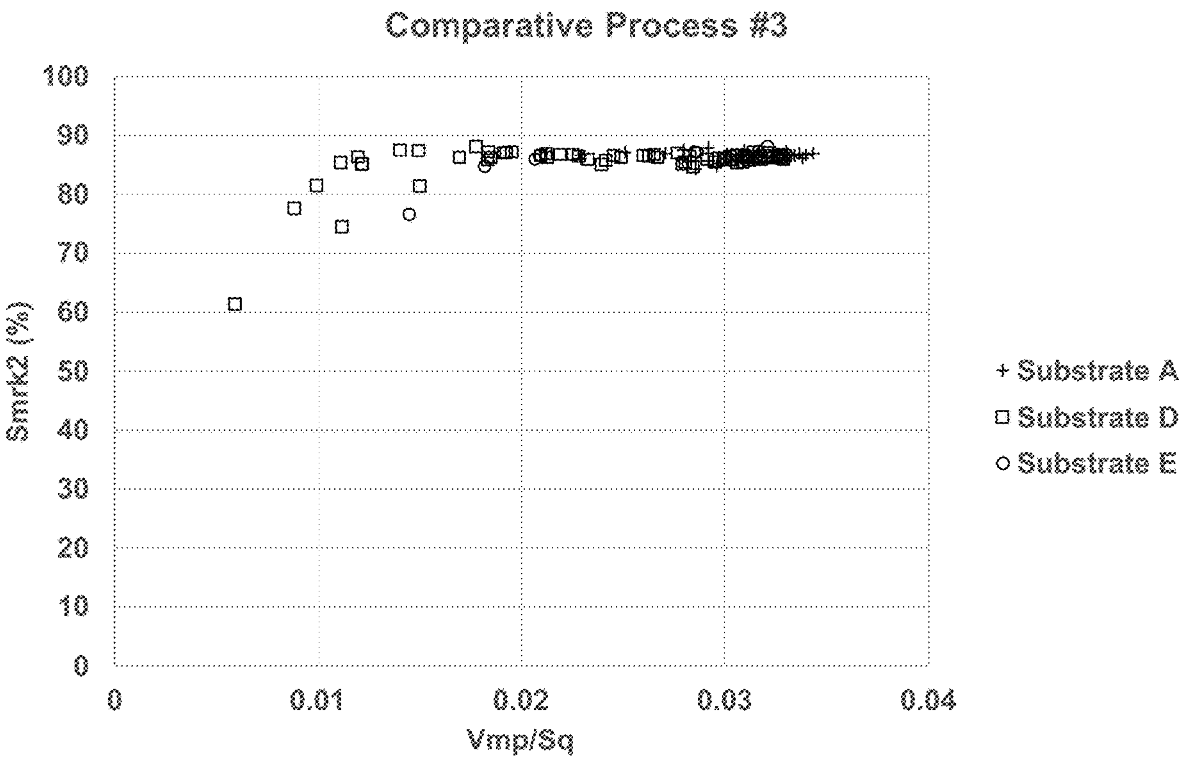
FIG. 10A is a scatter plot of Smrk2 vs. Vmp/Sq showing only the Comp. Process #3 samples of FIG. 7A broken down by substrate type.
Figure 10B:
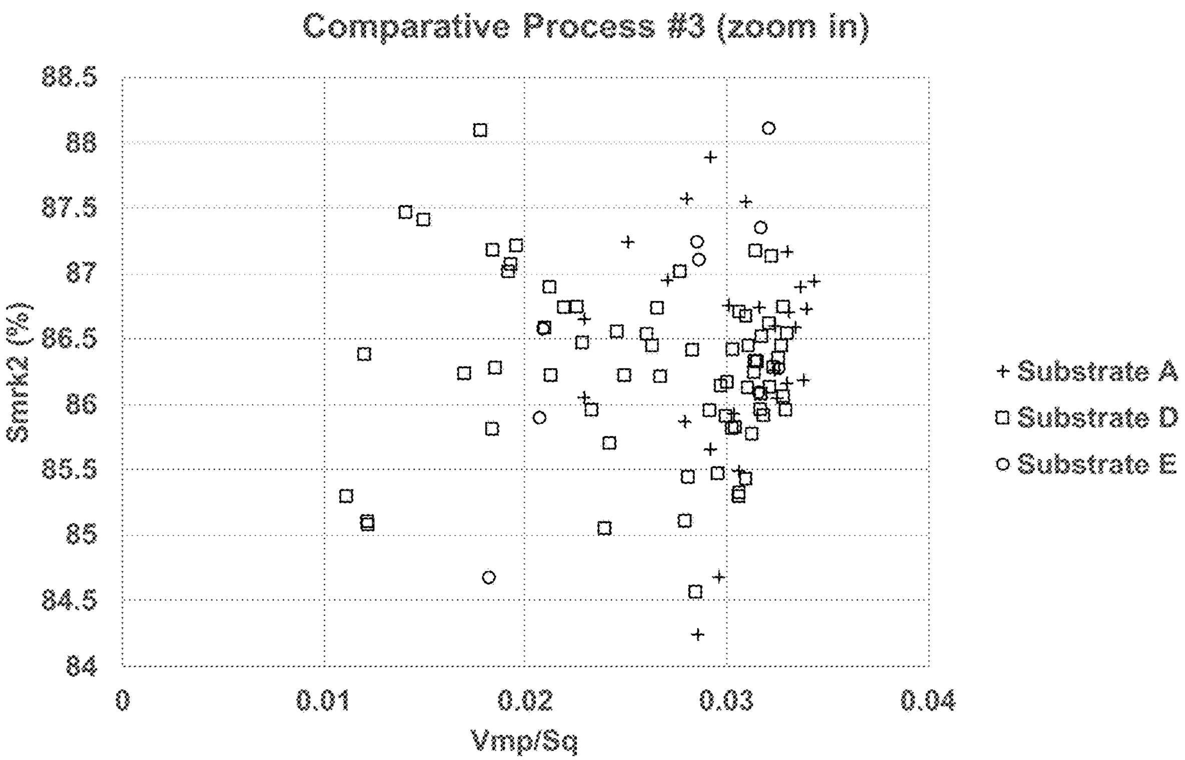
FIG. 10B is a scatter plot of Smrk2 vs. Vmp/Sq showing a zoomed in region of FIG. 10A.
Figure 11:
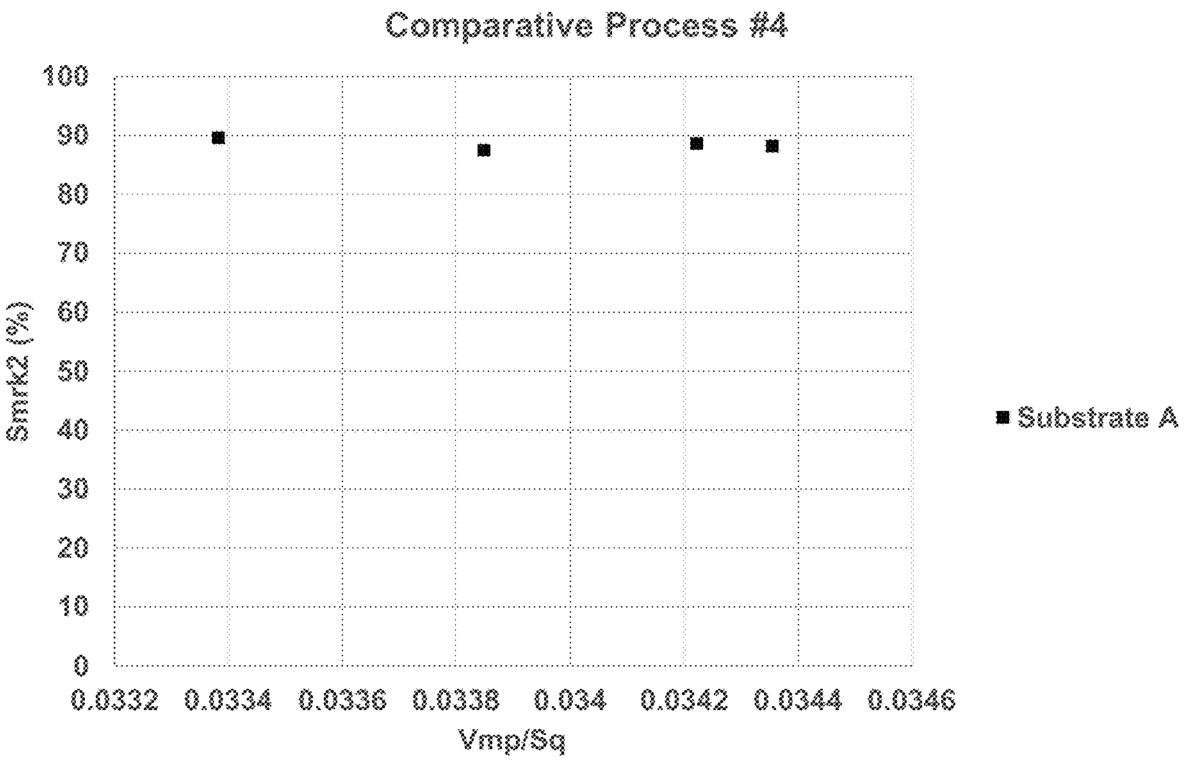
FIG. 11 is a scatter plot of Smrk2 vs. Vmp/Sq showing only the Comp. Process #4 samples of FIG. 7A broken down by substrate type.
Figure 12:
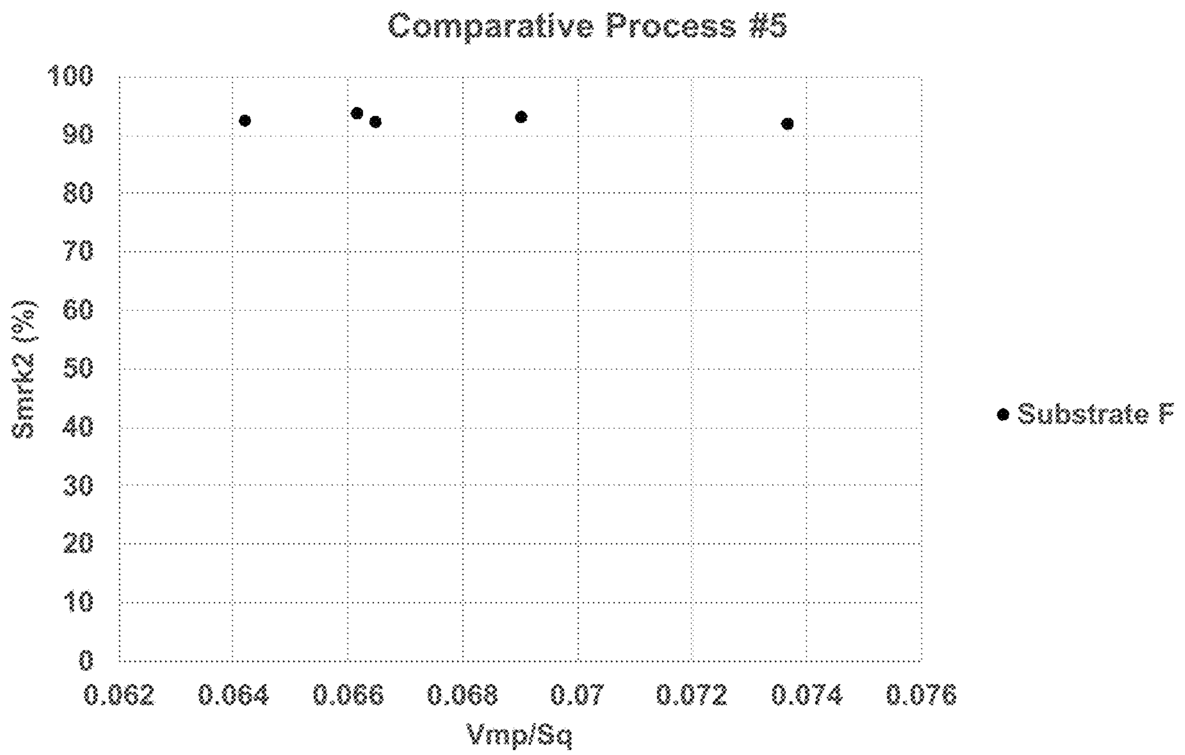
FIG. 12 is a scatter plot of Smrk2 vs. Vmp/Sq showing only the Comp. Process #5 samples of FIG. 7A broken down by substrate type.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

Where a range of numerical values is recited herein, comprising upper and lower values, unless otherwise stated in specific circumstances, the range is intended to include the endpoints thereof, and all integers and fractions within the range. Further, when an amount, concentration, or other value or parameter is given as a range, one or more ranges, or a list of upper values and lower values, this is to be understood as specifically disclosing all ranges formed from any pair of any upper range limit or value and any lower range limit or value, regardless of whether such pairs are separately disclosed.

If the term "about" is used in describing a value or an end-point of a range, the disclosure should be understood to include the specific value or end-point referred to. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation.

"Transmission haze" and "haze" are used interchangeably to refer to the percentage of transmitted light scattered outside an angular cone of about ±2.50 in accordance with ASTM (American Society for Testing and Materials) D1003-21, entitled "Standard Test Method for Haze and Luminous Transmittance of Transparent Plastics," the contents of which are incorporated by reference herein in their entirety. For an optically smooth surface, transmission haze is generally close to zero. High levels of haze are typically correlated with a decrease in display resolution or display contrast ratio due to high levels of scattering in reflection. However, various levels of haze, including high haze or low haze, may be desired for certain applications, and the methods disclosed herein can produce textured articles herein having various haze levels. According to some aspects, the textured articles disclosed herein can have a haze of less than 70%, less than 10%, or any other haze value disclosed elsewhere herein.

"Transmittance" is defined as the percentage of incident optical power within a given wavelength range transmitted through a material (e.g., the article, the substrate or the optical film or portions thereof). The terms "transmittance" and "transmission" are used interchangeably herein with no difference in meaning intended unless otherwise clear from context. Unless otherwise specified, all transmittance values herein were measured using a BYK Haze Gard with CIE Standard Illuminant A as the light source.

"Sparkle" and "dazzle" are used interchangeably to refer to an optical effect caused at least in part by surface roughening. Display "sparkle" is generally (though not always) an undesirable side effect that can occur when introducing antiglare or light scattering surfaces into a pixelated display system such as, for example, an LCD, an OLED, touch screens, or the like, and differs in type and origin from the type of "sparkle" or "speckle" that has been observed and characterized in projection or laser systems. Sparkle is associated with a very fine grainy appearance of the display and may appear to have a shift in the pattern of the grains with changing viewing angle of the display. Display sparkle may be manifested as bright and dark or colored spots at approximately the pixel-level size scale. The effect originates from pixel focusing and defocusing caused by surface depressions, asperities or bumps that act as microscopic lenses. It is typically quantified using the pixel power deviation ($PPD_{140}$). In this regard, "sparkle" is used interchangeably with "pixel power deviation" and "$PPD_{140}$." $PPD_{140}$ is calculated by image analysis of display pixels according to the following procedure. A grid box is drawn around each LCD pixel. The total power within each grid box is then calculated from charge-coupled device (CCD) camera data and assigned as the total power for each pixel. The total power for each LCD pixel thus becomes an array of numbers, for which the mean and standard deviation may be calculated. The $PPD_{140}$ value is defined as the standard deviation of total power per pixel divided by the mean power per pixel (times 100). The total power collected from each LCD pixel by the eye simulator camera is measured and the standard deviation of total pixel power ($PPD_{140}$) is calculated across the measurement area, which typically comprises about 30×30 LCD pixels. The details of a measurement system and image processing calculation that are used to obtain $PPD_{140}$ values are described in U.S. Pat. No. 9,411,180 entitled "Apparatus and Method for Determining Sparkle," the salient portions of which that are related to PPD measurements are incorporated by reference herein in their entirety. Further, unless otherwise noted, the SMS-1000 system (Display-Messtechnik & Systeme GmbH & Co. KG) is employed to generate and evaluate the $PPD_{140}$ measurements of this disclosure. The $PPD_{140}$ measurement system includes: a pixelated source comprising a plurality of pixels (e g., a Lenovo Z50 140 ppi laptop), wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices m and n; and a diaphragm disposed on the optical path between the pixelated source and the imaging device, wherein the diaphragm has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion. As used herein, all "$PPD_{140}$" and "sparkle" values, attributes and limits are calculated and evaluated with a test setup employing a display device having a pixel density of 140 pixels per inch (PPI) (also referred herein as "$PPD_{140}$") as measured at an incident angle of 0 degrees.

"Distinctness of image" or "DOI" is measured according to ASTM D5767-18, entitled "Standard Test Method for Instrumental Measurement of Distinctness-of-Image (DOI) Gloss of Coated Surfaces using a Rhopoint IQ Gloss Haze & DOI Meter" (Rhopoint Instruments Ltd.), and is a metric that quantifies the degree of blurring of reflected images off of rough surfaces. DOI can be calculated by taking the ratio of the reflected light intensity off of the rough surface at +0.3° away from the specular direction to the specular reflectance. The value of DOI can be measured in a "coupled" or "uncoupled" manner. For example, when measured in a "coupled" manner, the DOI can change significantly when the sample under test is coupled to a piece of absorbing material using index-matching fluid such as baby oil to prevent back-reflections. There is a correlation between coupled and uncoupled values, such that if one value is provided the other can be calculated. Unless otherwise specified, the DOI is measured herein and reported as "uncoupled" values.

"Vmp," "Sq," "Smrk2," and "Sdq" are structural properties of a surface. Vmp, Sq, and Sdq are measured according to ISO (International Organization for Standards) 25178-2:2012, and Smrk2 is measured according to ISO 25178-2:2021. Unless otherwise stated, all such values reported herein are measured by analyzing the surface with a Zygo NewView™ surface profiler and are calculated using MountainsMap™ software, though any commercially available surface profilers and software are capable of measuring and calculating Vmp, Sq, Smrk2, and Sdq. Vmp/Sq can be calculated by division.

"Vmp" is the "material volume of peaks" and, without wishing to be bound by theory, is believed to be an indicator of wear resistance, as it represents the material volume above 10% surface coverage. According to polishing theory, the applied frictive energy (Normal force*COF*sliding distance) corresponds to the volume of surface material removed. Assuming that the higher elevation surface asperities are those in contact, then a higher Vmp would indicate that a greater amount of frictive energy is required to wear down the surface to the 10% material ratio.

"Sq" is the "root mean square height of the surface" and generally is a commonly used parameter describing the heights or amplitudes of the surface. It can help to represent an overall measure of the texture on a surface, and is equivalent to the standard deviation of the height distribution of the surface.

"Vmp/Sq" is calculated by dividing Vmp by Sq.

"Smrk2," also known as "Smr2," is the "surface bearing area ratio" and generally is the percent of the measurement area that comprises the deeper valley structures for a textured surface and is associated with another surface parameter Svk (see ISO 25178-2:2021). More technically, it is generally the material ratio (Smr) along the material ratio curve at the height denoted by Svk.

"Sdq" is the "root mean square gradient of the surface" and, without wishing to be bound by theory, is believed to be indicative of wear since it correlates to the slope or gradient of the textured surface and locations with higher slopes experience greater wear severity due to the higher contact pressures experienced. This higher pressure from lateral forces generally is what may cause surfaces with higher Sdq to result in higher nominal coefficients of friction (COF).

"Average maximum lateral dimension" of depressions means the average maximum dimension of a depression in the direction parallel to the primary surface of the substrate containing the textured region. The average is generally calculated automatically using commercial software that accompanies a surface analysis instrument. The instrument/software sums the maximum lateral dimension of a representative number of depressions and then divides that sum by the total number of the depressions in that representative sample.

"Average maximum depth" of depressions means the average maximum depth of a depression in the direction perpendicular to the primary surface of the substrate containing the textured region. The average is generally calculated automatically using commercial software that accompanies a surface analysis instrument. The instrument/software sums the maximum depth of a representative number of depressions and then divides that sum by the total number of the depressions in that representative sample.

"Random," randomly," or similar terms, with respect to placement of depressions on a textured surface or pinholes in a photomask, may include true random placements or pseudo random placements. A true random placement may be based, for example, on a randomizing process that relies on randomness inherent in noise from a noise generator or in fluctuations in atmospheric pressure. A pseudo random placement may be based, for example, according to mathematical sequence and/or dependent on user selection that intends to place random depressions. "Random" is to be distinguished, for example, from an orderly placement of depressions, such as in a grid and/or lines.

Articles with antiglare properties are desirable in consumer electronics and automotive markets. To create the antiglare effect, an article surface, such as a cover glass, is typically roughened so that reflected light from a bright scene is scattered away from the specular direction. A widely-used glass roughening process is sandblast-and-HF-etch (SBE), which produces low distinctness of image surfaces with reasonable sparkle (PPD). However, such antiglare surfaces are susceptible to damage from scratching, particularly when employed in high touch applications such as in laptops, tablets, and smartphones, due to the presence of scratch-causing fingerprint debris as well as a lack of a suitable surface structure for mitigating scratching.

Disclosed herein are textured articles comprising unique surface structures as characterized by Vmp, Sq, Vmp/Sq, Smrk2, Sdq, or any combination thereof that, in some aspects, are abrasion resistant while possessing desirable optical properties, such as antiglare, distinctness of image, sparkle, transmittance, and/or haze. For example, the figures herein, including FIGS. 1-12, demonstrate the unique structural properties of the textured articles disclosed herein as compared to several known antiglare surfaces.

In some aspects, the textured articles disclosed herein are fabricated with a photolithography and surface removal (e.g., etch) process and are resistant to scratches from small particle abrasion. In some aspects, the size, roughness, and density of the surface features are also designed to have good antiglare performance that meet requirements that are desired in the industry. In some aspects, the textured articles disclosed herein comprise randomly placed depressions (or pits) with smooth edges/walls, as well as troughs with equal or substantially similar depths.

Without wishing to be bound by theory, it is believed that the textured articles disclosed herein have good abrasion resistance at least in part due to the structural features and/or method of making, particularly as compared to textured articles prepared using known processes such as SBE. For example, in SBE, sand is bombarded against a substrate surface, causing pits and/or cracks that can have varying depths, including relatively deep pits/cracks, due to the initially formed pits/cracks being further bombarded with additional sand. When such pits are subsequently etched, particularly the relatively deeper pits/cracks, the resulting depressions can have steep walls (i.e., high slope). When such a surface with steep-walled depressions is employed in high touch applications, such as a touchscreen display on a phone or tablet, debris (e.g., small abrasive particles like dust, dirt, sand, etc.) present on the surface or on a user's fingertip or stylus are moved across the surface. When such debris comes into contact with a high slope wall of a depression, the debris contacts the wall at an angle such that a larger force component is directed more normal to the wall surface than if the wall had a lower slope, thereby causing abrasive damage. In contrast, the textured articles disclosed herein generally have lower sloped walls due, at least in part, to the surface structure resulting from the method of making. As described elsewhere herein, pinholes through a stop layer on a substrate surface are used to create seed depressions through the stop layer pinholes via a removal step (e.g., chemical etching). The stop layer is then removed and the substrate surface subjected to an additional removal step (e.g., chemical etching). This process generally results in a surface structure with relatively uniform depths, especially compared to processes like SBE, and the depths can be controlled to result in a surface with desired structural features (e.g., lower sloped walls and other structural features represented by Vmp, Sdq, Sq, Vmp/Sq, Smrk2, and so forth). When debris is moved across such a surface, e.g., with a fingertip, the structural features are such that the debris contacts the structures with a force component that is less normal to the wall surfaces as compared to other types of antiglare surfaces (e.g., prepared by SBE), thereby imparting abrasive resistance. Moreover, such abrasion resistant textured articles still have desired optical properties, such as antiglare, DOI, haze, transmittance, $PPD_{140}$, that can be tuned as desired, as demonstrated by the Examples herein.

In some aspects, disclosed is a textured article comprising a substrate comprising a textured region defined on a primary surface of the substrate. The textured region of such a textured article can have any of the structural and/or optical properties disclosed herein.

In some aspects, the textured articles herein comprise a textured region having any one or more of Vmp, Sq, Vmp/Sq, Smrk2, and Sdq. For example, any combination thereof can be formed, including Vmp/Sq and Smrk2, as well as Vmp and Sdq. Other combinations are also contemplated, such as Vmp and Smrk2; Sq and Smrk2; Sq and Smrk2; Sq and Sdq; Vmp, Sq, and Smrk2; Vmp/Sq, Sdq, and Smrk2; and so forth.

In some aspects, disclosed is a textured article comprising a substrate comprising a textured region defined on a primary surface of the substrate, in which the textured region comprises, as measured according to ISO 25178-2:2012 (Vmp, Sq, Sdq) or ISO 25178-2:2021 (Smrk2):

(a) Vmp/Sq of at least 0.084;
(b) Vmp/Sq of at least 0.09;
(c) Sdq of 0-0.1 and Vmp of at least 10 nm;
(d) Sdq of 0-0.1 and Vmp of at least 14 nm;
(e) Sdq of at least 0.0045 and 0.1 or less and Vmp of at least 10 nm;
(f) Sdq of at least 0.0045 and 0.1 or less and Vmp of at least 14 nm;
(g) Smrk2 of at least 90% and Vmp/Sq of at least 0.084;
(h) Smrk2 of at least 92% and Vmp/Sq of at least 0.084;
(i) depressions having a density of 0.005-0.015 depressions/$\mu m^2$;
(j) depressions having an average maximum lateral dimension of between 5-50 microns;
(k) depression having an average maximum depth of 15-2500 nm;
(l) depressions having an average maximum depth, in which at least 90% of the depressions have maximum depths within 10% of the average maximum depth; or
(m) any combination thereof.

In some aspects, any of such textured articles with textured regions characterized by any one or more of (a)-(m) set forth above, or any other Vmp, Sq, Vmp/Sq, Sdq, and/or Smrk2 disclosed elsewhere herein, has any one or more of the following optical properties:

(1) $PPD_{140}$ of 3.7% or less at an incident angle of 0 degrees;
(2) $PPD_{140}$ of 3.5% or less at an incident angle of 0 degrees;
(3) $PPD_{140}$ of 3% or less at an incident angle of 0 degrees;
(4) uncoupled DOI of 80% or less as measured according to ASTM D 5767-18;
(5) uncoupled DOI of 60% or less as measured according to ASTM D 5767-18;
(6) haze of 70% or less as measured according to ASTM D 1003-21;
(7) haze of 45% or less as measured according to ASTM D 1003-21;
(8) haze of 10% or less as measured according to ASTM D 1003-21;
(9) $PPD_{140}$ of 3.7% or less (or 3.5% or less) at an incident angle of 0 degrees, uncoupled DOI of 80% or less as measured according to ASTM D 5767-18, and haze of 10% or less as measured according to ASTM D 1003-21;
(10) $PPD_{140}$ of 3.5% or less (or 3% or less) at an incident angle of 0 degrees, uncoupled DOI of 60% or less as measured according to ASTM D 5767-18, and haze of 70% or less (or 45% or less) as measured according to ASTM D 1003-21;
(11) transmittance of at least 90%; or
(12) any combination thereof.

In some aspects, a textured region of a textured article can have any suitable Vmp/Sq. In some aspects, the Vmp/Sq can be at least: 0.084, 0.085, 0.09, 0.095, 0.1, 0.105, 0.11, 0.115, 0.12, 0.125, 0.13, 0.135, 0.14, 0.145, or 0.15; alternatively, or additionally, the Vmp/Sq can be: 0.15, 0.145, 0.14, 0.135, 0.13, 0.125, 0.12, 0.115, 0.11, 0.105, 0.1, 0.095, 0.09, 0.085 or less. For clarity, any two of the foregoing open-ended ranges can be combined to form a closed range. For example, in some aspects, the Vmp/Sq is 0.084-0.15, 0.084-0.145, 0.084-0.14, 0.084-0.135, 0.084-0.13, 0.084-0.125, 0.084-0.12, 0.084-0.115, 0.084-0.11, 0.084-0.105, 0.084-0.1, 0.084-0.095, 0.084-0.09, 0.084-0.085, 0.085-0.15, 0.085-0.145, 0.085-0.14, 0.085-0.135, 0.085-0.13, 0.085-0.125, 0.085-0.12, 0.085-0.115, 0.085-0.11, 0.085-0.105, 0.085-0.1, 0.085-0.095, 0.085-0.09, 0.09-0.15, 0.09-0.145, 0.09-0.14, 0.09-0.135, 0.09-0.13, 0.09-0.125, 0.09-0.12, 0.09-0.115, 0.09-0.11, 0.09-0.105, 0.09-0.1, 0.09-0.095, 0.095-0.15, 0.095-0.145, 0.095-0.14, 0.095-0.135, 0.095-0.13, 0.095-0.125, 0.095-0.12, 0.095-0.115, 0.095-0.11, 0.095-0.105, 0.095-0.1, 0.1-0.15, 0.1-0.145, 0.1-0.14, 0.1-0.135, 0.1-0.13, 0.1-0.125, 0.1-0.12, 0.1-0.115, 0.1-0.11, 0.1-0.105, 0.105-0.15, 0.105-0.145, 0.105-0.14, 0.105-0.135, 0.105-0.13, 0.105-0.125, 0.105-0.12, 0.105-0.115, 0.105-0.11, 0.11-0.15, 0.11-0.145, 0.11-0.14, 0.11-0.135, 0.11-0.13, 0.11-0.125, 0.11-0.12, 0.11-0.115, 0.115-0.15, 0.115-0.145, 0.115-0.14, 0.115-0.135, 0.115-0.13, 0.115-0.125, 0.115-0.12, 0.12-0.15, 0.12-0.145, 0.12-0.14, 0.12-0.135, 0.12-0.13, 0.12-0.125, 0.125-0.15, 0.125-0.145, 0.125-0.14, 0.125-0.135, 0.125-0.13, 0.13-0.15, 0.13-0.145, 0.13-0.14, 0.13-0.135, 0.135-0.15, 0.135-0.145, 0.135-0.14, 0.14-0.15, 0.14-0.145, or 0.145-0.15. It is specifically contemplated that Vmp/Sq can be in combination with Smrk2, or any other feature or combination disclosed herein (e.g., Sq, Sdq, $PPD_{140}$, uncoupled DOI, haze, transmittance, density of depressions, average maximum depth of depressions, average maximum lateral dimension of depressions, X % of depressions within Y % of the average maximum depth, or any combination thereof).

In some aspects, a textured region of a textured article can have any suitable Smrk2. In some aspects, the Smrk2 can be at least: 68%, 70%, 75%, 80%, 85%, 90%, 92%, 94%, 96%, 98%, or 99%; alternatively, or additionally, the Smrk2 can be: 100%, 99%, 98%, 96%, 94%, 92%, 90%, 85%, 80%, 75%, or 70% or less. For clarity, any two of the foregoing open-ended ranges can be combined to form a closed range. For example, in some aspects, the Smrk2(%) can be 68-100, 68-99, 68-98, 68-96, 68-94, 68-92, 68-90, 68-85, 68-80, 68-75, 68-70, 70-100, 70-99, 70-98, 70-96, 70-94, 70-92, 70-90, 70-85, 70-80, 70-75, 75-100, 75-99, 75-98, 75-96, 75-94, 75-92, 75-90, 75-85, 75-80, 80-100, 80-99, 80-98, 80-96, 80-94, 80-92, 80-90, 80-85, 85-100, 85-999, 85-98, 85-96, 85-94, 85-92, 85-90, 90-100, 90-99, 90-98, 90-96, 90-94, 90-92, 92-100, 92-99, 92-98, 92-96, 92-94, 94-100, 94-99, 94-98, 94-96, 96-100, 96-99, 96-98, 98-100, 98-99, or 99-100. It is specifically contemplated that Smrk2 can be in combination with Vmp/Sq, or any other feature or combination disclosed herein (e.g., Sq, Vmp, Sdq, $PPD_{140}$, uncoupled DOI, haze, transmittance, density of depressions, average maximum depth of depressions, average maximum lateral dimension of depressions, X % of depressions within Y % of the average maximum depth, or any combination thereof).

In some aspects, a textured region of a textured article can have any suitable Vmp. In some aspects, the Vmp (nm) can be at least: 8, 10, 12, 14, 16, 18, 20, 22, 24, 26, 28, 30, 32, 34, 36, 38, 40, 42, or 44; alternatively, or additionally, the Vmp (nm) can be: 46, 44, 42, 40, 38, 36, 34, 32, 30, 28, 26, 24, 22, 20, 18, 16, 14, 12, or 10 or less. For clarity, any two of the foregoing open-ended ranges can be combined to form a closed range. For example, in some aspects, the Vmp (nm) can be 8-46, 8-44, 8-42, 8-40, 8-38, 8-36, 8-34, 8-32, 8-30, 8-28, 8-26, 8-24, 8-22, 8-20, 8-18, 8-16, 8-14, 8-12, 8-10, 10-46, 10-44, 10-42, 10-40, 10-38, 10-36, 10-34, 10-32, 10-30, 10-28, 10-26, 10-24, 10-22, 10-20, 10-18, 10-16, 10-14, 10-12, 12-46, 12-44, 12-42, 12-40, 12-38, 12-36, 12-34, 12-32, 12-30, 12-28, 12-26, 12-24, 12-22, 12-20, 12-18, 12-16, 12-14, 14-46, 14-44, 14-42, 14-40, 14-38, 14-36, 14-34, 14-32, 14-30, 14-28, 14-26, 14-24, 14-22, 14-20, 14-18, 14-16, 16-46, 16-44, 16-42, 16-40, 16-38, 16-36, 16-34, 16-32, 16-30, 16-28, 16-26, 16-24, 16-22, 16-20, 16-18, 18-46, 18-44, 18-42, 18-40, 18-38, 18-36, 18-34, 18-32, 18-30, 18-28, 18-26, 18-24, 18-22, 18-20, 20-46, 20-44, 20-42, 20-40, 20-38, 20-36, 20-34, 20-32, 20-30, 20-28, 20-26, 20-24, 20-22, 22-46, 22-44, 22-42, 22-40, 22-38, 22-36, 22-34, 22-32, 22-30, 22-28, 22-26, 22-24, 24-46, 24-44, 24-42, 24-40, 24-38, 24-36, 24-34, 24-32, 24-30, 24-28, 24-26, 26-46, 26-44, 26-42, 26-40, 26-38, 26-36, 26-34, 26-32, 26-30, 26-28, 28-46, 28-44, 28-42, 28-40, 28-38, 28-36, 28-34, 28-32, 28-30, 30-46, 30-44, 30-42, 30-40, 30-38, 30-36, 30-34, 30-32, 32-46, 32-44, 32-42, 32-40, 32-38, 32-36, 32-34, 34-46, 34-44, 34-42, 34-40, 34-38, 34-36, 36-46, 36-44, 36-42, 36-40, 36-38, 38-46, 38-44, 38-42, 38-40, 40-46, 40-44, 40-42, 42-46, 42-44, or 44-46. It is specifically contemplated that Vmp can be in combination with Sdq, or any other feature or combination disclosed herein (e.g., Sq, Vmp/Sq, Smrk2, $PPD_{140}$, uncoupled DOI, haze, transmittance, density of depressions, average maximum depth of depressions, average maximum lateral dimension of depressions, X % of depressions within Y % of the average maximum depth, or any combination thereof).

In some aspects, a textured region of a textured article can have any suitable Sdq. In some aspects, the Sdq can be at least: 0, 0.0045, 0.005, 0.01, 0.02, 0.03, 0.04, 0.05, 0.06, 0.06, 0.08, 0.09, 0.1, 0.11, 0.12, 0.13, 0.14, 0.15, 0.2, 0.25, 0.3, 0.35, 0.4, 0.5, 0.6, 0.7, 0.8, 0.9, or 1; alternatively, or additionally, the Sdq can be: 1, 0.9, 0.8, 0.7, 0.6, 0.5, 0.4, 0.35, 0.3, 0.25, 0.2, 0.15, 0.14, 0.13, 0.12, 0.11, 0.1, 0.09, 0.08, 0.07, 0.06, 0.05, 0.04, 0.03, 0.02, 0.01, 0.005, or 0.0045 or less. For clarity, any two of the foregoing open-ended ranges can be combined to form a closed range. For example, in some aspects, the Sdq can be 0-1, 0-0.8, 0-0.6, 0-0.4, 0-0.35, 0-0.3, 0-0.25, 0-0.2, 0-0.15, 0-0.14, 0-0.13, 0-0.12, 0-0.11, 0-0.1, 0-0.09, 0-0.08, 0-0.07, 0-0.06, 0-0.05, 0-0.04, 0-0.03, 0-0.02, 0-0.01, 0-0.005, 0-0.0045, 0.0045-1, 0.0045-0.8, 0.0045-0.6, 0.0045-0.4, 0.0045-0.35, 0.0045-0.3, 0.0045-0.25, 0.0045-0.2, 0.0045-0.15, 0.0045-0.14, 0.0045-0.13, 0.0045-0.12, 0.0045-0.11, 0.0045-0.1, 0.0045-0.09, 0.0045-0.08, 0.0045-0.07, 0.0045-0.06, 0.0045-0.05, 0.0045-0.04, 0.0045-0.03, 0.0045-0.02, 0.0045-0.01, 0.0045-0.005, 0.005-1, 0.005-0.8, 0.005-0.6, 0.005-0.4, 0.005-0.35, 0.005-0.3, 0.005-0.25, 0.005-0.2, 0.005-0.15, 0.005-0.14, 0.005-0.13, 0.005-0.12, 0.005-0.11, 0.005-0.1, 0.005-0.09, 0.005-0.08, 0.005-0.07, 0.005-0.06, 0.005-0.05, 0.005-0.04, 0.005-0.03, 0.005-0.02, 0.005-0.01, 0.01-1, 0.01-0.8, 0.01-0.6, 0.01-0.4, 0.01-0.35, 0.01-0.3, 0.01-0.35, 0.01-0.3, 0.01-0.25, 0.01-0.2, 0.01-0.15, 0.01-0.14, 0.01-0.13, 0.01-0.12, 0.01-0.11, 0.01-0.1, 0.01-0.09, 0.01-0.08, 0.01-0.07, 0.01-0.06, 0.01-0.05, 0.01-0.04, 0.01-0.03, 0.01-0.02, 0.02-1, 0.02-0.8, 0.02-0.6, 0.02-0.4, 0.02-0.35, 0.02-0.3, 0.02-0.25, 0.02-0.2, 0.02-0.15, 0.02-0.1, 0.02-0.09, 0.02-0.08, 0.02-0.07, 0.02-0.06, 0.02-0.05, 0.02-0.04, 0.02-0.03, 0.03-1, 0.03-0.8, 0.03-0.6, 0.03-0.4, 0.03-0.35, 0.03-0.3, 0.03-0.25, 0.03-0.2, 0.03-0.15, 0.03-0.14, 0.03-0.13, 0.03-0.12, 0.03-0.11, 0.03-0.1, 0.03-0.09, 0.03-0.08, 0.03-0.07, 0.03-0.06, 0.03-0.05, 0.03-0.04, 0.04-1, 0.04-0.8, 0.04-0.6, 0.04-0.4, 0.04-0.35, 0.04-0.3, 0.04-0.25, 0.04-0.2, 0.04-0.15, 0.04-0.14, 0.04-0.13, 0.04-0.12, 0.04-0.11, 0.04-0.1, 0.04-0.09, 0.04-0.08, 0.04-0.07, 0.04-0.06, 0.04-0.05, 0.05-1, 0.05-0.8, 0.05-0.6, 0.05-0.4, 0.05-0.35, 0.05-0.3, 0.05-0.25, 0.05-0.2, 0.05-0.15, 0.05-0.1, 0.05-0.09, 0.05-0.08, 0.05-0.07, 0.05-0.06, 0.06-1, 0.06-0.8, 0.06-0.6, 0.06-0.4, 0.06-0.35, 0.06-0.3, 0.06-0.25, 0.06-0.2, 0.06-0.15, 0.06-0.1, 0.06-0.09, 0.06-0.08, 0.06-0.07, 0.07-1, 0.07-0.8, 0.07-0.6, 0.07-0.4, 0.07-0.35, 0.07-0.3, 0.07-0.25, 0.07-0.2, 0.07-0.15, 0.07-0.1, 0.07-0.09, 0.07-0.08, 0.08-1, 0.08-0.8, 0.08-0.6, 0.08-0.4, 0.08-0.35, 0.08-0.3, 0.08-0.25, 0.08-0.2, 0.08-0.15, 0.08-0.1, 0.08-0.09, 0.09-1, 0.09-0.8, 0.09-0.6, 0.09-0.4, 0.09-0.35, 0.09-0.3, 0.09-0.25, 0.09-0.2, 0.09-0.15, 0.09-0.14, 0.09-0.13, 0.09-0.12, 0.09-0.11, 0.09-0.1, 0.1-1, 0.1-0.8, 0.1-0.6, 0.1-0.4, 0.1-0.35, 0.1-0.3, 0.1-0.25, 0.1-0.2, 0.1-0.15, 0.15-1, 0.15-0.8, 0.15-0.6, 0.15-0.4, 0.15-0.35, 0.15-0.3, 0.15-0.25, 0.15-0.2, 0.2-1, 0.2-0.8, 0.2-0.6, 0.2-0.4, 0.2-0.35, 0.2-0.3, 0.2-0.25, 0.25-1, 0.25-0.8, 0.25-0.6, 0.25-0.4, 0.25-0.35, 0.25-0.3, 0.3-1, 0.3-0.8, 0.3-0.6, 0.3-0.4, 0.3-0.35, 0.35-1, 0.35-0.8, 0.35-0.6, 0.35-0.4, 0.4-1, 0.4-0.8, 0.4-0.6, 0.6-1, 0.6-0.8, or 0.8-1. It is specifically contemplated that Sdq can be in combination with Vmp, or any other feature or combination disclosed herein (e.g., Sq, Vmp/Sq, Smrk2, $PPD_{140}$, uncoupled DOI, haze, transmittance, density of depressions, average maximum depth of depressions, average maximum lateral dimension of depressions, X % of depressions within Y % of the average maximum depth, or any combination thereof).

In some aspects, a textured region of a textured article can have any suitable $PPD_{140}$ as measured at an incident angle of 0 degrees. In some aspects, the $PPD_{140}$(%) can be at least: 0.1, 0.5, 1, 1.5, 2, 2.5, 3, 3.1, 3.2, 3.3, 3.4, 3.5, 3.6, 3.7, 3.8, 3.9, 4, 4.5, 5, 5.5, 6, 6.5, or 7; alternatively, or additionally, the $PPD_{140}$(%) can be: 7, 6.5, 6, 5.5, 5, 4.5, 4, 3.9, 3.8, 3.7, 3.6, 3.5, 3.4, 3.3, 3.2, 3.1, 3, 2.5, 2, 1.5, 1, 0.5, or 0.1 or less. For clarity, any two of the foregoing open-ended ranges can be combined to form a closed range. For example, in some aspects, the $PPD_{140}$(%) can be 0.1-7, 0.1-6, 0.1-5, 0.1-4.5, 0.1-4, 0.1-3.9, 0.1-3.8, 0.1-3.7, 0.1-3.6, 0.1-3.5, 0.1-3.4, 0.1-3.3, 0.1-3.2, 0.1-3.1, 0.1-3, 0.1-2.8, 0.1-2.6, 0.1-2.5, 0.1-2.4, 0.1-2.2, 0.1-2, 0.1-1.5, 0.1-1, 0.1-0.5, 0.5-7, 0.5-6, 0.5-5, 0.5-4.5, 0.5-4, 0.5-3.9, 0.5-3.8, 0.5-3.7, 0.5-3.6, 0.5-3.5, 0.5-3.4, 0.5-3.3, 0.5-3.2, 0.5-3.1, 0.5-3, 0.5-2.8, 0.5-2.6, 0.5-2.5, 0.5-2.4, 0.5-2.2, 0.5-2, 0.5-1.5, 0.5-1, 1-7, 1-6, 1-5, 1-4.5, 1-4, 1-3.9, 1-3.8, 1-3.7, 1-3.6, 1-3.5, 1-3.4, 1-3.3, 1-3.2, 1-3.1, 1-3, 1-2.8, 1-2.6, 1-2.5, 1-2.4, 1-2.2, 1-2, 1-1.5, 1.5-7, 1.5-6, 1.5-5, 1.5-4.5, 1.5-4, 1.5-3.9, 1.5-3.8, 1.5-3.7, 1.5-3.6, 1.5-3.5, 1.5-3.4, 1.5-3.3, 1.5-3.2, 1.5-3.1, 1.5-3, 1.5-2.8, 1.5-2.6, 1.5-2.5, 1.5-2.4, 1.5-2.2, 1.5-2, 2-7, 2-6, 2-5, 2-4.5, 2-4, 2-3.9, 2-3.8, 2-3.7, 2-3.6, 2-3.5, 2-3.4, 2-3.3, 2-3.2, 2-3.1, 2-3, 2-2.8, 2-2.6, 2-2.5, 2-2.4, 2-2.2, 2.2-7, 2.2-6, 2.2-5, 2.2-4.5, 2.2-4, 2.2-3.9, 2.2-3.8, 2.2-3.7, 2.2-3.6, 2.2-3.5, 2.2-3.4, 2.2-3.3, 2.2-3.2, 2.2-3.1, 2.2-3, 2.2-2.8, 2.2-2.6, 2.2-2.5, 2.2-2.4, 2.4-7, 2.4-6, 2.4-5, 2.4-4.5, 2.4-4, 2.4-3.9, 2.4-3.8, 2.4-3.7, 2.4-3.6, 2.4-3.5, 2.4-3.4, 2.4-3.3, 2.4-3.2, 2.4-3.1, 2.4-3, 2.4-2.8, 2.4-2.6, 2.4-2.5, 2.5-7, 2.5-6, 2.5-5, 2.5-4.5, 2.5-4, 2.5-3.9, 2.5-3.8, 2.5-3.7, 2.5-3.6, 2.5-3.5, 2.5-3.4, 2.5-3.3, 2.5-3.2, 2.5-3.1, 2.5-3, 2.5-2.8, 2.5-2.6, 2.6-7, 2.6-6, 2.6-5, 2.6-4.5, 2.6-4, 2.6-3.9, 2.6-3.8, 2.6-3.7, 2.6-3.6, 2.6-3.5, 2.6-3.4, 2.6-3.3, 2.6-3.2, 2.6-3.1, 2.6-3, 2.6-2.8, 2.8-7, 2.8-6, 2.8-5, 2.8-4.5, 2.8-4, 2.8-3.9, 2.8-3.8, 2.8-3.7, 2.8-3.6, 2.8-3.5, 2.8-3.4, 2.8-3.3, 2.8-3.2, 2.8-3.1, 2.8-3, 3-7, 3-6, 3-5, 3-4.5, 3-4, 3-3.9, 3-3.8, 3-3.7, 3-3.6, 3-3.5, 3-3.4, 3-3.3, 3-3.2, 3-3.1, 3.1-7, 3.1-6, 3.1-5, 3.1-4.5, 3.1-4, 3.1-3.9, 3.1-3.8, 3.1-3.7, 3.1-3.6, 3.1-3.5, 3.1-3.4, 3.1-3.3, 3.1-3.2, 3.2-7, 3.2-6, 3.2-5, 3.2-4.5, 3.2-4, 3.2-3.9, 3.2-3.8, 3.2-3.7, 3.2-3.6, 3.2-3.5, 3.2-3.4, 3.2-3.3, 3.3-7, 3.3-6, 3.3-5, 3.3-4.5, 3.3-4, 3.3-3.9, 3.3-3.8, 3.3-3.7, 3.3-3.6, 3.3-3.5, 3.3-3.4, 3.4-7, 3.4-6, 3.4-5, 3.4-4.5, 3.4-4, 3.4-3.9, 3.4-3.8, 3.4-3.7, 3.4-3.6, 3.4-3.5, 3.5-7, 3.5-6, 3.5-5, 3.5-4.5, 3.5-4, 3.5-3.9, 3.5-3.8, 3.5-3.7, 3.5-3.6, 3.6-7, 3.6-6, 3.6-5, 3.6-4.5, 3.6-4, 3.6-3.9, 3.6-3.8, 3.6-3.7, 3.7-7, 3.7-6, 3.7-5, 3.7-4.5, 3.7-4, 3.7-3.9, 3.7-3.8, 3.8-7, 3.8-6, 3.8-5, 3.8-4.5, 3.8-4, 3.8-3.9, 3.9-7, 3.9-6, 3.9-5, 3.9-4.5, 3.9-4, 4-7, 4-6, 4-5, 4-4.5, 4.5-5, 5-7, 5-6.5, 5-6, 6-7, 6-6.5, or 6.5-7. It is specifically contemplated that $PPD_{140}$ can be in combination with uncoupled DOI, transmittance, and/or haze, or any other feature or combination disclosed herein (e.g., Sdq, Vmp, Smrk2, Vmp/Sq, Sq, density of depressions, average maximum depth of depressions, average maximum lateral dimension of depressions, X % of depressions within Y % of the average maximum depth, or any combination thereof).

In some aspects, a textured region of a textured article can have any suitable uncoupled DOI. In some aspects, the uncoupled DOI (%) can be at least: 20, 25, 30, 35, 40, 45, 50, 55, 60, 65, 70, 75, 80, 85, 90, or 95; alternatively, or additionally, the uncoupled DOI (%) can be: 100, 95, 90 85, 80, 75, 70, 65, 60, 55, 50, 45, 40, 35, 30, or 25 or less. For clarity, any two of the foregoing open-ended ranges can be combined to form a closed range. For example, in some aspects, the uncoupled DOI (%) can be 20-100, 20-95, 20-90, 20-85, 20-80, 20-75, 20-70, 20-65, 20-60, 20-55, 20-50, 20-45, 20-40, 20-35, 20-30, 20-25, 25-100, 25-95, 25-90, 25-85, 25-80, 25-75, 25-70, 25-65, 25-60, 25-55, 25-50, 25-45, 25-40, 25-35, 25-30, 30-100, 30-95, 30-90, 30-85, 30-80, 30-75, 30-70, 30-65, 30-60, 30-55, 30-50, 30-45, 30-40, 30-35, 35-100, 35-95, 35-90, 35-85, 35-80, 35-75, 35-70, 35-65, 35-60, 35-55, 35-50, 35-45, 35-40, 40-100, 40-95, 40-90, 40-85, 40-80, 40-75, 40-70, 40-65, 40-60, 40-55, 40-50, 40-45, 45-100, 45-95, 45-90, 45-85, 45-80, 45-75, 45-70, 45-65, 45-60, 45-55, 45-50, 50-100, 50-95, 50-90, 50-85, 50-80, 50-75, 50-70, 50-65, 50-60, 50-55, 55-100, 55-95, 55-90, 55-85, 55-80, 55-75, 55-70, 55-65, 55-60, 60-100, 60-95, 60-90, 60-85, 60-80, 60-75, 60-70, 60-65, 65-100, 65-95, 65-90, 65-85, 65-80, 65-75, 65-70, 70-100, 70-95, 70-90, 70-85, 70-80, 70-75, 75-100, 75-95, 75-90, 75-85, 75-80, 80-100, 80-95, 80-90, 80-85, 85-100, 85-95, 85-90, 90-95, or 95-100. It is specifically contemplated that uncoupled DOI can be in combination with $PPD_{140}$, transmittance, and/or haze, or any other feature or combination disclosed herein (e.g., Sdq, Vmp, Smrk2, Vmp/Sq, Sq, density of depressions, average maximum depth of depressions, average maximum lateral dimension of depressions, X % of depressions within Y % of the average maximum depth, or any combination thereof).

In some aspects, a textured region of a textured article can have any suitable haze. In some aspects, the haze (%) can be at least: 2, 5, 10, 15, 20, 25, 30, 35, 40, 45, 50, 55, 60, 65, 70, 75, or 80; alternatively, or additionally, the haze (%) can be: 80, 75, 70, 65, 60, 55, 50, 45, 40, 35, 30, 25, 20, 15, 10, 5, or 2 or less. For clarity, any two of the foregoing open-ended ranges can be combined to form a closed range. For example, in some aspects, the haze (%) can be 2-80, 2-75, 2-70, 2-65, 2-60, 2-55, 2-50, 2-45, 2-40, 2-35, 2-30, 2-25, 20, 2-15, 2-10, 2-5, 5-80, 5-75, 5-70, 5-65, 5-60, 5-55, 5-50, 5-45, 5-40, 5-35, 5-30, 5-25, 5-20, 5-15, 5-10, 10-80, 10-75, 10-70, 10-65, 10-60, 10-55, 10-50, 10-45, 10-40, 10-35, 10-30, 10-25, 10-20, 10-15, 15-80, 15-75, 15-70, 15-65, 15-60, 15-55, 15-50, 15-45, 15-40, 15-35, 15-30, 15-25, 15-20, 20-80, 20-75, 20-70, 20-65, 20-60, 20-55, 20-50, 20-45, 20-40, 20-35, 20-30, 20-25, 25-80, 25-75, 25-70, 25-65, 25-60, 25-55, 25-50, 25-45, 25-40, 25-35, 25-30, 30-80, 30-75, 30-70, 30-65, 30-60, 30-55, 30-50, 30-45, 30-40, 30-35, 35-80, 35-75, 35-70, 35-65, 35-60, 35-55, 35-50, 35-45, 35-40, 40-80, 40-75, 40-70, 40-65, 40-60, 40-55, 40-50, 40-45, 45-80, 45-75, 45-70, 45-65, 45-60, 45-55, 45-50, 50-80, 50-75, 50-70, 50-65, 50-60, 50-55, 55-80, 55-75, 55-70, 55-65, 55-60, 60-80, 60-75, 60-70, 60-65, 65-80, 65-75, 65-70, 70-80, 70-75, or 75-80. It is specifically contemplated that haze can be in combination with $PPD_{140}$, transmittance, and/or uncoupled DOI, or any other feature or combination disclosed herein (e.g., Sdq, Vmp, Smrk2, Vmp/Sq, Sq, density of depressions, average maximum depth of depressions, average maximum lateral dimension of depressions, X % of depressions within Y % of the average maximum depth, or any combination thereof).

In some aspects, a textured region of a textured article can have any suitable transmittance. In some aspects, the transmittance (%) can be at least: 80, 85, 90, 92, 94, 96, 98, 99, or 100; alternatively, or additionally, the transmittance (%) can be: 100, 99, 98, 96, 94, 92, 90, 85, or 80 or less. For clarity, any two of the foregoing open-ended ranges can be combined to form a closed range. For example, in some aspects, the transmittance (%) can be 80-100, 80-99, 80-98, 80-96, 80-94, 80-92, 80-90, 80-85, 85-100, 85-99, 85-98, 85-96, 85-94, 85-92, 85-90, 90-100, 90-99, 90-98, 90-96, 90-94, 90-92, 92-100, 92-99, 92-98, 92-96, 92-94, 94-100, 94-99, 94-98, 94-96, 96-100, 96-99, 96-98, 98-100, 98-99, or 99-100. It is specifically contemplated that transmittance can be in combination with haze, $PPD_{140}$, and/or uncoupled DOI, or any other feature or combination disclosed herein (e.g., Sdq, Vmp, Smrk2, Vmp/Sq, Sq, density of depressions, average maximum depth of depressions, average maximum lateral dimension of depressions, X % of depressions within Y % of the average maximum depth, or any combination thereof).

In some aspects, a textured region of a textured article can have any density of depressions. In some aspects, the density of depressions (depressions/$\mu m^2$) can be at least: 0.001, 0.002, 0.004, 0.005, 0.006, 0.008, 0.01, 0.012, 0.014, 0.015, 0.016, 0.018, or 0.02; alternatively, or additionally, the density of depressions (depressions/$\mu m^2$) can be: 0.02, 0.018, 0.016, 0.015, 0.014, 0.012, 0.01, 0.008, 0.006, 0.005, 0.004, 0.002, or 0.001 or less. For clarity, any two of the foregoing open-ended ranges can be combined to form a closed range. For example, in some aspects, the density of depressions (depressions/$\mu m^2$) can be 0.001-0.02, 0.001-0.018, 0.001-0.016, 0.001-0.015, 0.001-0.014, 0.001-0.012, 0.001-0.01, 0.001-0.008, 0.001-0.006, 0.001-0.005, 0.001-0.004, 0.001-0.002, 0.002-0.02, 0.002-0.018, 0.002-0.016, 0.002-0.015, 0.002-0.014, 0.002-0.012, 0.002-0.01, 0.002-0.008, 0.002-0.006, 0.002-0.005, 0.002-0.004, 0.004-0.02, 0.004-0.018, 0.004-0.016, 0.004-0.015, 0.004-0.014, 0.004-0.012, 0.004-0.01, 0.004-0.008, 0.004-0.006, 0.006-0.02, 0.006-0.018, 0.006-0.016, 0.006-0.015, 0.006-0.014, 0.006-0.012, 0.006-0.01, 0.006-0.008, 0.008-0.02, 0.008-0.018, 0.008-0.016, 0.008-0.015, 0.008-0.014, 0.008-0.012, 0.008-0.01, 0.01-0.02, 0.01-0.018, 0.01-0.016, 0.01-0.015, 0.01-0.014, 0.01-0.012, 0.012-0.02, 0.012-0.018, 0.012-0.016, 0.012-0.015, 0.012-0.014, 0.014-0.02, 0.014-0.018, 0.014-0.016, 0.014-0.015, 0.015-0.02, 0.015-0.018, 0.015-0.016, 0.016-0.02, 0.016-0.018, or 0.018-0.02. It is specifically contemplated that the density of depressions can be in combination with or any other feature or combination disclosed herein, including haze, transmittance, $PPD_{140}$, uncoupled DOI, Sdq, Vmp, Smrk2, Vmp/Sq, Sq, average maximum lateral dimensions, average maximum depth of depressions, X % of depressions within Y % of the average maximum depth, or any combination thereof.

In some aspects, a textured region of a textured article can have depressions with any suitable average maximum lateral dimension. In some aspects, the average maximum lateral dimension (μm) can be at least: 5, 10, 15, 20, 25, 30, 35, 40, 45, or 50; alternatively, or additionally, the average maximum lateral dimension (μm) can be: 50, 45, 40, 35, 30, 25, 20, 15, 10, or 5 or less. For clarity, any two of the foregoing open-ended ranges can be combined to form a closed range. For example, in some aspects, the average maximum lateral dimension (μm) can be 5-50, 5-45, 5-40, 5-35, 5-30, 5-25, 5-20, 5-15, 5-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50. It is specifically contemplated that the average maximum lateral dimension of depressions can be in combination with or any other feature or combination disclosed herein, including haze, transmittance, $PPD_{140}$, uncoupled DOI, Sdq, Vmp, Smrk2, Vmp/Sq, Sq, density of depressions, average maximum depth of depressions, X % of depressions within Y % of the average maximum depth, or any combination thereof.

In some aspects, a textured region of a textured article can have depressions with any suitable average maximum depth. In some aspects, the average maximum depth (nm) can be at least: 100, 150, 200, 300, 400, 500, 600, 700, 800, 900, 1000, 1200, 1400, 1600, 1800, 2000, 2200, 2400, or 2500; alternatively, or additionally, the average maximum depth (nm) can be: 2500, 2400, 2200, 2000, 1800, 1600, 1400, 1200, 1000, 900, 800, 700, 600, 500, 400, 300, 200, 150, or 100 or less. For clarity, any two of the foregoing open-ended ranges can be combined to form a closed range. For example, in some aspects, the average maximum depth (nm) can be 100-2500, 100-2400, 100-2200, 100-2000, 100-1800, 100-1600, 100-1400, 100-1200, 100-1000, 100-900, 100-800, 100-700, 100-600, 100-500, 100-400, 100-300, 100-200, 100-150, 150-2500, 150-2400, 150-2200, 150-2000, 150-1800, 150-1600, 150-1400, 150-1200, 150-1000, 150-900, 150-800, 150-700, 150-600, 150-500, 150-400, 150-300, 150-200, 200-2500, 200-2400, 200-2200, 200-2000, 200-1800, 200-1600, 200-1400, 200-1200, 200-1000, 200-900, 200-800, 200-700, 200-600, 200-500, 200-400, 200-300, 300-2500, 300-2400, 300-2200, 300-2000, 300-1800, 300-1600, 300-1400, 300-1200, 300-1000, 300-900, 300-800, 300-700, 300-600, 300-500, 300-400, 400-2500, 400-2400, 400-2200, 400-2000, 400-1800, 400-1600, 400-1400, 400-1200, 400-1000, 400-900, 400-800, 400-700, 400-600, 400-500, 500-2500, 500-2400, 500-2200, 500-2000, 500-1800, 500-1600, 500-1400, 500-1200, 500-1000, 500-900, 500-800, 500-700, 500-600, 600-2500, 600-2400, 600-2200, 600-2000, 600-1800, 600-1600, 600-1400, 600-1200, 600-1000, 600-900, 600-800, 600-700, 700-2500, 700-2400, 700-2200, 700-2000, 700-1800, 700-1600, 700-1400, 700-1200, 700-1000, 700-900, 700-800, 800-2500, 800-2400, 800-2200, 800-2000, 800-1800, 800-1600, 800-1400, 800-1200, 800-1000, 800-900, 900-2500, 900-2400, 900-2200, 900-2000, 900-1800, 900-1600, 900-1400, 900-1200, 900-1000, 1000-2500, 1000-2400, 1000-2200, 1000-2000, 1000-1800, 1000-1600, 1000-1400, 1000-1200, 1200-2500, 1200-2400, 1200-2200, 1200-2000, 1200-1800, 1200-1600, 1200-1400, 1400-2500, 1400-2400, 1400-2200, 1400-2000, 1400-1800, 1400-1600, 1600-2500, 1600-2400, 1600-2200, 1600-2000, 1600-1800, 1800-2500, 1800-2400, 1800-2200, 1800-2000, 2000-2500, 2000-2400, 2000-2200, 2200-2500, 2200-2400, or 2400-2500. It is specifically contemplated that the average maximum depth of depressions can be in combination with or any other feature or combination disclosed herein, including haze, transmittance, $PPD_{140}$, uncoupled DOI, Sdq, Vmp, Smrk2, Vmp/Sq, Sq, density of depressions, average maximum lateral dimension of depressions, X % of depressions within Y % of the average maximum depth, or any combination thereof.

In some aspects, a textured region of a textured article can have depressions with an average maximum depth, in which X % of such depressions are within Y % of the average maximum depth. When X % is relatively high and Y % is relatively low, it means that a significant portion of depressions have a substantially the same depth. In some aspects, having substantially the same depth is beneficial for providing a textured article having improved abrasion resistance and desired optical properties. In some aspects, X (%) can be at least: 50, 55, 60, 65, 70, 75, 80, 85, 90, 95, 99, or 100; alternatively, or additionally, X (%) can be: 100, 99, 95, 90, 80, 70, 60, or 50 or less. For clarity, any two of the foregoing open-ended ranges can be combined to form a closed range. For example, in some aspects, X (%) can be 50-100, 50-99, 50-95, 50-90, 50-85, 50-80, 50-75, 50-70, 50-65, 50-60, 50-55, 55-100, 55-99, 55-95, 55-90, 55-85, 55-80, 55-75, 55-70, 55-65, 55-60, 60-100, 60-99, 60-95, 60-90, 60-85, 60-80, 60-75, 60-70, 60-65, 65-100, 65-99, 65-95, 65-90, 65-85, 65-80, 65-75, 65-70, 70-100, 70-99, 70-95, 70-90, 70-85, 70-80, 70-75, 75-100, 75-99, 75-95, 75-90, 75-85, 75-80, 80-100, 80-99, 80-95, 80-90, 80-85, 85-100, 85-99, 85-95, 85-90, 90-100, 90-99, 90-95, 95-100, 95-99, or 99-100. In some aspects, Y (%) can be at least 1, 2, 4, 6, 8, 10, 12, 14, 16, 18, or 20; alternatively, or additionally, Y (%) can be 20, 18, 16, 14, 12, 10, 8, 6, 4, 2, or 1 or less. For clarity, any two of the foregoing open-ended ranges can be combined to form a closed range. For example, in some aspects, Y (%) can be 1-20, 1-18, 1-16, 1-14, 1-12, 1-10, 1-8, 1-6, 1-4, 1-2, 2-20, 2-18, 2-16, 2-14, 2-12, 2-10, 2-8, 2-6, 2-4, 4-20, 4-18, 4-16, 4-14, 4-12, 4-10, 4-8, 4-6, 6-20, 6-18, 6-16, 6-14, 6-12, 6-10, 6-8, 8-20, 8-18, 8-16, 8-14, 8-12, 8-10, 10-20, 10-18, 10-16, 10-14, 10-12, 12-20, 12-18, 12-16, 12-14, 14-20, 14-18, 14-16, 16-20, 16-18, or 18-20. It is specifically contemplated that the feature described in this paragraph (X % of depressions are with Y % of the average maximum depth) can be in combination with or any other feature or combination disclosed herein, including haze, transmittance, $PPD_{140}$, uncoupled DOI, Sdq, Vmp, Smrk2, Vmp/Sq, Sq, density of depressions, average maximum depth of depressions, average maximum lateral dimension of depressions, or any combination thereof.

In some aspects, the textured region of a textured article comprises depressions distributed randomly across at least a portion of the textured region. In some aspects, however, the depressions can be placed in an orderly format, such as, for example, in grids, lines, squares, circular patterns, and the like.

In some aspects, the primary surface of the substrate, and/or the substrate itself, comprises glass, glass-ceramic, ceramic, or any combination thereof. In some aspects, high transparency to visible light is desired, and in such cases, typically glass is employed as the substrate; however, a glass-ceramic may be employed in such high transparency to visible light applications provided the transparency of the glass-ceramic meets desired levels. Such high transparency visible light applications include, e.g., cover glasses for consumer electronics or automotive solutions, including displays, tablets, smartphones, and so forth. In some aspects, however, some applications may not require high transparency to visible light, and lower transparency in the visible spectrum may be acceptable or even desired. In such cases, glass-ceramic or ceramic substrates may be employed. For example, low transparency is not needed when the textured article is employed on a phone back. In such cases, employing such a textured article with low transparency to visible light as the phone back will provide an opaque phone back with an antiglare/matte finish.

In some aspects, the substrate and/or the primary surface thereof can be made of any suitable material, such as a substrate and/or primary surface comprising alkali aluminosilicate, aluminoborosilicate, soda lime, alkali containing borosilicate, and alkali aluminoborosilicate, in which the alkali in any of the foregoing is, e.g., Li, Na, Ka, or any combination thereof. In some aspects, the substrate may be free of lithium oxide. In some aspects, the substrate and/or primary surface may include crystalline features (which may be strengthened or non-strengthened) or may include a single crystal structure, such as sapphire. In some aspects, the substrate and/or primary surface includes an amorphous base (e.g., glass) and a crystalline cladding (e.g., sapphire layer, a polycrystalline alumina layer and/or or a spinel ($MgAl_xO_y$) layer). In some aspects, the substrate and/or primary surface may include a glass-ceramic material comprising one or more crystalline phases such as lithium disilicate, petalite, beta quartz, or beta spodumene, potentially combined with residual glass in the structure. These glass-ceramic substrates may be optically transparent and chemically strengthened, such as those described in U.S. Pat. No. 10,611,675, U.S. Patent Application Publication No. 2020/0231491, U.S. Patent Application Publication No. 2020/0223744, and U.S. Patent Application Publication No. 2020/0148591, each of which is hereby incorporated by reference in its entirety. Alternatively, optical transparency may not be desired or required for certain applications, as described elsewhere herein. In any event, any substrate and/or primary surface disclosed herein may be strengthened or unstrengthened by any known method in the art, either before, after, or in an intermediate texturing step herein, such as by chemical strengthening (e.g., ion exchange) and/or steam strengthening.

In some aspects, the textured region is formed by removing at least a portion of the primary surface of the substrate. In some aspects, such removal is performed via etching, as described elsewhere herein.

In some aspects, disclosed is a method for making a textured article herein. The textured article produced by the method can be described by any of the characteristics, properties, etc. as described elsewhere herein for the textured article. For example, the textured article produced by the method can have any of the structural and optical properties disclosed elsewhere herein for the textured article, such as Vmp, Sq, Vmp/Sq, Sdq, Smrk2, uncoupled DOI, haze, $PPD_{140}$, density of depressions, average maximum lateral dimensions, average maximum depth, X % of depressions with Y % of average maximum depression depth, or any other feature or property disclosed herein, or any combination thereof. The textured article produced by the method can also be prepared from the substrate described elsewhere herein for the textured article.

In some aspects, the method comprises providing a substrate having a stop layer disposed on a primary surface of the substrate, the stop layer having randomly distributed holes penetrating through to the primary surface. In some aspects, the method further comprises a first removal step comprising removing a first portion of the primary surface through the holes of the stop layer to form seed depressions in the primary surface and unremoved portions of the primary surface under the stop layer. In some aspects, the method further comprises a second removal step comprising removing the stop layer, thereby exposing the unremoved portions of the primary surface under the stop layer. In some aspects, the method further comprises a third removal step comprising removing a second portion of the primary surface substrate, the second portion comprising the seed depressions and the unremoved portions of the primary surface so as to provide a textured region on the primary surface.

In some aspects, the randomly distributed holes in the stop layer are formed by a method comprising positioning over the stop layer a photomask comprising a pattern of randomly distributed holes, and irradiating the stop layer through the photomask with light to transfer the pattern to the stop layer. In some aspects, the holes in the photomask have at least one of a longest dimension of 1-10 microns and a density of 0.005-0.015 holes/$\mu m^2$. For example, the longest dimension can be 1-10, 1-9, 1-8, 1-7, 1-6, 1-5, 1-4, 1-3, 1-2, 2-10, 2-9, 2-8, 2-7, 2-6, 2-5, 2-4, 2-3, 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-9, or 9-10; and/or the density of holes (holes/$\mu m^2$) can be 0.005-0.015, 0.005-0.014, 0.005-0.012, 0.005-0.01, 0.005-0.008, 0.005-0.006, 0.006-0.015, 0.006-0.014, 0.006-0.012, 0.006-0.01, 0.006-0.008, 0.008-0.015, 0.008-0.014, 0.008-0.012, 0.008-0.01, 0.01-0.015, 0.01-0.014, 0.01-0.012, 0.012-0.015, 0.012-0.014, or 0.014-0.015.

In some aspects, the stop layer comprises any material known in the art that is resistant to the method of removing the substrate (or primary surface thereof) through the holes of the stop layer. In other words, the stop layer should sufficiently survive the conditions that result in the primary surface of the substrate being removed through the stop layer holes so the stop layer can perform its function as a stop layer. For example, in some aspects the stop layer comprises molybdenum, silicon carbide, silicon nitride, titanium, titanium nitride, aluminum, aluminum nitride, chromium, chromium oxynitride, zirconium, niobium, tungsten, copper, nickel, chromium plus titanium, or any combination thereof.

In some aspects, one or more of the removal steps comprise chemical etching. For example, in some aspects, at least one of the first removal step, second removal step, and third removal step comprises chemical etching. In some aspects, the chemical etching comprises a chemical mixture that can remove and/or dissolve the primary surface of the substrate so as to form a textured region of a textured article. In some aspects, the chemical etching comprises hydrofluoric acid (HF), a metal hydroxide, or any combination thereof. In some aspects, the metal hydroxide in an alkali metal hydroxide, an alkaline earth metal hydroxide, or any combination thereof. Alkali metal hydroxides include lithium hydroxide, sodium hydroxide, potassium, hydroxide, rubidium hydroxide, cesium hydroxide, or any combination thereof. Alkaline earth metal hydroxides include magnesium hydroxide, calcium hydroxide, strontium hydroxide, barium hydroxide, or any combination thereof.

In some aspects, the first removal step generates seed depressions, the second step removes the stop layer, and the third removal step further removes material from the seed depressions and from portions under the now-removed stop layer to form depressions that in some aspects tend towards coalescence, and may, but do not necessarily, coalescence. Such a process, in some aspects, creates an undulating surface with depressions that have relatively uniform depth. In some aspects, at least one of the first and third removal steps comprises hydrofluoric acid (HF) with or without fluorosurfactant. In some aspects, at least one of the first and third removal steps comprises a metal hydroxide with or without a surfactant. In some aspects, at least one of the first and third removal steps employs HF with or without fluorosurfactant, and the other of the first or third removal steps employs a metal hydroxide.

In some aspects, at least one of the first removal step and the third removal step comprises any suitable composition conditions when employing HF. For example, in some aspects, at least one of the first removal step and the third removal step employs a composition comprising HF in an amount (wt. %) of at least: 0.1, 0.5, 1, 1.5, 2, 2.5, 3, 3.5, 4, 4.5, 5, 6, 8, 10, 12, 14, 16, 18, or 20, based on total weight of the composition; alternatively, or additionally, at least one of the first removal step and the third removal step employs a composition comprising HF in an amount (wt. %) of 20, 18, 16, 14, 12, 10, 8, 6, 5, 4.5, 4, 3.5, 3, 2.5, 2, 1.5, 1, 0.5, or 0.1 or less, based on total weight of the composition. For clarity, any two of the foregoing open-ended ranges can be combined to form a closed range. For example, in some aspects, the amount (wt. %) of HF, based on total weight of the composition, can be 0.1-20, 0.1-18, 0.1-16, 0.1-14, 0.1-12, 0.1-10, 0.1-8, 0.1-6, 0.1-5, 0.1-4.5, 0.1-4, 0.1-3.5, 0.1-3, 0.1-2.5, 0.1-2, 0.1-1.5, 0.1-1, 0.1-0.5, 0.5-20, 0.5-18, 0.5-16, 0.5-14, 0.5-12, 0.5-10, 0.5-8, 0.5-6, 0.5-5, 0.5-4.5, 0.5-4, 0.5-3.5, 0.5-3, 0.5-2.5, 0.5-2, 0.5-1.5, 0.5-1, 1-20, 1-18, 1-16, 1-14, 1-12, 1-10, 1-8, 1-6, 1-5, 1-4, 1-4.5, 1-4, 1-3.5, 1-3, 1-2.5, 1-2, 1-1.5, 1.5-20, 1.5-18, 1.5-16, 1.5-14, 1.5-12, 1.5-10, 1.5-8, 1.5-6, 1.5-5, 1.5-4.5, 1.5-4, 1.5-3.5, 1.5-3, 1.5-2.5, 1.5-2, 2-20, 2-18, 2-16, 2-14, 2-12, 2-10, 2-8, 2-6, 2-5, 2-4.5, 2-4, 2-3.5, 2-3, 2-2.5, 2.5-20, 2.5-18, 2.5-16, 2.5-14, 2.5-12, 2.5-10, 2.5-8, 2.5-6, 2.5-5, 2.5-4.5, 2.5-4, 2.5-3.5, 2.5-3, 3-20, 3-18, 3-16, 3-14, 3-12, 3-10, 3-8, 3-6, 3-5, 3-4.5, 3-4, 3-3.5, 3.5-20, 3.5-18, 3.5-16, 3.5-14, 3.5-12, 3.5-10, 3.5-8, 3.5-6, 3.5-5, 3.5-4.5, 3.5-4, 4-20, 4-18, 4-16, 4-14, 4-12, 4-10, 4-8, 4-6, 4-5, 4-4.5, 4.5-20, 4.5-18, 4.5-16, 4.5-14, 4.5-12, 4.5-10, 4.5-8, 4.5-6, 4.5-5, 5-20, 5-18, 5-16, 5-14, 5-12, 5-10, 5-8, 5-6, 6-20, 6-18, 6-16, 6-14, 6-12, 6-10, 6-8, 8-20, 8-18, 8-16, 8-14, 8-12, 8-10, 10-20, 10-18, 10-16, 10-14, 10-12, 12-20, 12-18, 12-16, 12-14, 14-20, 14-16, 16-20, 16-18, or 18-20. In some aspects, the first removal step employs a concentration of HF that is lower than in the third removal step. In some aspects, the first removal step comprises HF in an amount of 0.1-20 wt. %, or 0.5-2 wt. %, or any other amount disclosed herein, and the third removal step comprises HF in an amount of 1-20 wt. %, or 8-12 wt. %, or any other amount disclosed herein.

In some aspects, at least one of the first removal step and the third removal step comprises any suitable conditions when employing HF. For example, in some aspects, at least one of the first removal step and the third removal step employs a composition comprising fluorosurfactant (e.g., in addition to HF) in an amount (wt. %) of at least: 0, 0.1, 0.5, 1, 1.5, 2, 2.5, 3, 3.5, 4, 4.5, 5, 6, 7, 8, 9, or 10, based on total weight of the composition; alternatively, or additionally, at least one of the first removal step and the third removal step employs a composition comprising fluorosurfactant (e.g., in addition to HF) in an amount (wt. %) of 10, 9, 8, 7, 6, 5, 4.5, 4, 3.5, 3, 2.5, 2, 1.5, 1, 0.5, or 0.1 or less, based on total weight of the composition. For clarity, any two of the foregoing open-ended ranges can be combined to form a closed range. For example, in some aspects, the amount (wt. %) of fluorosurfactant, based on total weight of the composition, can be 0-10, 0-9, 0-8, 0-7, 0-6, 0-5, 0-4.5, 0-4, 0-3.5, 0-3, 0-2.5, 0-2, 0-1.5, 0-1, 0-0.5, 0-0.1, 0.1-10, 0.1-9, 0.1-8, 0.1-7, 0.1-6, 0.1-5, 0.1-4.5, 0.1-4, 0.1-3.5, 0.1-3, 0.1-2.5, 0.1-2, 0.1-1.5, 0.1-1, 0.1-0.5, 0.5-10, 0.5-9, 0.5-8, 0.5-7, 0.5-6, 0.5-5, 0.5-4.5, 0.5-4, 0.5-3.5, 0.5-3, 0.5-2.5, 0.5-2, 0.5-1.5, 0.5-1, 1-10, 1-9, 1-8, 1-7, 1-6, 1-5, 1-4.5, 1-4, 1-3.5, 1-3, 1-2.5, 1-2, 1-1.5, 1.5-10, 1.5-9, 1.5-8, 1.5-7, 1.5-6, 1.5-5, 1.5-4.5, 1.5-4, 1.5-3.5, 1.5-3, 1.5-2.5, 1.5-2, 2-10, 2-9, 2-8, 2-7, 2-6, 2-5, 2-4.5, 2-4, 2-3.5, 2-3, 2-2.5, 2.5-10, 2.5-9, 2.5-8, 2.5-7, 2.5-6, 2.5-5, 2.5-4.5, 2.5-4, 2.5-3.5, 2.5-3, 3-10, 3-9, 3-8, 3-7, 3-6, 3-5, 3-4.5, 3-4, 3-3.5, 3.5-10, 3.5-9, 3.5-8, 3.5-7, 3.5-6, 3.5-5, 3.5-4.5, 3.5-4, 4-10, 4-9, 4-8, 4-7, 4-6, 4-5, 4-4.5, 4.5-10, 4.5-9, 4.5-8, 4.5-7, 4.5-6, 4.5-5, 5-10, 5-9, 5-8, 5-7, 5-6, 6-10, 6-9, 6-8, 6-7, 7-10, 7-9, 7-8, 8-10, 8-9, or 9-10. In some aspects, the first removal step comprises fluorosurfactant and the third removal step does not employ fluorosurfactant. In some aspects, the third removal step comprises fluorosurfactant and the first removal step does not employ fluorosurfactant. In some aspects, both the first and third removal steps comprise fluorosurfactant. In some aspects, neither the first nor third removal steps employ fluorosurfactant.

Any suitable fluorosurfactant known in the field can be employed as the fluorosurfactant in any of the method steps herein, such as the first and/or third removal steps, including an anionic fluorosurfactant, a nonionic fluorosurfactant, an ethoxylated nonionic fluorosurfactant, an amphoteric fluorosurfactant, perfluorinated fluorosurfactant, partially fluorinated fluorosurfactant, or any combination thereof, any of which may be water soluble and/or solvent soluble. For example, any of the CAPSTONE™ fluorinated surfactants available from The Chemours Company may be used, such as FS-10 (an anionic fluorinated surfactant), FS-22 (a solvent-borne additive), FS-30 (a general-purpose, water-soluble, ethoxylated nonionic fluorosurfactant), FS-3000 (a nonionic fluorosurfactant), FS-31 (a nonionic fluorosurfactant), FS-3100 (a nonionic fluorosurfactant), FS-34 (a general-purpose, water-soluble, ethoxylated, nonionic fluorosurfactant), FS-35 (a nonionic fluorosurfactant), FS-50 (an amphoteric fluorosurfactant), FS-51 (an amphoteric amine oxide-based fluorosurfactant), FS-60 (a water-soluble, anionic fluorosurfactant), FS-61 (a water-based, anionic fluorosurfactant), FS-63 (a water-soluble, anionic fluorosurfactant), FS-64 (a water-soluble, anionic, proprietary fluorosurfactant with no intentionally-added VOC), FS-65 (a water-soluble fluorosurfactant with no intentionally-added VOC), FS-66 (an anionic fluorosurfactant that contains no solvents), FS-81 (a waterborne, partially fluorinated coating additive), FS-83 (a solvent-borne additive), FS-87 (a water-soluble, nonflammable, and partially fluorinated copolymer with no intentionally-added VOC), FS-93 (a water-soluble, anionic fluorosurfactant), or any combination thereof.

In some aspects, at least one of the first removal step and the third removal step comprises any suitable temperature conditions when employing HF. For example, in some aspects, when employing HF, at least one of the first removal step and the third removal step is conducted at a temperature (° C.) of at least: 15, 20, RT, 25, 30, 35, 40, 45, 50, 55, or 60; alternatively, or additionally, when employing HF at least one of the first removal step and the third removal step is conducted at a temperature of 60, 55, 50, 45, 40, 35, 30, 25, RT, 20, or 15 or less. For clarity, any two of the foregoing open-ended ranges can be combined to form a closed range. For example, in some aspects, when employing HF at least one of the first removal step and the third removal step is conducted at a temperature (° C.) of 15-60, 15-55, 15-50, 15-45, 15-40, 15-35, 15-30, 15-25, 15-RT, 15-20, 20-60, 20-55, 20-50, 20-45, 20-40, 20-35, 20-30, 20-25, 20-RT, RT-60, RT-55, RT-50, RT-45, RT-40, RT-35, RT-30, RT-25, RT-20, 25-60, 25-55, 25-50, 25-45, 25-40, 25-35, 25-30, 30-60, 30-55, 30-50, 30-45, 30-40, 30-35, 35-60, 35-55, 35-50, 35-45, 35-40, 40-60, 40-55, 40-50, 40-45, 45-60, 45-55, 45-50, 50-60, 50-55, or 55-60. As used herein, "RT" means room temperature and generally refers to the ambient temperature of the environment (e.g., the room or facility) in which the removal step is taking place. Generally, RT is about 15-25° C., such as about 18° C., about 20° C., about 22° C., about 18-22° C., about 18-20° C., or about 20-22° C., depending on the room or facility. In some aspects, the first removal step using HF is conducted at a temperature of RT to 50° C., 20-35° C., or any other temperature disclosed herein, and the third removal step is conducted at a temperature of RT to 50° C., or 25-40° C., or any other amount disclosed herein.

In some aspects, at least one of the first removal step and the third removal step comprises any suitable time conditions when employing HF. For example, in some aspects, when employing HF, at least one of the first removal step and the third removal step is conducted for a time period (min) of at least: 1, 5, 10, 20, 40, 60, 80, 100, or 120; alternatively, or additionally, when employing HF at least one of the first removal step and the third removal step is conducted for a time period (min) of 120, 100, 80, 60, 40, 20, 10, 5, or 1 or less. For clarity, any two of the foregoing open-ended ranges can be combined to form a closed range. For example, in some aspects, when employing HF at least one of the first removal step and the third removal step is conducted for a time period (min) of 1-120, 1-100, 1-80, 1-60, 1-40, 1-20, 1-10, 1-5, 5-120, 5-100, 5-80, 5-60, 5-40, 5-20, 5-10, 10-120, 10-100, 10-80, 10-60, 10-40, 10-20, 20-120, 20-100, 20-80, 20-60, 20-40, 40-120, 40-100, 40-80, 40-60, 60-120, 60-100, 60-80, 80-120, 80-100, or 100-120. In some aspects, the first removal step employing HF is conducted for a time period of 1-60 min, or 5-40 min, or any other time period disclosed herein, and the third removal step employing HF is conducted for a time period of 1-120 min, or 40-80 min, or any other time period disclosed herein.

In some aspects, at least one of the first removal step and the third removal step comprises any suitable composition conditions when employing a metal hydroxide. For example, in some aspects, at least one of the first removal step and the third removal step employs a composition comprising a metal hydroxide (e.g., NaOH and/or KOH) in an amount (wt. %) of at least: 1, 2, 5, 10, 20, 30, 40, 50, 60, or 70, based on total weight of the composition; alternatively, or additionally, at least one of the first removal step and the third removal step employs a composition comprising a metal hydroxide (e.g., NaOH and/or KOH) in an amount (wt. %) of 70, 60, 50, 40, 30, 20, 10, 5, 2, or 1 or less, based on total weight of the composition. For clarity, any two of the foregoing open-ended ranges can be combined to form a closed range. For example, in some aspects, the amount (wt. %) of metal hydroxide (e.g., NaOH and/or KOH), based on total weight of the composition, can be 1-70, 1-60, 1-50, 1-40, 1-30, 1-20, 1-10, 1-50, 1-2, 2-70, 2-60, 2-50, 2-40, 2-30, 2-20, 2-10, 2-5, 5-70, 5-60, 5-50, 5-40, 5-30, 5-20, 5-10, 10-70, 10-60, 10-50, 10-40, 10-30, 10-20, 20-70, 20-60, 20-50, 20-40, 20-30, 30-70, 30-60, 30-50, 30-40, 40-70, 40-60, 40-50, 50-70, 50-60, or 60-70. Each of the foregoing amounts can be used herein to refer to a single metal hydroxide, or to the total amount of metal hydroxide. In some aspects, the first removal step employs a concentration of metal hydroxide that is lower than in the third removal step. In some aspects, the first removal step comprises metal hydroxide in an amount of 1-50 wt. %, or 2-10 wt. %, or any other amount disclosed herein, and the third removal step comprises metal hydroxide in an amount of 10-70 wt. %, or 20-50 wt. %, or any other amount disclosed herein.

In some aspects, any surfactant may be used in combination with a composition comprising a metal hydroxide. Suitable surfactants include, for example, any of the fluorinated surfactants disclosed elsewhere herein. In addition, suitable surfactants include, for example, sodium dodecyl sulfate (SDS), cetrimonium bromide (CTAB), cetrimonium chloride, (CTAC), or any combination thereof.

In some aspects, at least one of the first removal step and the third removal step comprises any suitable temperature conditions when employing metal hydroxide (e.g., NaOH and/or KOH). For example, in some aspects, when employing metal hydroxide, at least one of the first removal step and the third removal step is conducted at a temperature (° C.) of at least: RT, 20, 30, 40, 50, 70, 90, 110, 130, 150, or 165; alternatively, or additionally, when employing metal hydroxide at least one of the first removal step and the third removal step is conducted at a temperature of 165, 150, 130, 110, 90, 70, 50, 40, 30, 20, or RT or less. For clarity, any two of the foregoing open-ended ranges can be combined to form a closed range. For example, in some aspects, when employing metal hydroxide at least one of the first removal step and the third removal step is conducted at a temperature (° C.) of RT-165, RT-150, RT-130, RT-110, RT-90, RT-70, RT-50, RT-40, RT-30, RT-20, 20-165, 20-150, 20-130, 20-110, 20-90, 20-70, 20-50, 20-40, 20-30, 30-165, 30-150, 30-130, 30-110, 30-90, 30-70, 30-50, 30-40, 40-165, 40-150, 40-130, 40-110, 40-90, 40-70, 40-50, 50-165, 50-150, 50-130, 50-110, 50-90, 50-70, 70-165, 70-150, 70-130, 70-110, 70-90, 90-165, 90-150, 90-130, 90-110, 90-165, 90-150, 90-130, 90-110, 110-165, 110-150, 110-130, 130-165, 130-150, or 150-165. As used herein, "RT" means room temperature and generally refers to the ambient temperature of the environment (e.g., the room or facility) in which the removal step is taking place. Generally, RT is about 15-25° C., such as about 18° C., about 20° C., about 22° C., about 18-22° C., about 18-20° C., or about 20-22° C., depending on the room or facility. In some aspects, the first removal step using metal hydroxide is conducted at a temperature of RT to 150° C., 50-130° C., or any other temperature disclosed herein, and the third removal step is conducted at a temperature of 70-165° C., or 90-150° C., or any other amount disclosed herein.

In some aspects, at least one of the first removal step and the third removal step comprises any suitable time conditions when employing metal hydroxide (NaOH and/or KOH). For example, in some aspects, when employing metal hydroxide, at least one of the first removal step and the third removal step is conducted for a time period (min) of at least: 1, 5, 10, 20, 40, 60, 80, 100, 120, 140, 160, 180, 200, 220, or 240; alternatively, or additionally, when employing metal hydroxide at least one of the first removal step and the third removal step is conducted for a time period (min) of 240, 220, 200, 180, 160, 140, 120, 100, 80, 60, 40, 20, 10, 5, or 1 or less. For clarity, any two of the foregoing open-ended ranges can be combined to form a closed range. For example, in some aspects, when employing metal hydroxide at least one of the first removal step and the third removal step is conducted for a time period (min) of 1-240, 1-220, 1-200, 1-180, 1-160, 1-140, 1-120, 1-100, 1-80, 1-60, 1-40, 1-20, 1-10, 1-5, 5-240, 5-220, 5-200, 5-180, 5-160, 5-140, 5-120, 5-100, 5-80, 5-60, 5-40, 5-20,5-10, 10-240, 10-220, 10-200, 10-180, 10-160, 10-140, 10-120, 10-100, 10-80, 10-60, 10-40, 10-20, 20-240, 20-220, 20-200, 20-180, 20-160, 20-140, 20-120, 20-100, 20-80, 20-60, 20-40, 40-240, 40-220, 40-200, 40-180, 40-160, 40-140, 40-120, 40-100, 40-80, 40-60, 60-240, 60-220, 60-200, 60-180, 60-160, 60-140, 60-120, 60-100, 60-80, 80-240, 80-220, 80-200, 80-180, 80-160, 80-140, 80-120, 80-100, 100-240, 100-220, 100-200, 100-180, 100-160, 100-140, 100-120, 120-240, 120-220, 120-200, 120-180, 120-160, 120-140, 140-240, 140-220, 140-200, 140-180, 140-160, 160-240, 160-220, 160-200, 160-180, 180-240, 180-220, 180-200, 200-240, 200-220, or 220-240. In some aspects, the first removal step employing metal hydroxide is conducted for a time period of 1-120 min, or 40-140 min, or any other time period disclosed herein, and the third removal step employing metal hydroxide is conducted for a time period of 10-240 min, or 100-180 min, or any other time period disclosed herein.

In some aspects, the third removal step is conducted using conditions suitable for removing the stop layer from the primary surface of the substrate and depends on the material used for the stop layer. In some aspects, such conditions are relatively inert to the material of the primary surface of the substrate as compared to the stop layer. For example, when the stop layer comprises molybdenum, example conditions include wet etching with a mixture of phosphoric acid 60 ml/nitric acid 36 ml/acetic acid 20 ml/water 130 ml heated to 40° C. When the stop layer comprises silicon carbide, example conditions include plasma etching (e.g., dry etching in a UNAXIS™ machine with settings: ~30 see SIC LP 36SF6 6O2 12 mT 200 W, using reflectance spectra in field to endpoint).

In some aspects, the first removal step removes a first portion of the primary surface of the substrate through the holes of the stop layer to form seed depressions. In some aspects, the first portion has a thickness (μm) of at least: 1, 2, 4, 6, 8, 10, 15, 20, 25, or 30; alternatively, or additional, the first portion has a thickness (μm) of 30, 25, 20, 15, 10, 8, 6, 4, 2, or 1 or less. For clarity, any two of the foregoing open-ended ranges can be combined to form a closed range. For example, in some aspects, the first portion has a thickness (μm) of 1-30, 1-25, 1-20, 1-15, 1-10, 1-8, 1-6, 1-4, 1-2, 2-30, 2-25, 2-20, 2-15, 2-10, 2-8, 2-6, 2-4, 4-30, 4-25, 4-20, 4-15, 4-10, 4-8, 4-6, 6-30, 6-25, 6-20, 6-15, 6-10, 6-8, 8-30, 8-25, 8-20, 8-15, 8-10, 10-30, 10-25, 10-20, 10-15, 15-30, 15-25, 15-20, 20-30, 20-25, or 25-30.

In some aspects, the third removal step removes a second portion of the primary surface of the substrate, the second portion comprising the seed depressions and the unremoved portions of the primary surface so as to provide a textured region on the primary surface. In some aspects, the second portion has a thickness (μm) of at least: 10, 20, 30, 40, 50, 60, 70, 80, 90, 100, 110, or 120; alternatively, or additional, the first portion has a thickness (μm) of 120, 110, 100, 90, 80, 70, 60, 50, 40, 30, 20, or 10 or less. For clarity, any two of the foregoing open-ended ranges can be combined to form a closed range. For example, in some aspects, the second portion has a thickness (μm) of 10-120, 10-110, 10-100, 10-90, 10-80, 10-70, 10-60, 10-50, 10-40, 10-30, 10-20, 20-120, 20-110, 20-100, 20-90, 20-80, 20-70, 20-60, 20-50, 20-40, 20-30, 30-120, 30-110, 30-100, 30-90, 30-80, 30-70, 30-60, 30-50, 30-40, 40-120, 40-110, 40-100, 40-90, 40-80, 40-70, 40-60, 40-50, 50-120, 50-110, 50-100, 50-90, 50-80, 50-70, 50-60, 60-120, 60-110, 60-100, 60-90, 60-80, 60-70, 70-120, 70-110, 70-100, 70-90, 70-80, 80-120, 80-110, 80-100, 80-90, 90-120, 90-110, 90-100, 100-120, 100-110, or 110-120.

Aspects of the disclosure will now be discussed with reference to FIGS. 15-16, which illustrate various aspects of the textured articles and methods of making disclosed herein. The following general description is intended to provide an overview of the disclosure, structures, and methods, and various aspects will be more specifically discussed throughout the disclosure with reference to the non-limiting depicted aspects, all of these aspects being interchangeable with one another within the context of the disclosure.

Figure 15:
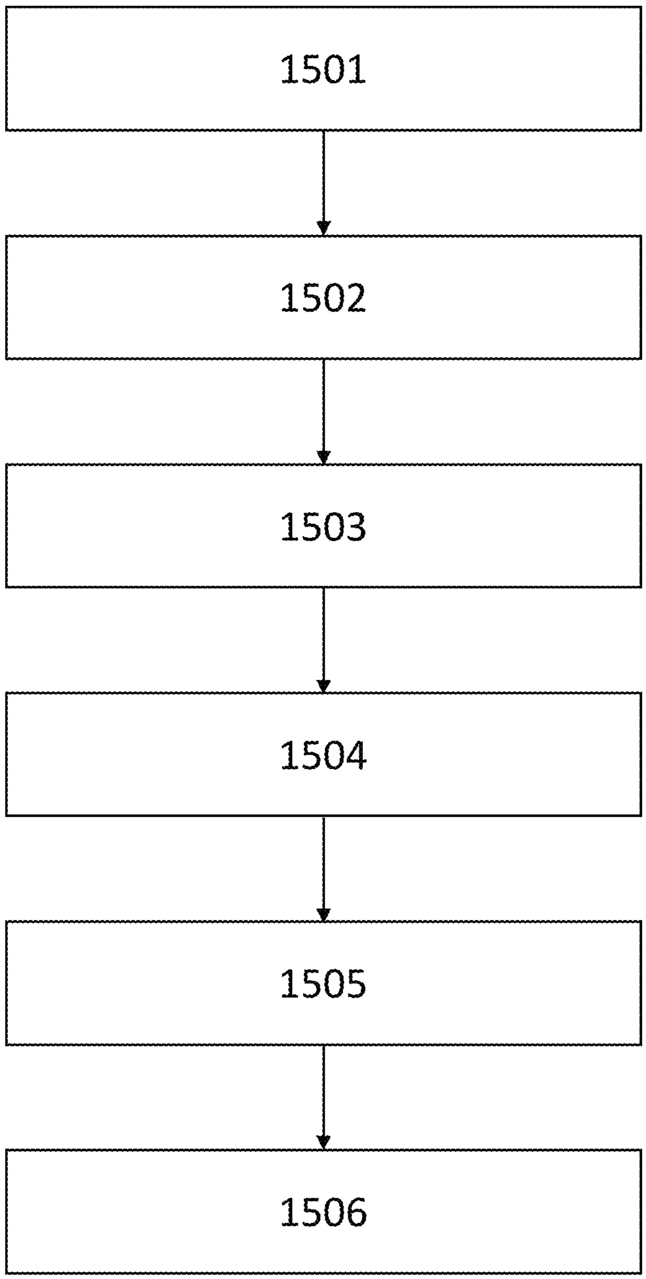
FIG. 15 is a process flow diagram depicting, in some aspects, method steps for producing textured articles in accordance with the disclosures herein.

FIG. 15 is a process flow diagram depicting, in some aspects, a method for producing textured articles in accordance with the disclosures herein. In step 1501, a photomask is fabricated containing randomly placed pinholes generally having a diameter of about 1-5 μm. In step 1502, a stop layer is disposed on a primary surface of a substrate. Steps 1501 and 1502 can be performed in any order. In step 1503, the photomask pattern of randomly placed pinholes is transferred to the stop layer via a suitable method such as photolithography whereby the pinholes penetrate through the stop layer to the primary surface of the underlying substrate. For example, in step 1503, the randomly distributed holes in the stop layer may be formed by a method comprising positioning over the stop layer a photomask comprising a pattern of randomly distributed holes, and then irradiating the stop layer through the photomask with light to transfer the pattern to the stop layer. Step 1504 is a first removal step, which comprises removing a first portion of the primary surface through the holes of the stop layer to form seed depressions in the primary surface and unremoved portions of the primary surface under the stop layer. Step 1505 is a second removal step, which comprises removing the stop layer, thereby exposing the unremoved portions of the primary surface under the stop layer. Step 1506 is a third removal step, which comprises removing a second portion of the primary surface substrate, the second portion comprising the seed depressions and the unremoved portions of the primary surface so as to provide a textured region on the primary surface. Any one or more of steps 1501, 1502, 1503, 1504, 1505, and 1506 may be optional because, in some aspects, it is contemplated that a third party could perform any one or more of such steps. For example, steps 1501, 1502, and 1503 may be performed by a third party such that the method could begin with a substrate that already has a stop layer having randomly distributed holes penetrating through to the primary surface of the underlying substrate. Alternatively, the method could start at step 1503, since a substrate comprising a stop layer could be provided by a third party, and the method could begin with transferring the photomask pinhole pattern to the stop layer in step 1503. Other alternatives are contemplated in which the method could begin at any one of steps 1501, 1502, 1503, 1504, 1505, or 1506, and any step may be optional.

Figure 16:
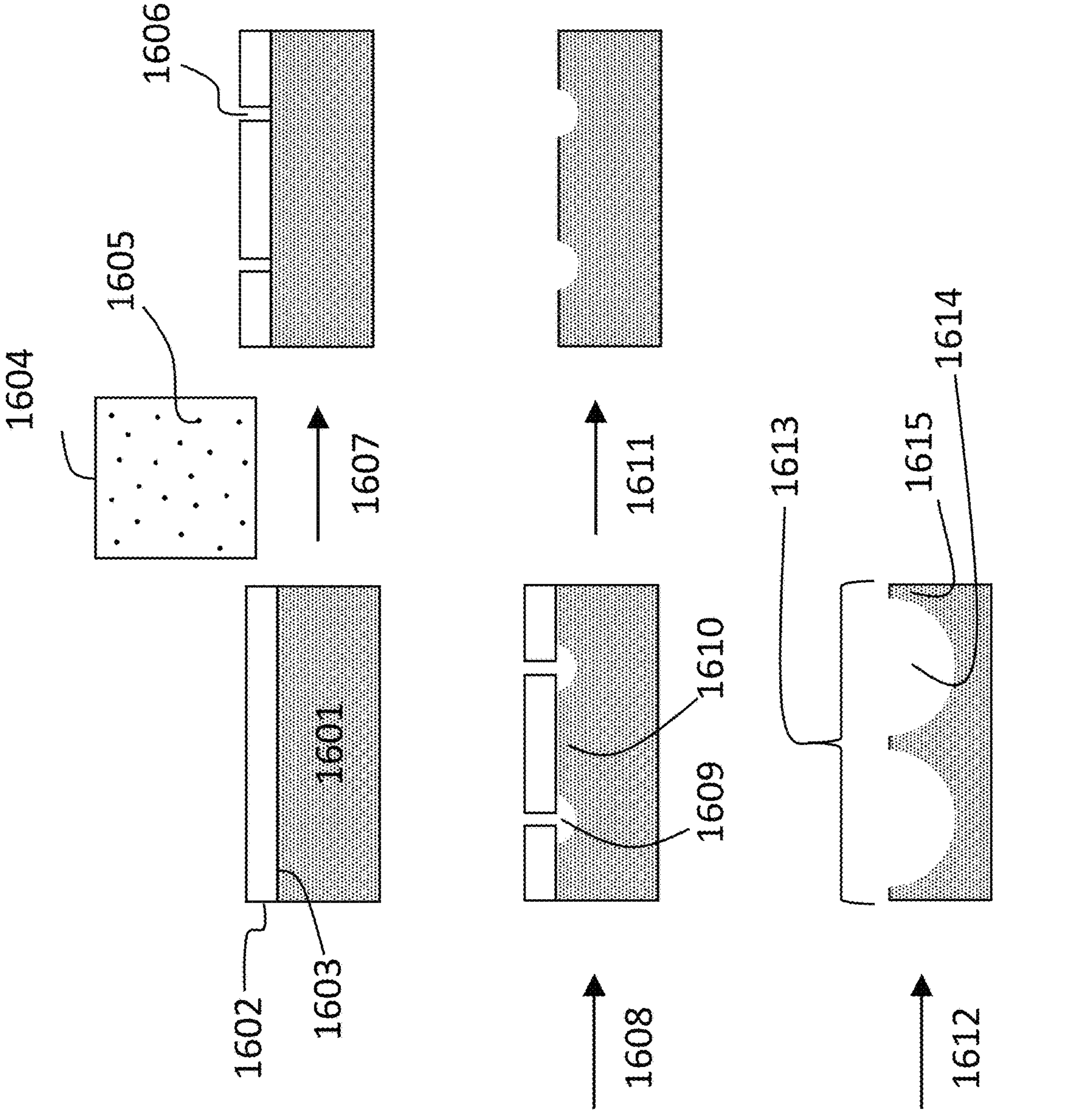
FIG. 16 is a schematic diagram depicting, in some aspects, method steps for producing textured articles in accordance with the disclosures herein.

FIG. 16 s a schematic diagram depicting, in some aspects, a method for producing textured articles in accordance with the disclosures herein. Substrate 1601 is provided having a stop layer 1602 disposed on primary surface 1603 of the substrate 1601. Optionally, the method may include a step (not shown) of depositing the stop layer 1602 on the substrate 1601. In step 1607, a photomask 1604 having a pattern of randomly distributed holes 1605 is employed to transfer the pattern to the stop layer 1602, thereby forming randomly distributed holes 1606 that penetrate through to the primary surface 1603. In some aspects, in step 1607 the pattern transfer is accomplished by positioning the photomask 1604 over the stop layer 1602 and irradiating the stop layer 1602 through the randomly distributed holes 1605 of photomask 1604. Step 1608 is a first removal step, which comprises removing a first portion of the primary surface 1603 through the randomly distributed holes 1606 of the stop layer 1602 to form seed depressions 1609 in the primary surface 1603 and unremoved portions 1610 of the primary surface under the stop layer 1602. Step 1611 is a second removal step, which comprises removing the stop layer 1602, thereby exposing the unremoved portions 1610 of the primary surface under the stop layer 1602. Step 1612 is a third removal step, which comprises removing a second portion of the primary surface substrate, the second portion comprising the seed depressions and the unremoved portions of the primary surface so as to provide a textured region 1613 on the primary surface. In the third removal step 1612, the seed depressions 1609 and unremoved portions 1610 are further removed so as to form depressions 1614 and remnants 1615 of the unremoved portions. In some aspects, the depressions 1615 coalesce so as to form an undulating surface. Any one or more of steps 1607, 1608, 1611, and 1612 may be optional because, in some aspects, it is contemplated that a third party could perform any one or more of such steps, as similarly discussed for FIG. 15.

Various aspects are contemplated herein, several of which are set forth in the paragraphs below. It is explicitly contemplated that any aspect or portion thereof can be combined to form a combination.

Aspect 1. A textured article, comprising:
- a substrate comprising a textured region defined on a primary surface of the substrate;
- wherein the textured region comprises:
  - a Vmp/Sq of at least 0.084 as measured according to ISO 25178-2:2012.

Aspect 2. The textured article of aspect 1, wherein the Vmp/Sq is at least 0.09 as measured according to ISO 25178-2:2012.

Aspect 3. A textured article, comprising:
- a substrate comprising a textured region defined on a primary surface of the substrate;
- wherein the textured region comprises:
  - a Vmp/Sq of at least 0.084 as measured according to ISO 25178-2:2012; and
  - an Smrk2 of at least 90% as measured according to ISO 25178-2:2021.

Aspect 4. The textured article of aspect 3, or any preceding aspect, wherein the Smrk2 is at least 92% as measured according to ISO 25178-2:2021.

Aspect 5. A textured article, comprising:
- a substrate comprising a textured region defined on a primary surface of the substrate;
- wherein the textured region comprises:
  - a Vmp of at least 10 nm as measured according to ISO 25178-2:2012; and
  - an Sdq of 0-0.1 as measured according to ISO 25178-2:2012.

Aspect 6. The textured article of aspect 5, or any preceding aspect, wherein:
- the Vmp is at least 14 nm as measured according to ISO 25178-2:2012; and
- the Sdq is 0.0045-0.1 as measured according to ISO 25178-2:2012.

Aspect 7. The textured article of any preceding aspect, exhibiting at least one of:
- a $PPD_{140}$ of 3.7% or less at an incident angle of 0 degrees;
- an uncoupled DOI of 80% or less as measured according to ASTM D 5767-18; and
- a haze of 70% or less as measured according to ASTM D 1003-21.

Aspect 8. The textured article of any preceding aspect, exhibiting:
- a $PPD_{140}$ of 3.7% or less at an incident angle of 0 degrees;
- an uncoupled DOI of 80% or less as measured according to ASTM D 5767-18; and
- a haze of 10% or less as measured according to ASTM D 1003-21.

Aspect 9. The textured article of any one of aspects 1-7, exhibiting:
- a $PPD_{140}$ of 3.5% or less at an incident angle of 0 degrees;
- an uncoupled DOI of 60% or less as measured according to ASTM D 5767-18; and
- a haze of 70% or less as measured according to ASTM D 1003-21.

Aspect 10. The textured article of any preceding aspect, wherein the textured region comprises depressions having a density of 0.005-0.015 depressions/$\mu m^2$.

Aspect 11. The textured article of any preceding aspect, wherein:
- the textured region comprises depressions having at least one of:
  - an average maximum lateral dimension between 5-50 microns; and
  - an average maximum depth of 150-2500 nm.

Aspect 12. The textured article of any preceding aspect, wherein:
- the textured region comprises depressions;
- the depressions have an average maximum depth; and
- at least 90% of the depressions have maximum depths within 10% of the average maximum depth.

Aspect 13. The textured article of any preceding aspect, wherein the textured region comprises depressions distributed randomly across at least a portion of the textured region.

Aspect 14. The textured article of any preceding aspect, wherein the primary surface of the substrate comprises glass, glass-ceramic, ceramic, or any combination thereof.

Aspect 15. The textured article of any preceding aspect, wherein the textured region is formed by removing at least a portion of the primary surface of the substrate.

Aspect 16. A method for making a textured article, the method comprising:
- providing a substrate having a stop layer disposed on a primary surface of the substrate, the stop layer having randomly distributed holes penetrating through to the primary surface;
- a first removal step comprising removing a first portion of the primary surface through the holes of the stop layer to form seed depressions in the primary surface and unremoved portions of the primary surface under the stop layer;
- a second removal step comprising removing the stop layer, thereby exposing the unremoved portions of the primary surface under the stop layer; and
- a third removal step comprising removing a second portion of the primary surface substrate, the second portion comprising the seed depressions and the unremoved portions of the primary surface so as to provide a textured region on the primary surface.

Aspect 17. The method of aspect 16, or any preceding aspect, wherein the randomly distributed holes in the stop layer are formed by a method comprising:
- positioning over the stop layer a photomask comprising a pattern of randomly distributed holes; and
- irradiating the stop layer through the photomask with light to transfer the pattern to the stop layer.

Aspect 18. The method of aspect 17, or any preceding aspect, wherein the holes in the photomask have at least one of a longest dimension of 1-10 microns and a density of 0.005-0.015 holes/$\mu m^2$.

Aspect 19. The method of any one of aspects 16-18, or any preceding aspect, wherein the stop layer comprises molybdenum, silicon carbide, silicon nitride, titanium, titanium nitride, aluminum, aluminum nitride, chromium, chromium oxynitride, zirconium, niobium, tungsten, copper, nickel, chromium plus titanium, or any combination thereof.

Aspect 20. The method of any one of aspects 16-19, or any preceding aspect, wherein at least one of the first removal step, the second removal step, and the third removal step comprises chemical etching.

Aspect 21. The method of aspect 20, wherein the chemical etching comprises hydrofluoric acid or a metal hydroxide.

Aspect 22. The method of any one of aspects 16-21, or any preceding aspect, wherein a thickness of the first portion removed through the holes of the stop layer is 1-10 microns.

Aspect 23. The method of any one of aspects 16-22, or any preceding aspect, wherein a thickness of second portion removed from the seed depressions and the unremoved portions of the primary surface is 10-100 microns.

Aspect 24. The method of any one of aspects 16-23, or any preceding aspect, wherein the primary surface of the substrate comprises glass, glass-ceramic, ceramic, or any combination thereof.

Aspect 25. The method of any one of aspects 16-24, or any preceding aspect, wherein the textured region comprises at least one of:

(1) a Vmp/Sq of at least 0.084 as measured according to ISO 25178-2:2012;

(2) a Vmp/Sq is at least 0.09 as measured according to ISO 25178-2:2012;

(3) a Vmp/Sq of at least 0.084 as measured according to ISO 25178-2:2012 and an Smrk2 of at least 90% as measured according to ISO 25178-2:2021;

(4) a Vmp/Sq of at least 0.084 as measured according to ISO 25178-2:2012 and an Smrk2 of at least 92% as measured according to ISO 25178-2:2021;

(5) a Vmp of at least 10 nm as measured according to ISO 25178-2:2012 and an Sdq of 0-0.1 as measured according to ISO 25178-2:2012; and (6) a Vmp of at least 14 nm as measured according to ISO 25178-2:2012 and an Sdq of 0.0045-0.1 as measured according to ISO 25178-2:2012.

Aspect 26. The method of any one of aspects 16-25, or any preceding aspect, wherein the textured region exhibits:

(1) at least one of a $PPD_{140}$ of 3.7% or less at an incident angle of 0 degrees; an uncoupled DOI of 80% or less as measured according to ASTM D 5767-18; and a haze of 70% or less as measured according to ASTM D 1003-21;

(2) a $PPD_{140}$ of 3.7% or less at an incident angle of 0 degrees; an uncoupled DOI of 80% or less as measured according to ASTM D 5767-18; and a haze of 10% or less as measured according to ASTM D 1003-21; or (3) a $PPD_{140}$ of 3.5% or less at an incident angle of 0 degrees; an uncoupled DOI of 60% or less as measured according to ASTM D 5767-18; and a haze of 70% or less as measured according to ASTM D 1003-21.

Aspect 27. A combination of any two or more preceding aspects or any portion(s) thereof.

EXAMPLE

The following example illustrates non-limiting aspects of the disclosure and are not intended to be limiting on the scope of the disclosure or claims.

In this example, Substrates A and B are two different aluminoborosilicate glasses, Substrates C and D are two different lithium aluminosilicate glasses, and Substrate E is glass-ceramic.

Vmp, Sq, Smrk2, and Sdq are structural properties of the surface (as discussed elsewhere herein) and were measured according to ISO 25178-2:2012 (Vmp, Sq, Sdq) or ISO 25178-2:2021 (Smrk2) by analyzing the surface with a Zygo NewView™ surface profiler and calculated using MountainsMap™ software.

In this example, Haze, DOI, and Sparkle ($PPD_{140}$) are optical properties of the substrate, as discussed elsewhere herein.

In this example, an abrasion test ("Abrasion Test") was performed on certain textured articles to determine their durability. In the Abrasion Test, the surface durability of the disclosed surface design against small particles was evaluated using sand abrasion. The Abrasion Test is intended to mimic field events such as contaminated fingertip swiping on touch screen for mobile electronic devices or keyboard keys interacting with cover glass for laptop application. In the Abrasion Test, A1 ultrafine dust particles (Powder Technology Inc, Arden Hills, MN) were prepared as a mixture in olive oil and then dropped onto the prepared antiglare textured surface. A vertical force was applied onto the particle infused area through a pad. The pad was moving laterally in a reciprocal motion to induce contact events between the sand particles and the textured surface. Three sets of runs were prescribed in discrete locations with 200, 400 and 1000 cycles, respectively to interrogate the surface with different aggressiveness. The post-abrasion samples were first wiped with methanol to remove the remaining particles and subsequently inspected in a light booth with D65 lighting. Track visibility was used to indicate the damage resistance. A highly visible track after test usually means more severe damage is introduced, while a lower visible track indicates lower damage severity.

This example demonstrates structural and optical properties of textured articles consistent with the disclosures herein ("Examples") as compared to comparative textured articles produced by comparative processes ("Comp. Processes").

The Examples were prepared according to the disclosures herein. In particular, a photomask having randomly placed pinholes with diameters of about 2-5 micron was fabricated. A molybdenum thin film etch stop layer was then deposited on a glass substrate (Substrate D) and photolithography used to transfer the pinhole pattern into the molybdenum layer, the pinholes penetrating through to the underlying glass substrate. The masked substrate was then subjected to a first etching step by immersion in an etching solution for a relatively short time period to remove a thickness of about 2-10 microns of the glass substrate through the pinholes as well as from the back side of the glass substrate, thereby creating small etch pits underneath each of the pinholes. If desired, only the masked side of the substrate may be subjected to the etch solution. The molybdenum mask was then removed, and the unmasked surface subjected to a second etching step for a relatively longer period of time (compared to the first etching step) to remove a thickness of about 10-100 microns of the glass substrate generally until the etched features from the first etching step coalesce, thereby producing a smooth surface with undulating features. Alternatives to molybdenum can be employed as the stop layer if desired, such as any of those known in the art including silicon carbide, silicon nitride, titanium, titanium nitride, aluminum, aluminum nitride, chromium, chromium oxynitride, zirconium, niobium, tungsten, copper, nickel, chromium plus titanium, or any combination thereof.

The first (shorter) etching step was conducted with an aqueous etching solution containing 0.1-20 wt. % HF (such as 0.57 wt. %) and 0-10 wt. % fluorosurfactant (such as 3.4 wt. %) at a temperature of room temperature to 50° C. for a time period of 1-60 min. The second (longer) etching step was conducted with an aqueous etching solution containing 1-20 wt. % HF (such as 10 wt. %) at a temperature of room temperature to 50° C. for a time period of 1 min to 2 hrs. In general, varying the etching conditions within these boundaries resulted in the variability of results shown in FIGS. 1-14. Alternative conditions for the first etching step include NaOH and/or KOH at 1-50 wt. %, room temperature to 150° C., and 1 min to 2 hours. Alternative conditions for the second etching step include NaOH and/or KOH at 10-70 wt. %, 70-165° C., 10 min to 4 hours.

Comp. Process #1 is a cream etching process used to prepare textured articles from Substrates A and B. This process is very similar to Comp. Process #4. A main difference is that Comp. Process #1 uses an etchant containing suspended solid (e.g., a cream). This process is usually considered to be able to etch the glass surface more uniformly. This process is described in U.S. Pat. No. 10,690,818.

Comp. Process #2 is a photolithography-based antiglare texture produced using Substrate C according to the disclosures of co-assigned WO 2022/011067 A1, the contents of which are incorporated by reference herein in its entirety. The photolithography process enables the manufacture of engineered/predefined textured glass articles. In contrast, sandblasting, regular chemical etching processes, and so forth produce random textured glass articles Comp. Process #3 is a sandblast-and-etch (SBE) process used to prepare textured articles from Substrates A, D, and E. Surfaces of this type are created using a two step process in which the surface is first bombarded with small sand particles that create microscopic cracks over the sample face, followed by an HF etching step. The HF etching step opens up the crack sites, which become large, cuspy features following removal a thickness of the surface of about 10-50 microns of material.

Comp. Process #4 surfaces are created using a two-step nucleation and etch process used to prepare textured articles from Substrate A. During the nucleation step, a chemical like ammonium biflouride removes some glass modifiers (like Ca) present in the glass, thereby forming nucleation sites. The nucleation sites provide an etch mask for the underlying substrate, thus producing a structure that is the inverse of the nucleation topology. The nucleated material is also water soluble and can be easily removed after the etch step.

Comp. Process #5 is an anti-glare surface contained in the M3 Touch Screen Study Machine (a tablet computer) commercially available from BBK Electronics. The M3 device was disassembled and the antiglare surface tested. It is believed the antiglare surface was produced using a photolithography process generally in accordance with CN113816612A to generate cuspy features with slowly varying depths. The data reported in Table 2 for Comp. Process #5 was collected by analysis of several different areas of the same sample (i.e., multiple samples were not tested).

The results for the Examples are set forth in Table 1 and are plotted in FIGS. 1A, 1B, 1D, 7A-7E, 13, 14A, and 14B.

The results for the comparative textured articles are set forth in Table 2 and are plotted in FIGS. 1A-1C, 1E, 1F, 2, 3, 4A, 4B, 5, 6, 7A-7C, 7F, 7G, 8, 9, 10A, 10B, 11, and 12.

Figure 13:
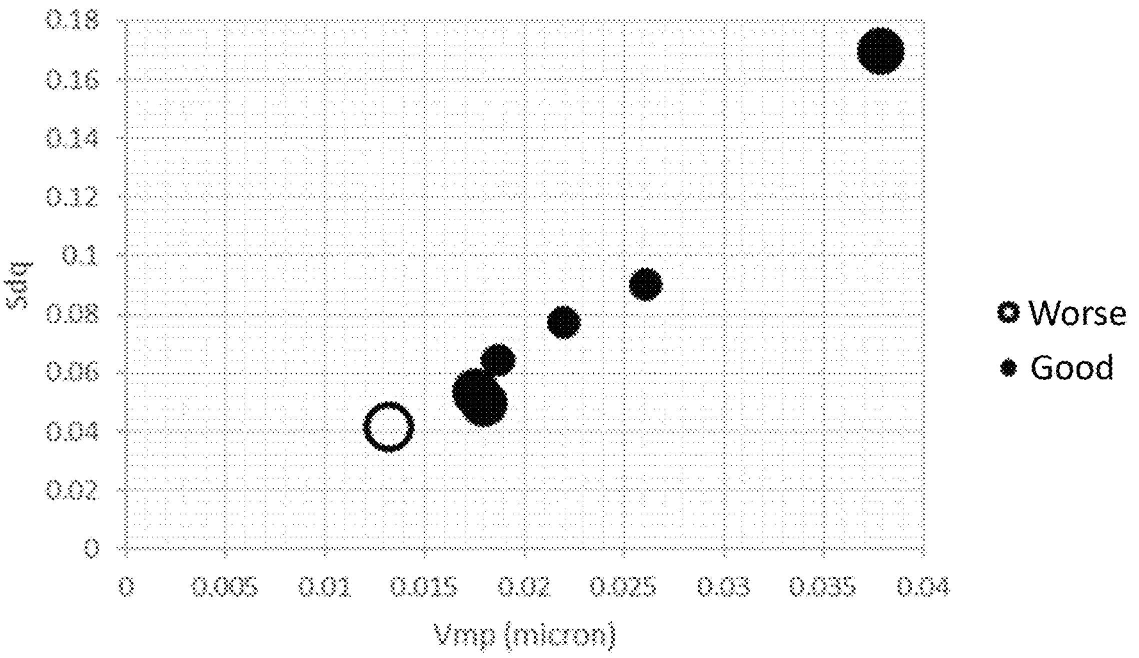
FIG. 13 is a scatter plot of Sdq vs. Vmp for antiglare textured articles produced according to the disclosures herein (Examples).

When Sdq and Vmp values are known, a wear susceptibility map can be made, such as in FIG. 13. Surfaces having a combination of high Vmp and low Sdq, as shown in FIG. 13, generally have better wear performance. As a result, other surfaces having a combination of high Vmp and low Sdq, such as the Examples data points of FIGS. 1A and 1D (i.e., those not already plotted in FIG. 13), also are expected to have better wear performance. Without wishing to be bound by theory, it is believed that Sdq and Vmp are good indicators of wear resistance for the reasons explained elsewhere herein.

Certain textured articles prepared according to the disclosures herein (Examples) were subjected to the Abrasion Test, with the results plotted in FIG. 13 for Examples 30, 26, 1, 2, 3, 4, 5, 61, 62, 63, 19, 64, and 65. A representative sample that was subjected to the Abrasion Test was analyzed by microscopy, as shown in FIG. 17D. Samples from Comp. Process #3 (i.e., sandblast-and-etch) were also subjected to the Abrasion Test, and representative articles analyzed by SEM, as shown in FIGS. 17A and 17B, and by microscopy, as shown in FIG. 17C.

In FIG. 13, filled circles showed a good abrasion test result (no or few visible marks detected), whereas open circle corresponds to worse abrasion results (at least some visible marks detected).

Figure 14A:
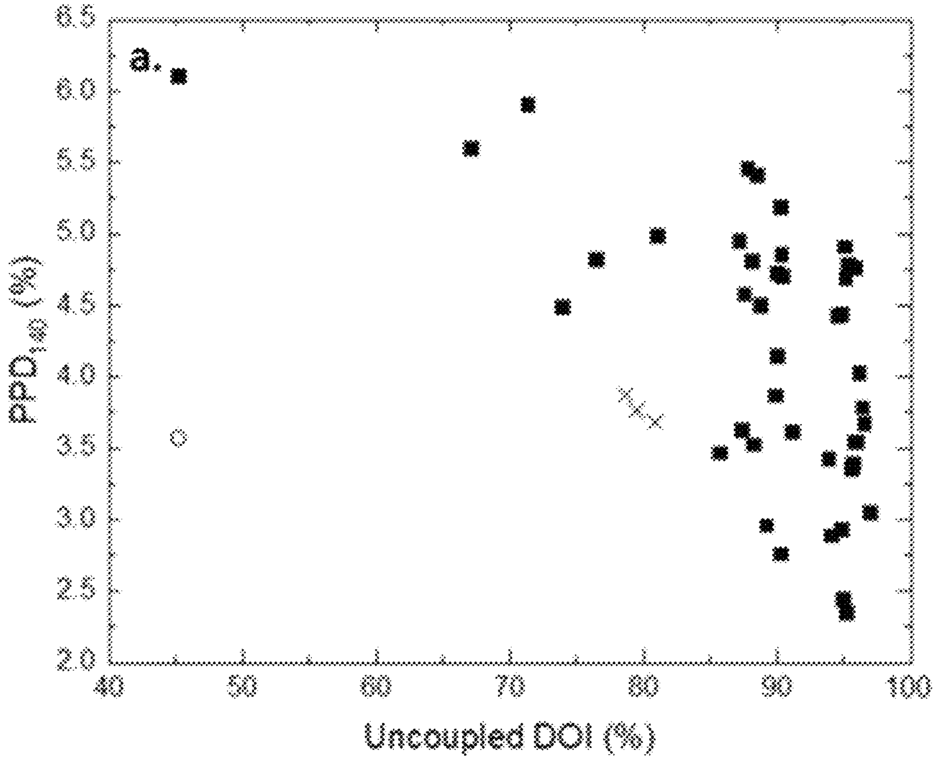
FIGS. 14A-14B are scatter plots showing PPD140 vs. Uncoupled DOI and Haze vs. Uncoupled DOI, respectively, for antiglare textured articles produced according to the disclosures herein (Examples). The "x" are the same samples in in FIGS. 14A-B and the "o" are the same samples in FIGS. 14A-B, demonstrating the versatility of the processes disclosed herein to produce textured articles having desired optical and abrasion-resistant properties.
Figure 14B:
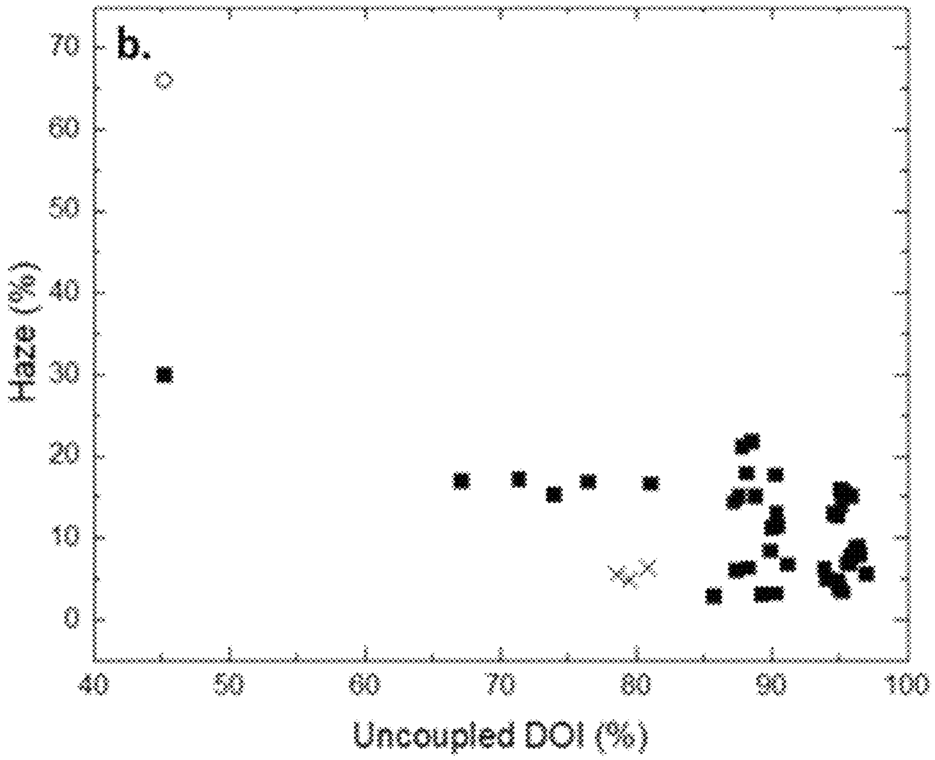

FIGS. 14A-14B show optical data from textured articles in accordance with the disclosures herein that are expected to have good abrasion performance based on the surface data from FIGS. 1-13. More particularly, FIGS. 14A and 14B show two potential desirable options: the "x" data points have low haze and the "o" data points have high haze; notably, both the high and low haze textured articles have good antiglare performance and demonstrate the versatility of the process and the textured articles herein. Moreover, the "x" data points have a $PPD_{140}$ of less than 3.7% (or less than 3.5%) at an incident angle of 0 degrees; an uncoupled DOI of less than 80%; and a haze of less than 10%; whereas the "o" data points have a $PPD_{140}$ of less than 3.5% (or less than 3%) at an incident angle of 0 degrees; an uncoupled DOI of less than 60%; and a haze of less than 70% (or less than 45%).

Figure 17A:
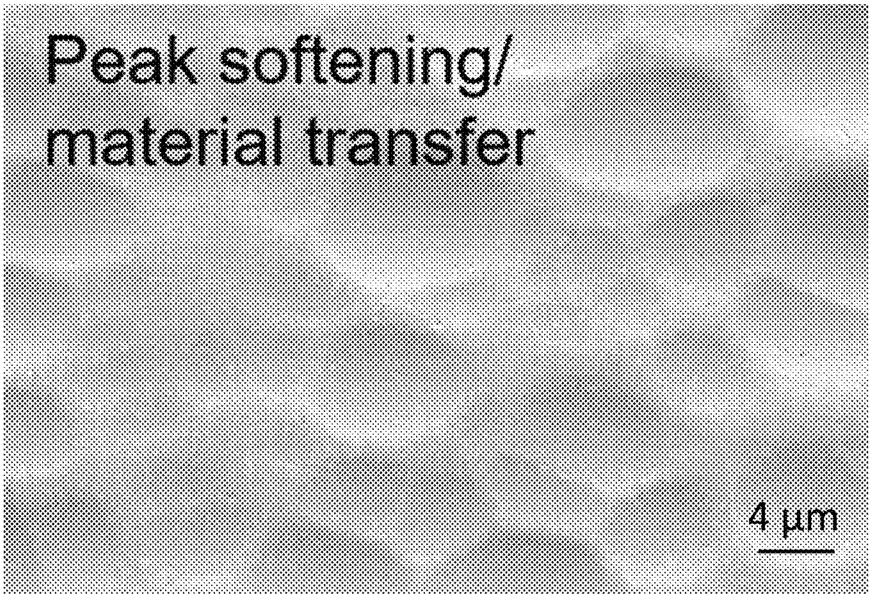
FIG. 17A is a scanning electron microscopy (SEM) image taken after a comparative substrate prepared by Comp. Process #3 (i.e., sandblast-and-etch) was subjected to the Abrasion Test. The SEM parameters are as follows: CS Gemini 450; WED=20.0 mm; EHT=5.00 kV; Mag=2.50 K X; Signal A=SE2; Vacuum Mode=High Vacuum; scale bar=4 μm.
Figure 17B:
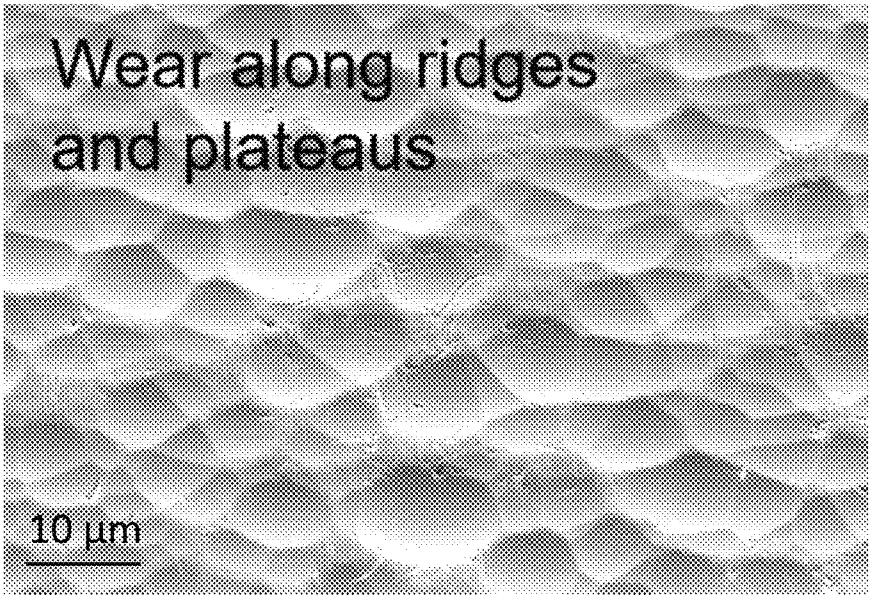
FIG. 17B is a scanning electron microscopy (SEM) image of the same comparative substrate from FIG. 17A. The SEM parameters are as follows: CS Gemini 450; WD=19.5 mm; EHT=5.00 kV; Mag=1.50 K X; Signal A=SE2; Vacuum Mode=High Vacuum; scale bar=10 μm.
Figure 17C:
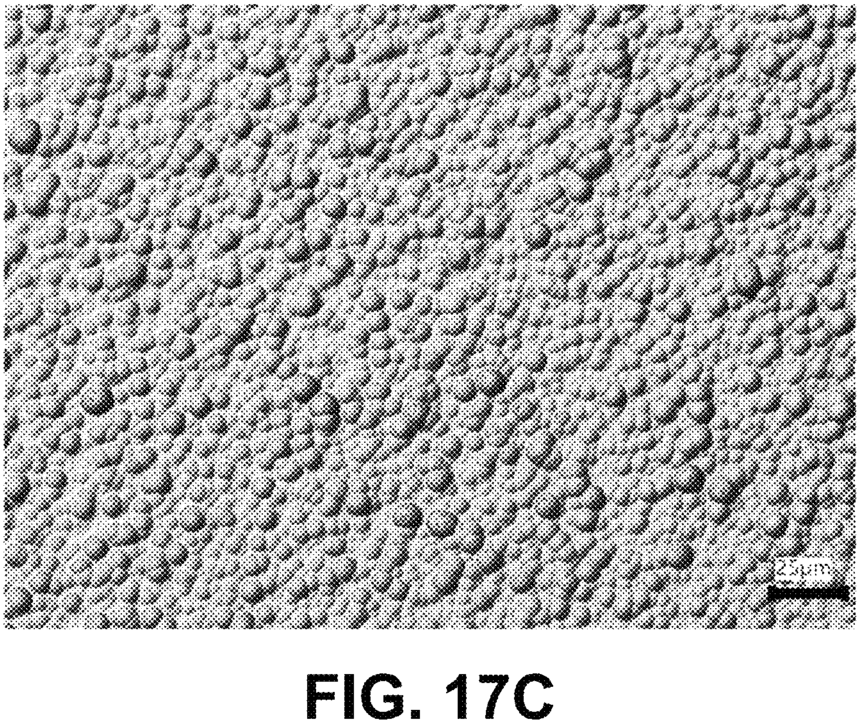
FIG. 17C is a microscopy image of the same comparative substrate from FIGS. 17A-17B. Scale bar is 25 μm.
Figure 17D:
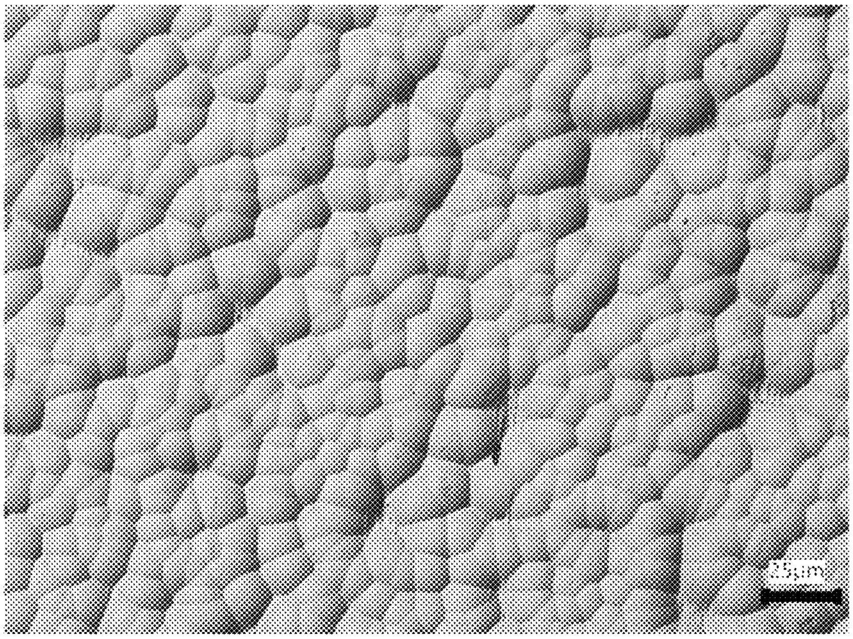
FIG. 17D is a microscopy image of a textured article prepared according to the disclosures herein. Scale bar is 25 μm.

In FIGS. 17A-17B, failure modes are revealed using SEM on sandblast-and-etch textures following abrasion from small particles in the Abrasion Test. Surface peaks (FIG. 17A) or plateau areas (FIG. 17B) can be softened at high pressure zones. In FIGS. 17C-17D, microscopy offers the ability to inspect failure modes from another perspective with a larger area included. In FIG. 17C, the high scratch visibility of sandblast-and-etch texture was attributed to the more uniform damage across the tested surface, where two major failure modes took place: wear of the cusps to create a flat regions and scratches across multiple etch pits. In FIG. 17D, which corresponds to a textured article surface prepared according to the disclosures herein, it is apparent that the inventive texture successfully mitigated some of the failure modes that can be caused by the Abrasion Test: Reduction in the number of wear spots in the cusps contributes to the reduction of track visibility in specular viewing mode. The scratches are also confined in a smaller region to help further reduce the visibility of such scratches.

TABLE 1

Optical and Structural Properties of Examples

| Sample No. | Process Type | Substrate | *Trans. (%) | Haze (%) | DOI | ** Sparkle |
|---|---|---|---|---|---|---|
| 1 | Examples | D | 92.3 | 45.8 | 83.3 | 4.06 |
| 2 | Examples | D | 93.1 | 17.8 | 90.26 | 5.19 |
| 3 | Examples | D | 93.3 | 6.4 | 93.86 | 3.43 |
| 4 | Examples | D | 92.9 | 4.91 | 94.82 | 2.93 |
| 5 | Examples | D | 93.2 | 3.54 | 95.47 | 2.36 |
| 6 | Examples | D | 93.4 | 21.9 | 88.5 | 5.41 |
| 7 | Examples | D | 93.4 | 21.2 | 87.79 | 5.46 |
| 8 | Examples | D | 93.5 | 14.4 | 87.13 | 4.95 |
| 9 | Examples | D | 93.5 | 6.88 | 91.11 | 3.62 |
| 10 | Examples | D | 93.6 | 3.27 | 94.25 | 2.33 |
| 11 | Examples | D | 93.4 | 16.7 | 81.01 | 4.99 |
| 12 | Examples | D | 93.6 | 6.46 | 88.2 | 3.53 |
| 13 | Examples | D | 93.6 | 3.29 | 90.26 | 2.76 |
| 14 | Examples | D | 93.4 | 16.9 | 76.47 | 4.82 |
| 15 | Examples | D | 93.6 | 6.14 | 87.37 | 3.63 |
| 16 | Examples | D | 93.7 | 3.14 | 89.18 | 2.96 |
| 17 | Examples | D | 93.5 | 15.4 | 73.89 | 4.49 |
| 18 | Examples | D | 93.6 | 6.27 | 80.89 | 3.68 |
| 19 | Examples | D | 93.6 | 3 | 85.68 | 3.47 |
| 20 | Examples | D | 92.8 | 37.1 | 84.48 | 4.35 |
| 21 | Examples | D | 93.2 | 15.1 | 87.5 | 4.58 |
| 22 | Examples | D | 93.3 | 5.05 | 94.06 | 2.89 |
| 23 | Examples | D | 93.2 | 4.02 | 94.94 | 2.45 |
| 24 | Examples | D | 93.3 | 3.52 | 95.19 | 2.35 |
| 25 | Examples | D | 93.4 | 15.2 | 88.72 | 4.5 |
| 26 | Examples | D | 93.3 | 11.5 | 89.97 | 4.15 |
| 27 | Examples | D | 93.3 | 12.5 | 91.62 | 4.25 |
| 28 | Examples | D | 92.6 | 43.2 | 79.68 | 4.49 |
| 29 | Examples | D | 93.2 | 18 | 88.1 | 4.81 |
| 30 | Examples | D | 93.3 | 8.565 | 89.89 | 3.87 |
| 31 | Examples | D | 92.6 | 50.6 | 84.85 | 5.82 |
| 32 | Examples | D | 92.6 | 50 | 87.84 | 5.81 |
| 33 | Examples | D | 92.9 | 44.6 | 68.07 | 4.72 |
| 34 | Examples | D | 93.1 | 43.1 | 68.47 | 4.7 |
| 35 | Examples | D | 93.2 | 36.5 | 60.27 | 4.93 |
| 36 | Examples | D | 93.4 | 31.1 | 70.94 | 5.04 |
| 37 | Examples | D | 93.5 | 17.2 | 71.32 | 5.91 |
| 38 | Examples | D | 93.4 | 17.1 | 67.07 | 5.6 |
| 39 | Examples | D | 93.3 | 15.2 | 95.83 | 4.76 |
| 40 | Examples | D | 93.4 | 16 | 95.02 | 4.91 |
| 41 | Examples | D | 93.5 | 8.06 | 96.53 | 3.68 |
| 42 | Examples | D | 93.5 | 9.15 | 96.41 | 3.79 |
| 43 | Examples | D | 93.5 | 5.67 | 96.92 | 3.05 |
| 44 | Examples | D | 93.5 | 8.03 | 95.91 | 3.55 |
| 45 | Examples | D | 93.6 | 2.38 | 97.75 | 1.42 |
| 46 | Examples | D | 93.6 | 2.79 | 97.48 | 1.57 |
| 47 | Examples | D | 93.3 | 15.7 | 95.34 | 4.79 |
| 48 | Examples | D | 93.4 | 8.8 | 96.16 | 4.03 |
| 49 | Examples | D | 93.6 | 3.89 | 97.15 | 2.87 |
| 50 | Examples | D | 93.3 | 14.1 | 95.13 | 4.69 |
| 51 | Examples | D | 93.5 | 7.81 | 95.83 | 3.55 |
| 52 | Examples | D | 93.6 | 3.18 | 96.91 | 2.49 |
| 53 | Examples | D | 93.5 | 12.8 | 94.87 | 4.44 |
| 54 | Examples | D | 93.4 | 7.05 | 95.54 | 3.36 |
| 55 | Examples | D | 93.6 | 3.01 | 96.51 | 2.46 |
| 56 | Examples | D | 93.5 | 13 | 94.55 | 4.43 |
| 57 | Examples | D | 93.5 | 6.97 | 95.69 | 3.39 |
| 58 | Examples | D | 93.6 | 3.26 | 96.39 | 2.5 |
| 59 | Examples | D | 91.9 | 66 | 45.17 | 3.57 |
| 60 | Examples | D | 93.3 | 30 | 45.17 | 6.11 |
| 61 | Examples | D | 93.4 | 13 | 90.32 | 4.86 |
| 62 | Examples | D | 93.4 | 11.6 | 90.38 | 4.7 |
| 63 | Examples | D | 93.4 | 11.3 | 90.01 | 4.73 |
| 64 | Examples | D | 93.5 | 5.5 | 78.62 | 3.87 |
| 65 | Examples | D | 93.6 | 4.9 | 79.5 | 3.76 |

*= Transmittance (%)
**= Sparkle ($PPD_{140}$)

TABLE 1-continued

Optical and Structural Properties of Examples

| Sample No. | Sq (μm) | Sdq | *Vmp (μm) | Smrk2 (%) | Vmp/Sq |
|---|---|---|---|---|---|
| 1 | 0.46236 | 0.197747 | 0.035777 | 96.226 | 0.07738 |
| 2 | 0.27239 | 0.095024 | 0.026416 | 97.806 | 0.09698 |
| 3 | 0.16260 | 0.053675 | 0.017345 | 98.225 | 0.10667 |
| 4 | 0.16018 | 0.049882 | 0.017702 | 98.271 | 0.11051 |
| 5 | 0.12781 | 0.041556 | 0.013158 | 98.714 | 0.10295 |
| 6 | 0.27296 | 0.104395 | 0.027521 | 96.428 | 0.10083 |
| 7 | 0.28278 | 0.105198 | 0.028159 | 99.370 | 0.09958 |
| 8 | 0.26856 | 0.088260 | 0.028749 | 97.648 | 0.10705 |
| 9 | 0.17511 | 0.057317 | 0.017543 | 97.481 | 0.10019 |
| 10 | 0.12341 | 0.039793 | 0.012617 | 96.247 | 0.10224 |
| 11 | 0.24720 | 0.085073 | 0.025225 | 96.552 | 0.10204 |
| 12 | 0.18992 | 0.056033 | 0.019707 | 97.177 | 0.10376 |
| 13 | 0.14655 | 0.042315 | 0.014068 | 95.921 | 0.09600 |
| 14 | 0.28411 | 0.092826 | 0.027959 | 96.588 | 0.09841 |
| 15 | 0.18894 | 0.055922 | 0.018586 | 96.190 | 0.09837 |
| 16 | 0.14459 | 0.039619 | 0.014952 | 95.254 | 0.10341 |
| 17 | 0.26815 | 0.085822 | 0.025326 | 95.014 | 0.09445 |
| 18 | 0.19625 | 0.056752 | 0.018017 | 95.450 | 0.09180 |
| 19 | 0.15712 | 0.040437 | 0.014521 | 95.420 | 0.09242 |
| 20 | 0.35890 | 0.165633 | 0.013149 | 98.003 | 0.03664 |
| 21 | 0.24823 | 0.085903 | 0.021457 | 99.428 | 0.08644 |
| 22 | 0.15062 | 0.050654 | 0.014206 | 98.136 | 0.09431 |
| 23 | 0.13888 | 0.045443 | 0.014137 | 96.975 | 0.10179 |
| 24 | 0.13269 | 0.041678 | 0.014806 | 96.150 | 0.11159 |
| 25 | 0.24465 | 0.081805 | 0.024543 | 97.663 | 0.10032 |
| 26 | 0.22584 | 0.081513 | 0.022131 | 98.480 | 0.09799 |
| 27 | | | | | |
| 28 | 0.42971 | 0.158076 | 0.036049 | 97.408 | 0.08389 |
| 29 | 0.28787 | 0.092858 | 0.026516 | 92.494 | 0.09211 |
| 30 | 0.18353 | 0.072722 | 0.018566 | 98.823 | 0.10116 |
| 31 | 0.58566 | 0.283787 | 0.005348 | 65.685 | 0.00913 |
| 32 | 0.52896 | 0.259372 | 0.001814 | 50.806 | 0.00343 |
| 33 | 0.54619 | 0.199475 | 0.005464 | 98.965 | 0.01000 |
| 34 | 0.51591 | 0.193878 | 0.005108 | 98.823 | 0.00990 |
| 35 | 0.47281 | 0.158767 | 0.016738 | 98.147 | 0.03540 |
| 36 | 0.42689 | 0.157016 | 0.002757 | 97.460 | 0.00646 |
| 37 | 0.36432 | 0.093970 | 0.031850 | 95.905 | 0.08742 |
| 38 | 0.35518 | 0.089442 | 0.031172 | 97.385 | 0.08776 |
| 39 | 0.18487 | 0.091844 | 0.022136 | 96.792 | 0.11974 |
| 40 | 0.22257 | 0.102039 | 0.028425 | 94.371 | 0.12771 |
| 41 | 0.12693 | 0.056665 | 0.015852 | 95.995 | 0.12489 |
| 42 | 0.15203 | 0.064809 | 0.018509 | 97.715 | 0.12175 |
| 43 | 0.15281 | 0.058826 | 0.018712 | 98.384 | 0.12246 |
| 44 | 0.13670 | 0.058898 | 0.014566 | 99.509 | 0.10655 |
| 45 | 0.08870 | 0.033348 | 0.010570 | 96.479 | 0.11917 |
| 46 | 0.10298 | 0.039727 | 0.011718 | 98.314 | 0.11379 |
| 47 | 0.21315 | 0.100123 | 0.026651 | 95.474 | 0.12503 |
| 48 | 0.15268 | 0.063382 | 0.018366 | 95.897 | 0.12029 |
| 49 | 0.10499 | 0.041531 | 0.012733 | 96.896 | 0.12127 |
| 50 | 0.20349 | 0.091267 | 0.025557 | 97.392 | 0.12559 |
| 51 | 0.13804 | 0.058110 | 0.015907 | 97.586 | 0.11523 |
| 52 | 0.09898 | 0.038561 | 0.011268 | 96.094 | 0.11384 |
| 53 | 0.22924 | 0.094034 | 0.028893 | 96.044 | 0.12604 |
| 54 | 0.15872 | 0.059277 | 0.019730 | 95.792 | 0.12431 |
| 55 | 0.10838 | 0.039593 | 0.012644 | 97.135 | 0.11666 |
| 56 | 0.19269 | 0.088725 | 0.021785 | 97.157 | 0.11306 |
| 57 | 0.17118 | 0.065102 | 0.020876 | 96.483 | 0.12195 |
| 58 | 0.10631 | 0.039172 | 0.012474 | 95.858 | 0.11734 |
| 59 | 0.94222 | 0.293652 | 0.081506 | 97.036 | 0.08650 |
| 60 | 0.47541 | 0.120889 | 0.044964 | 96.491 | 0.09458 |
| 61 | 0.22318 | 0.082123 | 0.021297 | 98.644 | 0.09543 |
| 62 | 0.24010 | 0.081353 | 0.024206 | 98.790 | 0.10082 |
| 63 | 0.22242 | 0.078151 | 0.021770 | 96.403 | 0.09788 |
| 64 | 0.20502 | 0.053030 | 0.019779 | 94.962 | 0.09647 |
| 65 | 0.19451 | 0.053349 | 0.018603 | 95.679 | 0.09564 |

*Vmp (p = 10%, in which p represents the material ratio - all surface volume of peaks that cover the top most 10% of the surface area - the same material ratio referenced for Smr, Smrk2, and so forth)

TABLE 2

Optical and Structural Properties of Comparative Samples ("Comp. Processes")

| Sample No. | Process Type | Sub-strate | *Trans. (%) | Haze (%) | DOI | ** Sparkle |
|---|---|---|---|---|---|---|
| C1 | Comp. Process #1 | A | 92.5 | 26.3 | 68.87 | 3.84 |
| C2 | Comp. Process #1 | A | 92.5 | 26.3 | 66.11 | 3.83 |
| C3 | Comp. Process #1 | B | 92.5 | 21.4 | 66.33 | 4.07 |

TABLE 2-continued

Optical and Structural Properties of Comparative Samples ("Comp. Processes")

| | | | | | | |
|---|---|---|---|---|---|---|
| C4 | Comp. Process #1 | B | 92.7 | 21.5 | 38.08 | 4.22 |
| C5 | Comp. Process #1 | B | 92.4 | 25.4 | 48.83 | 4.1 |
| C6 | Comp. Process #1 | B | 92.6 | 20.4 | 51.73 | 4.15 |
| C7 | Comp. Process #2 | C | 93.1 | 9.35 | 34.07 | 7.04 |
| C8 | Comp. Process #2 | C | 93.2 | 4.99 | 59.81 | 7.94 |
| C9 | Comp. Process #2 | C | 92.7 | 19 | 97.23 | 1.59 |
| C10 | Comp. Process #2 | C | 91.5 | 50 | 95.87 | 2.12 |
| C11 | Comp. Process #2 | C | 90.1 | 64.3 | 68.8 | 2.52 |
| C12 | Comp. Process #2 | C | 93.1 | 2.22 | 95.18 | 3.01 |
| C13 | Comp. Process #2 | C | 91.8 | 51.2 | 70.72 | 2.56 |
| C14 | Comp. Process #2 | C | 92.1 | 47.4 | 84.77 | 2.38 |
| C15 | Comp. Process #3 | A | 93.1 | 22.5 | 90.46 | 4.05 |
| C16 | Comp. Process #3 | A | 93.2 | 18.3 | 86.08 | 4.83 |
| C17 | Comp. Process #3 | A | 93.3 | 13 | 84.99 | 5.29 |
| C18 | Comp. Process #3 | A | 92.6 | 36.6 | 74.21 | 3.77 |
| C19 | Comp. Process #3 | A | 92.7 | 34 | 74.56 | 3.94 |
| C20 | Comp. Process #3 | A | 92.9 | 26 | 75.96 | 4.47 |
| C21 | Comp. Process #3 | A | 93 | 22.1 | 75.81 | 4.91 |
| C22 | Comp. Process #3 | A | 93.1 | 17 | 78.61 | 5.09 |
| C23 | Comp. Process #3 | A | 92.8 | 29.8 | 85.52 | 3.92 |
| C24 | Comp. Process #3 | A | 93 | 17.3 | 88.3 | 4.54 |
| C25 | Comp. Process #3 | A | 93.1 | 12 | 87.53 | 5.19 |
| C26 | Comp. Process #3 | A | 93 | 22.5 | 88.95 | 4.21 |
| C27 | Comp. Process #3 | A | 93.1 | 23.2 | 89.93 | 4.07 |
| C28 | Comp. Process #3 | A | 93.1 | 22.6 | 90.54 | 4.02 |
| C29 | Comp. Process #3 | A | 93.2 | 17.6 | 87.05 | 4.67 |
| C30 | Comp. Process #3 | A | 93.2 | 18.5 | 86.5 | 4.88 |
| C31 | Comp. Process #3 | A | 93.2 | 13.1 | 83.03 | 5.58 |
| C32 | Comp. Process #3 | A | 93.2 | 11.7 | 88.65 | 4.86 |
| C33 | Comp. Process #3 | A | 93 | 11.1 | 97.84 | 2.16 |
| C34 | Comp. Process #3 | A | 93.2 | 3.36 | 97.96 | 2.01 |
| C35 | Comp. Process #3 | A | 93.2 | 0.85 | 98.32 | 1.47 |
| C36 | Comp. Process #3 | A | 92.7 | 29 | 95.3 | 3.08 |
| C37 | Comp. Process #3 | A | 93.1 | 11.9 | 95.08 | 3.61 |
| C38 | Comp. Process #3 | A | 93.2 | 3.5 | 95.5 | 3.77 |
| C39 | Comp. Process #3 | A | 92.6 | 41 | 88.91 | 3.18 |
| C40 | Comp. Process #3 | A | 93.1 | 23 | 87.94 | 4 |
| C41 | Comp. Process #3 | A | 93.2 | 11.6 | 86.02 | 4.73 |
| C42 | Comp. Process #3 | D | | 31.7 | 81.3 | |
| C43 | Comp. Process #3 | D | | 25.1 | 80.8 | |
| C44 | Comp. Process #3 | D | | 35.8 | 82.1 | |
| C45 | Comp. Process #3 | D | | 29.1 | 85.5 | |
| C46 | Comp. Process #3 | D | | 28.9 | 79.7 | |
| C47 | Comp. Process #3 | D | 92.9 | 31.8 | 85.03 | 3.99 |
| C48 | Comp. Process #3 | D | 92.8 | 31.8 | 90.26 | 3.96 |
| C49 | Comp. Process #3 | D | 92.8 | 32.5 | 94.16 | 4.6 |
| C50 | Comp. Process #3 | D | 92.8 | 31.5 | 89.46 | 4.11 |
| C51 | Comp. Process #3 | D | 93.1 | 19 | 84.57 | 4.71 |
| C52 | Comp. Process #3 | D | 93.1 | 18.9 | 78.9 | 5.42 |
| C53 | Comp. Process #3 | D | 93.1 | 19.9 | 82.6 | 4.8 |
| C54 | Comp. Process #3 | D | 93.2 | 13.3 | 81.2 | 5.48 |
| C55 | Comp. Process #3 | D | 93.2 | 12.8 | 80.57 | 5.45 |
| C56 | Comp. Process #3 | D | 93.2 | 12.8 | 71.99 | 5.9 |
| C57 | Comp. Process #3 | D | 93.2 | 12.8 | 80.49 | 5.41 |
| C58 | Comp. Process #3 | D | 93 | 18.8 | 82.33 | 4.9 |
| C59 | Comp. Process #3 | D | 93 | 12.3 | 85.22 | 5.18 |
| C60 | Comp. Process #3 | D | 92.9 | 23.5 | 91.07 | 4.07 |
| C61 | Comp. Process #3 | D | 92.9 | 17.9 | 89.74 | 4.62 |
| C62 | Comp. Process #3 | D | 93 | 12.2 | 84.47 | 5.38 |
| C63 | Comp. Process #3 | D | 92.8 | 32.2 | 76.29 | 4.06 |
| C64 | Comp. Process #3 | D | 92.9 | 30.2 | 75.29 | 4.1 |
| C65 | Comp. Process #3 | D | 93 | 28.5 | 77.77 | 4.18 |
| C66 | Comp. Process #3 | D | 93 | 26.7 | 79.4 | 4.38 |
| C67 | Comp. Process #3 | D | 92.9 | 31.4 | 88.83 | 3.68 |
| C68 | Comp. Process #3 | D | 92.8 | 29.6 | 89.32 | 3.74 |
| C69 | Comp. Process #3 | D | 92.9 | 27 | 87.82 | 3.89 |
| C70 | Comp. Process #3 | D | 93 | 26.1 | 86.52 | 3.91 |
| C71 | Comp. Process #3 | D | 92.5 | 34.6 | 93.7 | 3.19 |
| C72 | Comp. Process #3 | D | 92.9 | 23.2 | 91.3 | 3.81 |
| C73 | Comp. Process #3 | D | 92.4 | 39.9 | 90.1 | 3.26 |
| C74 | Comp. Process #3 | D | 92.8 | 25 | 87.2 | 3.93 |
| C75 | Comp. Process #3 | D | 93.1 | 24.9 | 75.99 | 4.47 |
| C76 | Comp. Process #3 | D | 93.1 | 18.5 | 73.45 | 4.99 |
| C77 | Comp. Process #3 | D | 93.1 | 12.6 | 79.39 | 5.26 |
| C78 | Comp. Process #3 | D | 93.3 | 6.8 | 76.74 | 6.08 |
| C79 | Comp. Process #3 | D | 92.5 | 33.2 | 72.1 | 3.91 |
| C80 | Comp. Process #3 | D | 93.1 | 18.2 | 85.22 | 4.85 |
| C81 | Comp. Process #3 | D | 92.9 | 18.1 | 84.65 | 4.78 |
| C82 | Comp. Process #3 | D | 93.1 | 12.7 | 82.87 | 5.35 |
| C83 | Comp. Process #3 | D | 93.1 | 12.7 | 82.88 | 5.36 |
| C84 | Comp. Process #3 | D | 92.8 | 22.5 | 92.04 | 4.09 |
| C85 | Comp. Process #3 | D | 92.9 | 23 | 91.48 | 3.98 |
| C86 | Comp. Process #3 | D | 93 | 17.7 | 90.58 | 4.55 |
| C87 | Comp. Process #3 | D | 93 | 18 | 90.99 | 4.36 |
| C88 | Comp. Process #3 | D | 93 | 12.2 | 84.29 | 5.38 |
| C89 | Comp. Process #3 | D | 93.1 | 12.3 | 82.87 | 5.53 |
| C90 | Comp. Process #3 | D | 93.1 | 19 | 82.43 | 4.97 |
| C91 | Comp. Process #3 | D | 93.1 | 18.9 | 82.46 | 5.09 |
| C92 | Comp. Process #3 | D | 93.2 | 19 | 85.02 | 4.77 |
| C93 | Comp. Process #3 | D | 93.1 | 19.1 | 78.36 | 5.24 |
| C94 | Comp. Process #3 | D | 93.1 | 19.6 | 83.1 | 4.82 |
| C95 | Comp. Process #3 | D | 93.2 | 13.2 | 81.34 | 5.44 |
| C96 | Comp. Process #3 | D | 93.2 | 12.8 | 81.85 | 5.53 |
| C97 | Comp. Process #3 | D | 93.3 | 12.7 | 69.6 | 5.98 |
| C98 | Comp. Process #3 | D | 93.2 | 12.7 | 79.35 | 5.57 |
| C99 | Comp. Process #3 | D | 92.9 | 32.5 | 86.35 | 4.14 |
| C100 | Comp. Process #3 | D | 92.8 | 31.9 | 90.03 | 4 |
| C101 | Comp. Process #3 | D | 92.9 | 32.4 | 83.27 | 4.63 |
| C102 | Comp. Process #3 | D | 92.9 | 30.8 | 85.67 | 4.04 |
| C103 | Comp. Process #3 | D | 92.8 | 19.3 | 97.63 | 2.91 |
| C104 | Comp. Process #3 | D | 93 | 14.3 | 95.73 | 3.43 |
| C105 | Comp. Process #3 | D | 93.1 | 8.65 | 93.8 | 3.83 |
| C106 | Comp. Process #3 | D | 93 | 12.6 | 88.94 | 4.46 |
| C107 | Comp. Process #3 | D | 92.9 | 28.3 | 92.02 | 3.52 |
| C108 | Comp. Process #3 | D | 93 | 28.3 | 91.66 | 3.47 |
| C109 | Comp. Process #3 | D | 93 | 13.7 | 85.1 | 4.68 |
| C110 | Comp. Process #3 | D | 92.5 | 32.7 | 87.97 | 3.96 |
| C111 | Comp. Process #3 | D | 92.5 | 33.4 | 87.35 | 3.95 |
| C112 | Comp. Process #3 | D | 92.9 | 24.5 | 85.99 | 4.31 |
| C113 | Comp. Process #3 | D | 93 | 24.3 | 85.36 | 4.38 |
| C114 | Comp. Process #3 | D | 93 | 17.9 | 91.43 | 4.29 |
| C115 | Comp. Process #3 | D | 93 | 17.1 | 91.32 | 4.28 |
| C116 | Comp. Process #3 | E | 92.7 | 31.4 | 79.53 | 4.02 |
| C117 | Comp. Process #3 | E | 92.8 | 24.7 | 77.69 | 4.5 |
| C118 | Comp. Process #3 | E | 92.9 | 18.3 | 77.42 | 5.47 |
| C119 | Comp. Process #3 | E | 92.8 | 15.6 | 74.8 | 5.31 |
| C120 | Comp. Process #3 | E | 93.1 | 10.8 | 69.82 | 6.16 |
| C121 | Comp. Process #3 | E | 92.5 | 31.5 | 95.1 | 3.55 |
| C122 | Comp. Process #3 | E | 92.7 | 25.5 | 99.3 | 3.47 |
| C123 | Comp. Process #3 | E | 92.9 | 21.9 | 90.34 | 4.05 |
| C124 | Comp. Process #3 | E | 93 | 16.2 | 87.69 | 4.47 |
| C125 | Comp. Process #3 | E | 93.2 | 11.7 | 84.76 | 4.75 |
| C126 | Comp. Process #4 | A | 92.7 | 21.6 | 97.99 | 1.94 |
| C127 | Comp. Process #4 | A | 93 | 5.8 | 98.45 | 1.32 |
| C128 | Comp. Process #4 | A | 92.5 | 28.6 | 98.37 | 1.72 |
| C129 | Comp. Process #4 | A | 93 | 11.2 | 98.56 | 1.42 |
| †C130 | Comp. Process #5 | F | | | | |
| †C131 | Comp. Process #5 | F | | | | |
| †C132 | Comp. Process #5 | F | | | | |
| †C133 | Comp. Process #5 | F | | | | |
| †C134 | Comp. Process #5 | F | | | | |

* = Transmittance (%)
**= Sparkle ($PPD_{140}$)
†The data reported for Comp. Process #5 was collected by analysis of several different areas of the same sample (i.e., separate samples were not tested).

| Sample No. | Sq (μm) | Sdq | *Vmp (μm) | Smrk2 (%) | Vmp/Sq |
|---|---|---|---|---|---|
| C1 | 0.22640 | 0.133200 | 0.00847 | 88.761 | 0.03743 |
| C2 | 0.22800 | 0.132205 | 0.00834 | 88.432 | 0.03658 |
| C3 | 0.31081 | 0.106040 | 0.02232 | 97.418 | 0.07181 |
| C4 | 0.32607 | 0.105824 | 0.02224 | 95.544 | 0.06820 |
| C5 | 0.37598 | 0.129635 | 0.03130 | 98.283 | 0.08326 |
| C6 | 0.35183 | 0.112901 | 0.02547 | 95.140 | 0.07240 |
| C7 | 0.32247 | 0.113251 | 0.00023 | 50.672 | 0.00073 |
| C8 | 0.18576 | 0.101761 | 0.00010 | 74.689 | 0.00056 |
| C9 | 0.11575 | 0.210113 | 0.00162 | 74.284 | 0.01400 |
| C10 | 0.19328 | 0.316870 | 0.00467 | 99.583 | 0.02418 |
| C11 | 0.24050 | 0.351658 | 0.00629 | 99.930 | 0.02616 |
| C12 | 0.10011 | 0.045448 | 0.00051 | 78.288 | 0.00513 |
| C13 | 0.09660 | 0.090137 | 0.00667 | 67.181 | 0.06906 |
| C14 | 0.17196 | 0.268463 | 0.00644 | 99.834 | 0.03744 |

TABLE 2-continued

Optical and Structural Properties of Comparative Samples ("Comp. Processes")

| | | | | | |
|---|---|---|---|---|---|
| C15 | 0.17687 | 0.107822 | 0.00584 | 87.164 | 0.03302 |
| C16 | 0.19281 | 0.092988 | 0.00627 | 86.049 | 0.03251 |
| C17 | 0.19417 | 0.078834 | 0.00574 | 84.679 | 0.02958 |
| C18 | 0.24718 | 0.176859 | 0.00692 | 87.570 | 0.02798 |
| C19 | 0.24426 | 0.162775 | 0.00756 | 87.546 | 0.03094 |
| C20 | 0.22861 | 0.122501 | 0.00764 | 86.591 | 0.03342 |
| C21 | 0.22403 | 0.108600 | 0.00758 | 86.188 | 0.03382 |
| C22 | 0.21830 | 0.093550 | 0.006618 | 85.933 | 0.03032 |
| C23 | 0.21710 | 0.154112 | 0.005449 | 87.239 | 0.02510 |
| C24 | 0.18067 | 0.092450 | 0.005854 | 86.602 | 0.03240 |
| C25 | 0.16855 | 0.073805 | 0.005577 | 86.707 | 0.03309 |
| C26 | 0.19161 | 0.112735 | 0.006509 | 86.726 | 0.03397 |
| C27 | 0.18301 | 0.108911 | 0.004951 | 86.947 | 0.02705 |
| C28 | 0.17972 | 0.108279 | 0.005406 | 86.758 | 0.03008 |
| C29 | 0.19617 | 0.093538 | 0.004497 | 86.651 | 0.02292 |
| C30 | 0.19411 | 0.094449 | 0.005935 | 85.489 | 0.03057 |
| C31 | 0.20463 | 0.079063 | 0.005843 | 84.244 | 0.02856 |
| C32 | 0.16775 | 0.073624 | 0.005532 | 86.164 | 0.03298 |
| C33 | 0.08973 | 0.074479 | 0.002055 | 86.056 | 0.02290 |
| C34 | 0.06327 | 0.035619 | 0.001845 | 85.660 | 0.02917 |
| C35 | 0.06327 | 0.035619 | 0.001845 | 85.660 | 0.02917 |
| C36 | 0.15820 | 0.190041 | 0.005324 | 86.897 | 0.03365 |
| C37 | 0.12458 | 0.075663 | 0.004033 | 86.264 | 0.03238 |
| C38 | 0.09996 | 0.040090 | 0.002790 | 85.870 | 0.02791 |
| C39 | 0.20820 | 0.258260 | 0.006074 | 87.890 | 0.02917 |
| C40 | 0.19292 | 0.129314 | 0.006624 | 86.939 | 0.03433 |
| C41 | 0.17538 | 0.073951 | 0.005543 | 86.744 | 0.03160 |
| C42 | 0.23547 | 0.171166 | 0.007768 | 86.546 | 0.03299 |
| C43 | 0.22596 | 0.127693 | 0.007167 | 86.519 | 0.03172 |
| C44 | 0.23198 | 0.197335 | 0.007498 | 86.288 | 0.03232 |
| C45 | 0.23803 | 0.161562 | 0.007202 | 86.424 | 0.03025 |
| C46 | 0.21626 | 0.141672 | 0.006941 | 86.621 | 0.03210 |
| C47 | 0.22240 | 0.132648 | 0.005016 | 86.748 | 0.02255 |
| C48 | 0.20527 | 0.138726 | 0.002499 | 85.081 | 0.01217 |
| C49 | 0.21925 | 0.162043 | 0.001299 | 61.399 | 0.00593 |
| C50 | 0.20499 | 0.135829 | 0.002034 | 81.409 | 0.00992 |
| C51 | 0.20067 | 0.096599 | 0.006142 | 85.326 | 0.03061 |
| C52 | 0.22503 | 0.096350 | 0.002694 | 86.383 | 0.01197 |
| C53 | 0.20142 | 0.096161 | 0.006388 | 86.085 | 0.03171 |
| C54 | 0.19247 | 0.077863 | 0.006336 | 85.959 | 0.03292 |
| C55 | 0.20836 | 0.080501 | 0.005848 | 85.445 | 0.02807 |
| C56 | 0.22548 | 0.078677 | 0.004725 | 86.587 | 0.02095 |
| C57 | 0.21169 | 0.079887 | 0.006473 | 85.299 | 0.03058 |
| C58 | 0.21801 | 0.096733 | 0.006082 | 85.110 | 0.02790 |
| C59 | 0.18917 | 0.076349 | 0.005746 | 85.829 | 0.03037 |
| C60 | 0.18201 | 0.109845 | 0.004535 | 86.225 | 0.02492 |
| C61 | 0.17657 | 0.092546 | 0.003240 | 85.817 | 0.01835 |
| C62 | 0.19456 | 0.075503 | 0.005529 | 84.566 | 0.02842 |
| C63 | 0.24795 | 0.138953 | 0.007698 | 86.451 | 0.03105 |
| C64 | 0.23458 | 0.128421 | 0.007639 | 86.356 | 0.03256 |
| C65 | 0.22451 | 0.122468 | 0.006346 | 86.418 | 0.02827 |
| C66 | 0.21541 | 0.116595 | 0.006589 | 86.711 | 0.03059 |
| C67 | 0.20266 | 0.141146 | 0.003883 | 87.015 | 0.01916 |
| C68 | 0.20590 | 0.131891 | 0.004368 | 86.896 | 0.02121 |
| C69 | 0.19543 | 0.120730 | 0.003821 | 87.212 | 0.01955 |
| C70 | 0.19798 | 0.118913 | 0.004212 | 86.225 | 0.02127 |
| C71 | 0.17899 | 0.223704 | 0.003290 | 87.178 | 0.01838 |
| C72 | 0.17743 | 0.129246 | 0.005323 | 86.175 | 0.03000 |
| C73 | 0.20877 | 0.264183 | 0.003713 | 88.096 | 0.01778 |
| C74 | 0.20465 | 0.138902 | 0.006126 | 85.914 | 0.02993 |
| C75 | 0.23793 | 0.115130 | 0.007384 | 86.131 | 0.03103 |
| C76 | 0.22383 | 0.092154 | 0.007051 | 86.326 | 0.03150 |
| C77 | 0.20540 | 0.077256 | 0.006740 | 86.746 | 0.03281 |
| C78 | 0.19575 | 0.058717 | 0.006143 | 86.331 | 0.03138 |
| C79 | 0.24154 | 0.142761 | 0.007764 | 86.133 | 0.03214 |
| C80 | 0.18773 | 0.091857 | 0.005808 | 86.677 | 0.03094 |
| C81 | 0.19349 | 0.091902 | 0.006099 | 86.334 | 0.03152 |
| C82 | 0.19484 | 0.077038 | 0.006086 | 85.778 | 0.03124 |
| C83 | 0.19634 | 0.078028 | 0.006325 | 87.134 | 0.03221 |
| C84 | 0.17902 | 0.108661 | 0.004084 | 86.472 | 0.02281 |
| C85 | 0.17659 | 0.109107 | 0.004332 | 86.557 | 0.02453 |
| C86 | 0.16885 | 0.090835 | 0.003125 | 86.283 | 0.01851 |
| C87 | 0.17377 | 0.093784 | 0.004638 | 86.214 | 0.02669 |
| C88 | 0.19014 | 0.075544 | 0.005880 | 85.429 | 0.03092 |
| C89 | 0.18693 | 0.074933 | 0.005950 | 85.918 | 0.03183 |
| C90 | 0.21587 | 0.097268 | 0.003666 | 86.239 | 0.01698 |
| C91 | 0.20735 | 0.094978 | 0.003096 | 87.412 | 0.01493 |
| C92 | 0.19013 | 0.093559 | 0.005644 | 86.146 | 0.02968 |
| C93 | 0.23129 | 0.097076 | 0.002569 | 85.296 | 0.01111 |
| C94 | 0.21155 | 0.098243 | 0.006703 | 85.966 | 0.03168 |
| C95 | 0.20994 | 0.080910 | 0.006197 | 85.472 | 0.02952 |
| C96 | 0.19874 | 0.109093 | 0.006502 | 86.452 | 0.03271 |
| C97 | 0.23552 | 0.077965 | 0.007386 | 86.247 | 0.03136 |
| C98 | 0.20834 | 0.079612 | 0.006547 | 87.176 | 0.03143 |
| C99 | 0.21404 | 0.135286 | 0.003004 | 87.469 | 0.01403 |
| C100 | 0.20563 | 0.137242 | 0.002496 | 85.104 | 0.01214 |
| C101 | 0.26088 | 0.142943 | 0.002307 | 77.529 | 0.00884 |
| C102 | 0.21255 | 0.127860 | 0.006190 | 85.956 | 0.02912 |
| C103 | 0.12185 | 0.157074 | 0.001360 | 74.436 | 0.01116 |
| C104 | 0.12585 | 0.087798 | 0.001887 | 81.357 | 0.01500 |
| C105 | 0.12556 | 0.062846 | 0.003006 | 85.053 | 0.02394 |
| C106 | 0.17371 | 0.079492 | 0.005250 | 85.819 | 0.03022 |
| C107 | 0.17804 | 0.154385 | 0.004630 | 86.541 | 0.02601 |
| C108 | 0.18309 | 0.163460 | 0.004811 | 86.452 | 0.02628 |
| C109 | 0.18246 | 0.081653 | 0.005983 | 86.063 | 0.03279 |
| C110 | 0.20343 | 0.287091 | 0.003920 | 87.071 | 0.01927 |
| C111 | 0.21066 | 0.276349 | 0.004615 | 86.743 | 0.02191 |
| C112 | 0.20718 | 0.167384 | 0.005493 | 86.738 | 0.02651 |
| C113 | 0.19931 | 0.175001 | 0.005513 | 87.013 | 0.02766 |
| C114 | 0.17940 | 0.122059 | 0.004176 | 85.960 | 0.02328 |
| C115 | 0.17699 | 0.125535 | 0.004277 | 85.707 | 0.02416 |
| C116 | 0.20524 | 0.122188 | 0.005875 | 87.103 | 0.02862 |
| C117 | 0.19440 | 0.103204 | 0.006242 | 88.112 | 0.03211 |
| C118 | 0.17966 | 0.085271 | 0.005693 | 87.348 | 0.03169 |
| C119 | 0.19022 | 0.080980 | 0.006202 | 86.278 | 0.03260 |
| C120 | 0.17103 | 0.066309 | 0.005400 | 86.091 | 0.03157 |
| C121 | 0.16047 | 0.164965 | 0.002324 | 76.583 | 0.01448 |
| C122 | 0.15775 | 0.122451 | 0.002871 | 84.678 | 0.01820 |
| C123 | 0.16230 | 0.105293 | 0.003394 | 86.576 | 0.02091 |
| C124 | 0.15419 | 0.081080 | 0.003192 | 85.899 | 0.02070 |
| C125 | 0.14869 | 0.083157 | 0.004238 | 87.240 | 0.02851 |
| C126 | 0.11047 | 0.106690 | 0.003688 | 89.656 | 0.03338 |
| C127 | 0.06324 | 0.048357 | 0.002141 | 87.451 | 0.03385 |
| C128 | 0.11634 | 0.138661 | 0.003997 | 88.195 | 0.03436 |
| C129 | 0.07750 | 0.071924 | 0.002652 | 88.648 | 0.03422 |
| †C130 | 0.44444 | 0.142374 | 0.029399 | 93.681 | 0.06615 |
| †C131 | 0.50411 | 0.148775 | 0.033509 | 92.304 | 0.06647 |
| †C132 | 0.52736 | 0.150065 | 0.038849 | 91.982 | 0.07367 |
| †C133 | 0.49194 | 0.150714 | 0.031582 | 92.508 | 0.06420 |
| †C134 | 0.49399 | 0.148869 | 0.034093 | 93.145 | 0.06901 |

*Vmp (p = 10%)

†The data reported for Comp. Process #5 was collected by analysis of several different areas of the same sample (i.e., separate samples were not tested).

As demonstrated by the data in Tables 1 and 2 and FIGS. 1-14 and 17, in certain aspects the Examples possess unique structural features (compared to the samples produced by comparative processes) that are associated with good abrasion resistance properties. The data also demonstrates the versatility of the processes disclosed herein to produce textured articles having desired optical properties while maintaining abrasion resistance. Generally, textured articles having (a) a Vmp/Sq of greater than 0.084 (or greater than 0.09), (b) a Vmp/Sq of greater than 0.084 (or greater than 0.09) and an Smrk2 of greater than 90% (or greater than 92%), (c) a Vmp of greater than 10 nm (or greater than 14 nm) and an Sdq of 0 to 0.1 (or greater than 0.0045 and less than 0.1), or (d) any combination thereof, are distinguished from known textured surfaces and also exhibit good abrasion performance as judged by light or no visible markings after being subjected to the Abrasion Test. In some aspects, such textured articles also possess desired optical properties, such as at least one of: a $PPD_{140}$ of less than 3.7% (or less than 3.5%) at an incident angle of 0 degrees; an uncoupled DOI of less than 80% (or less than 60%); and a haze of less than 70% (or less than 10%). Such textured articles according to the disclosures herein exhibit unique structural properties, as indicated by Vmp, Vmp/Sq, Smrk2, and Sdq, as compared to comparative textured articles.

It will be appreciated that the various disclosed aspects or embodiments may involve particular features, elements or steps that are described in connection with that particular aspect or embodiment. It will also be appreciated that a particular feature, element, or step, although described in relation to one particular aspect or embodiment, may be interchanged or combined with alternate aspects or embodiments in various non-illustrated combinations or permutations.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

While various features, elements, or steps of particular aspects or embodiments may be disclosed using the transitional phrase "comprising," it is to be understood that alternative aspects or embodiments, including those that may be described using the transitional phrases "consisting of" or "consisting essentially of," are implied. Thus, for example, implied alternative aspects or embodiments to a device that comprises A+B+C include aspects or embodiments where a device consists of A+B+C and aspects or embodiments where a device consists essentially of A+B+C.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified. It also is understood that the various features disclosed in the specification and the drawings can be used in any and all combinations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched weight percent (wt. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched weight percent values used in relation to such constituents are intended to encompass values within ±0.5 wt. % of these constituents in final, as-melted articles. With the forgoing in mind, substantial compositional equivalence between final articles and as-batched compositions is expected.

It will be apparent to those ordinarily skilled in the art that various modifications and variations can be made to the present disclosure without departing from the spirit and scope of the disclosure. Since modifications combinations, sub-combinations, and variations of the disclosed embodiments incorporating the spirit and substance of the disclosure may occur to persons ordinarily skilled in the art, the disclosure should be construed to include everything within the scope of the appended claims and their equivalents.

All references citied herein are incorporated by reference in their entireties for all purposes.

What is claimed is:

1. A textured article, comprising:

a substrate comprising a textured region defined on a primary surface of the substrate;

wherein the textured region comprises:

a Vmp/Sq of at least 0.084 as measured according to ISO 25178-2:2012, and further wherein the primary surface of the substrate comprises glass, glass-ceramic, ceramic, or any combination thereof.

2. The textured article of claim 1, wherein the Vmp/Sq is 0.09-0.15 as measured according to ISO 25178-2:2012.

3. The textured article of claim 1, wherein the textured region further comprises an Smrk2 of at least 90% as measured according to ISO 25178-2:2021.

4. The textured article of claim 3, wherein the Smrk2 is at least 92% as measured according to ISO 25178-2:2021.

5. The textured article of claim 1, exhibiting at least one of:

a $PPD_{140}$ of 3.7% or less at an incident angle of 0 degrees;

an uncoupled DOI of 80% or less as measured according to ASTM D 5767-18; and a haze of 70% or less as measured according to ASTM D 1003-21.

6. The textured article of claim 1, exhibiting:

a $PPD_{140}$ of 3.7% or less at an incident angle of 0 degrees;

an uncoupled DOI of 80% or less as measured according to ASTM D 5767-18; and a haze of 10% or less as measured according to ASTM D 1003-21.

7. The textured article of claim 1, exhibiting:

a $PPD_{140}$ of 3.5% or less at an incident angle of 0 degrees;

an uncoupled DOI of 60% or less as measured according to ASTM D 5767-18; and a haze of 70% or less as measured according to ASTM D 1003-21.

8. The textured article of claim 1, wherein the textured region comprises depressions having a density of 0.005-0.015 depressions/$\mu m^2$.

9. The textured article of claim 1, wherein:

the textured region comprises depressions having at least one of:

an average maximum lateral dimension between 5-50 microns; and an average maximum depth of 150-2500 nm.

10. The textured article of claim 1, wherein:

the textured region comprises depressions;

the depressions have an average maximum depth; and at least 90% of the depressions have maximum depths within 10% of the average maximum depth.

11. The textured article of claim 1, wherein the textured region comprises depressions distributed randomly across at least a portion of the textured region.

12. A textured article, comprising:

a substrate comprising a textured region defined on a primary surface of the substrate;

wherein the textured region comprises:

a Vmp of at least 10 nm as measured according to ISO 25178-2:2012; and an Sdq of 0-0.1 as measured according to ISO 25178-2:2012, and further wherein the primary surface of the substrate comprises glass, glass-ceramic, ceramic, or any combination thereof.

13. The textured article of claim 12, wherein:

the Vmp is 14-46 nm as measured according to ISO 25178-2:2012; and the Sdq is 0.0045-0.1 as measured according to ISO 25178-2:2012.

14. The textured article of claim 12, exhibiting at least one of:

a $PPD_{140}$ of 3.7% or less at an incident angle of 0 degrees;

an uncoupled DOI of 80% or less as measured according to ASTM D 5767-18; and a haze of 70% or less as measured according to ASTM D 1003-21.

15. The textured article of claim 12, exhibiting:

a $PPD_{140}$ of 3.7% or less at an incident angle of 0 degrees;

an uncoupled DOI of 80% or less as measured according to ASTM D 5767-18; and a haze of 10% or less as measured according to ASTM D 1003-21.

16. The textured article of claim 12, exhibiting:

a $PPD_{140}$ of 3.5% or less at an incident angle of 0 degrees;

an uncoupled DOI of 60% or less as measured according to ASTM D 5767-18; and a haze of 70% or less as measured according to ASTM D 1003-21.

17. The textured article of claim 12, wherein the textured region comprises depressions having a density of 0.005-0.015 depressions/$\mu m^2$.

18. The textured article of claim 12, wherein:

the textured region comprises depressions having at least one of:

an average maximum lateral dimension between 5-50 microns; and an average maximum depth of 150-2500 nm.

19. The textured article of claim 1, wherein the substrate comprises glass, glass-ceramic, or any combination thereof.

20. The textured article of claim 1, wherein:

the Vmp is 14-46 nm as measured according to ISO 25178-2:2012; and the Sdq is 0.0045-0.1 as measured according to ISO 25178-2:2012.

* * * * *